(12) United States Patent
Meller et al.

(10) Patent No.: US 9,043,680 B2
(45) Date of Patent: May 26, 2015

(54) METHOD AND SYSTEM FOR IN-PLACE UPDATING CONTENT STORED IN A STORAGE DEVICE

(75) Inventors: Evyatar Meller, Petach-Tikva (IL); Sharon Peleg, Ramat Hasharon (IL)

(73) Assignee: RED BEND LTD., Hod Hasharon (IL)

( * ) Notice: Subject to any disclaimer, the term of this patent is extended or adjusted under 35 U.S.C. 154(b) by 1326 days.

(21) Appl. No.: 11/997,134

(22) PCT Filed: Jan. 13, 2008

(86) PCT No.: PCT/IL2008/000054
§ 371 (c)(1),
(2), (4) Date: Feb. 7, 2010

(87) PCT Pub. No.: WO2008/084488
PCT Pub. Date: Jul. 17, 2008

(65) Prior Publication Data
US 2010/0185921 A1    Jul. 22, 2010

Related U.S. Application Data

(63) Continuation-in-part of application No. 11/652,147, filed on Jan. 11, 2007, now abandoned, and a continuation-in-part of application No. PCT/IL2007/000048, filed on Jan. 11, 2007.

(51) Int. Cl.
*H03M 13/00* (2006.01)
*G06F 11/00* (2006.01)
*G06F 9/445* (2006.01)
*G06F 11/14* (2006.01)

(52) U.S. Cl.
CPC ............ *G06F 8/665* (2013.01); *G06F 11/1433* (2013.01)

(58) Field of Classification Search
None
See application file for complete search history.

(56) References Cited

U.S. PATENT DOCUMENTS

| 6,018,747 | A  |   | 1/2000  | Burns et al. |
| 6,021,509 | A  | * | 2/2000  | Gerdt et al. ................ 714/6.32 |
| 6,546,552 | B1 |   | 4/2003  | Peleg |
| 6,832,373 | B2 |   | 12/2004 | O'Neill |

(Continued)

FOREIGN PATENT DOCUMENTS

| EP | 0723226 A1 | 7/1996 |
| WO | 0011549 A1 | 3/2000 |

(Continued)

OTHER PUBLICATIONS

G. Holden, et al., "XOR Commands on SCSI Disk Drives", XP-002361243, X3T 10/94-111r8.
International Search Report in corresponding International Application No. PCT/IL2007/000048 dated Nov. 20, 2007, 18 pps.
International Search Report in corresponding International Application No. PCT/IL2008/000054 dated Nov. 1, 2007, 16 pps.

*Primary Examiner* — Justin R Knapp
(74) *Attorney, Agent, or Firm* — Buchanan Ingersoll & Rooney PC

(57) ABSTRACT

Methods and systems for in-place updating original content stored in a non-volatile storage device and for yielding updated content. Some of the described embodiments illustrate the possibilities for reduction in storage operations, storage blocks, and/or update package size. Some of the described embodiments include the writing of error recovery result(s) such as XOR result(s) which enable the recovery of data in case of an interruption of the update process. In some of the described embodiments, there is re-usage of a protection buffer containing content which is required in the update process.

46 Claims, 21 Drawing Sheets

(56) References Cited

U.S. PATENT DOCUMENTS

| | | |
|---|---|---|
| 2001/0008008 A1* | 7/2001 | Mori .............................. 711/114 |
| 2005/0155029 A1* | 7/2005 | Nguyen et al. ................. 717/168 |
| 2005/0160307 A1* | 7/2005 | Schmisseur ....................... 714/5 |
| 2005/0216530 A1 | 9/2005 | Meller et al. |
| 2005/0278388 A1* | 12/2005 | Butterworth et al. ......... 707/200 |
| 2006/0179345 A1* | 8/2006 | Subbarao .......................... 714/6 |
| 2006/0236029 A1* | 10/2006 | Corrado et al. ............... 711/114 |
| 2007/0067667 A1* | 3/2007 | Ikeuchi et al. .................... 714/6 |
| 2009/0043826 A1* | 2/2009 | Butterworth et al. ......... 707/202 |
| 2011/0010345 A1* | 1/2011 | Forster et al. ................. 707/661 |

FOREIGN PATENT DOCUMENTS

| | | |
|---|---|---|
| WO | 0195640 A2 | 12/2001 |
| WO | 0195640 A3 | 12/2001 |
| WO | 2004114130 A2 | 12/2004 |
| WO | 2005003963 A2 | 1/2005 |
| WO | 2005003963 A3 | 1/2005 |
| WO | 2005101200 A1 | 10/2005 |
| WO | 2008084488 A2 | 7/2008 |
| WO | 2008084488 A3 | 7/2008 |

* cited by examiner

METHOD AND SYSTEM FOR IN-PLACE UPDATING CONTENT STORED IN A STORAGE DEVICE

FIELD OF THE INVENTION

This invention relates to a method and system for in-place updating content stored in a storage device. More specifically this message relates to in-place updating an original version of content to an updated version in a non-volatile storage device including blocks.

BACKGROUND OF THE INVENTION

It is sometimes required to update content stored in a storage device. For example, if the content is software, or a program (such as an executable file), it is sometimes required to fix a bug existing therein or introduce new features thereto. Yet, the latter example in non-limiting and other types of content may also require updates, such as text, data stored in a database, etc. Hereinafter the terms "old version" or "original version" refer to a version of content before update, and the terms "new version" or "updated version" refer to a version that includes already updated content. In other words, an original version includes "original content" while an updated version includes "updated content". It should be noted that updated content can be further updated. In case of a second update, for example, the updated content of the first update turns to be original content of the second update while new updated content is generated by the second update etc.

A process that updates original content yielding updated content is referred to as an "update process". The update process usually requires instructions, instructing it how to perform the update. Such instructions provided to the update process constitute together an "update package", wherein each instruction included therein constitutes an "update command". That is, an update process obtains an update package as input, and operates in accordance therewith in order to update the original content to updated content. This is non-limiting though and sometimes an update process can obtain more than one update package allowing it, together, to update the content. Alternatively, instead of obtaining an update package, the update process can sometimes retrieve an update package (or a set of update commands) from a storage device or from a database etc. Hence, hereinafter, when referring to the term "obtaining an update package" it should be appreciated that the update process can passively obtain the package, it can actively retrieve the package or sometimes it can activate a package embedded therein (e.g., a hard coded set of update commands).

One way to update an original version to an updated version is storing the updated version in the storage device in addition to the original version. For example, a computer program "prog.exe" is activated whenever a user presses a certain icon on the PC (Personal Computer) windows desktop. In order to update prog.exe it is possible to store the updated version of this file in a different location than the present (original) version, and then reset the path associated with the icon so as to activate the updated version instead of the original version. Later, when it is ascertained that the update process completed successfully, the original version can be deleted safely, releasing the space occupied thereby. In addition to increasing storage consumption, this latter update method requires that the complete updated version be provided to the update process, e.g., in the update package. Such an update package easily becomes huge in size, and if it is required to transmit it to the updated device via band-width limited communication channels, transmittance may become cumbersome and sometimes even impossible. Therefore, it is preferable that the size of the update package be reduced along with reducing the device's storage consumption.

Another update method, which storage-wise is adverse to the latter method mentioned above, simply overwrites original content with updated content. This update method is risky and non-reliable, because if the update process fails in the middle of operating, when part of the original version is already overwritten, while only part of the updated version is written to the storage device, it is appreciated that the version stored on the storage device at the time of interruption is probably invalid or inoperable. Still, this method requires transmitting the complete updated version. It is noted that updating content by overwriting the original content with the updated content is commonly referred to in the art as "in-place update". Hereinafter, unless specifically noted, the term "update" is used to describe "in-place update".

One way for reducing the size of an update package is by including in it information representing the differences between the original and updated content. Such an update package is sometimes referred to also as a "difference", a "difference result" or a "delta". The update process, upon operating in accordance with a delta, applies it to the original content, hence producing the updated content. Deltas may be produced using the known in the art differencing algorithms (such as "GNU diff") in a naïve manner, though such deltas tend to be rather large.

The size of the delta being considered, there are methods trying to reduce the size thereof. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses another system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

It was noted before that an update package is sometimes referred to as a delta, however, this is non-limiting, and as it appears from WO 2004/114130 and WO 2005/003963, the update package sometimes includes a delta therewith.

Other methods exist in the art which take care of additional considerations involved in the update. Prior to elaborating on other methods these considerations should be pointed out.

It is appreciated that content is normally stored in a storage device. A storage device can be a volatile storage device (such as Random Access Memory, RAM) or a non-volatile storage device (such as a hard disk or flash memory).

There are storage devices that are organized in discrete areas, referred to, e.g., as blocks or sectors, wherein one block can include content belonging to more than one file. Hence, if there are, for example, two files stored in a storage device, a single block can include several ('x') bytes belonging to a first of the two files, as well as several ('y') bytes belonging to a second of the two files. If the size of a block is 'z' bytes, it is clear that $z>=x+y$. Yet, those versed in the art would appreciate that writing content into a block affects other content stored therein. That is, if it is required to re-write the content stored in the x bytes of the first file (e.g., during update thereof), due to storage device limitations it may be impossible to write only those x bytes, and it may be necessary to write the content of all the z bytes to the storage device. This can be done, for example, by reading content stored in the z bytes from the non-volatile storage device to a volatile storage device not including blocks, such as RAM, updating only the content stored in the x bytes in the volatile storage device (that is, the content of the other z-x bytes is left unaffected therein) and then writing the content of the z bytes back to the non-volatile storage device. This limitation characterizes flash memory devices, for example, wherein it is required to completely delete the present content of a block, before new content (including updated content) can be written thereto, and hard disks where it is not obligatory to delete the complete sector before writing data thereto, but it is required to write the complete content of a block in one writing operation it is impossible to write only x bytes when leaving the content stored in the z-x bytes unaffected. In order to leave the z-x bytes unaffected, it is required to store the content thereof in the volatile memory device and write them back into the block, together with the x bytes). Hence, the update procedure may require many write operations to the storage device including blocks, and it is appreciated that in order to achieve an efficient update, the update should better be optimized. For example, if x equals, for example, two bytes, than these two bytes should better be updated together, instead of updating the first byte and then the second byte, writing these two bytes separately into the block.

Furthermore, when updating an original version (including original content) to an updated version (including updated content), there are sometimes update commands that use original content in order to generate updated content. For example, it is possible to copy original content from one place to a different place in the storage device, wherein this copied content, in its destination place, forms part of the updated version. When copying content to a destination place it should be appreciated that this destination place could have been used before for storing other content (possibly also being part of the original version). Hence, the copied content can overwrite the original content at the destination place. Still further, it is possible that there is another update command that uses the destination place's original content in order to generate updated content. If this other update command is called further to operating in accordance with the first copy command, the destination place's original content can be already overwritten. This situation constitutes a "write before read conflict". Herein below unless otherwise noted the term "conflict" is used for short for "write before read conflict".

Write before read conflicts are a known problem in the art and U.S. Pat. No. 6,018,747 tries to cope therewith.

U.S. Pat. No. 6,018,747 ("Method for generating and reconstructing in-place delta files", published 2000) discloses a method, apparatus, and article of manufacture for generating, transmitting, replicating, and rebuilding in-place reconstruct software updates to a file from a source computer to a target computer. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been written, this will result in an incorrect reconstruction since the prior version data has been overwritten. This is termed a write before read conflict. U.S. Pat. No. 6,018,747 teaches how to post-process a delta file in order to create a delta file, minimize the number of write before read conflicts, and then replace copy commands with add commands to eliminate conflicts. A digraph is generated, for representing the write before read conflicts between copy commands. A schedule is generated that eliminates write before read conflicts by converting this digraph into an acyclic digraph.

Another known problem in the art is reliability of the update process, or fail safe update. This problem occurs, for example, when a process of updating an original version is interrupted before its normal termination, such as in a power failure. In such a case, there is a possibility that the content of the block which was updated during the interruption may become corrupted and contain unexpected content.

It was already mentioned before that when updating blocks of content, an original content of a block sometimes forms part of the input used by the update process. In such a case, if the original block (which is corrupted due to interruption) is required, the update process may be unable to resume. It can be impossible to re-update the corrupted block.

U.S. Pat. No. 6,832,373 ("System and method for updating and distributing information", published 2004), for example, tries coping with the problem. It discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and according to U.S. Pat. No. 6,832,373's inventors, may be performed more quickly than through the use of technologies existing when U.S. Pat. No. 6,832,373 was filed.

That is, U.S. Pat. No. 6,832,373 describes using an auxiliary backup block, while all block update operations are performed thereby using two phases 'two-phase protocol' or 'two-phase commit'. According to U.S. Pat. No. 6,832,373, in a first phase of updating a block, the update process writes the updated content to the auxiliary backup block and verifies that the content is correctly stored. In a second phase, the update process writes the updated content into its target block to form the updated content of the updated block. Yet, variations of the same method exist, such as copying the original content of the updated block into the auxiliary backup block in the first phase, and in the second phase updating the target block to store the updated content.

The two phase commit (whether the backed up content is the original content or the updated content) can use only one additional backup block, yet, it is time consuming, since every write operation requires performing two operations (for the two phases). In addition, according to U.S. Pat. No. 6,832, 373 every backup operation backups the complete (original or updated) content of a block in the auxiliary backup block, and hence if the number of blocks whose content is updated by the update process is n, the total number of operations required for the update process (including update operations and write operations into the auxiliary backup block) cannot be smaller than 2n. If there are blocks in which content is stored in more than one write operation, the number of operations that the update process is required to perform will be even larger than 2n.

U.S. Pat. No. 6,018,747 mentioned above detects and resolves write before read conflicts using the delta file. The remaining write before read conflicts are resolved by converting copy commands to add commands, thus converting the delta file to an equivalent larger delta file. In order to maintain reliable update, write and backup storage operations are required.

WO 2007/023497 ("Method and system for in-place updating content stored in a storage device", published 2007) discloses a system and method for reliable in-place update, performing m block storage operations, including write operations and backup operations, wherein 2<=m<2n. WO 2007/023497 protects before updating all the original content requiring protection, using a protection buffer and the delta file. Thus, WO 2007/023497 resolves write before read conflicts as well as maintaining reliable update.

There is a need in the art, thus, for reliable and efficient mechanisms for in-place updating original content of an original version, generating an updated version.

SUMMARY OF THE INVENTION

It is therefore an object of the invention to provide methods and apparatuses for reliably and efficiently in-place updating content and for generating update packages therefore.

In accordance with an embodiment of the invention, there is provided a method for reliably in-place updating original content stored in storage blocks of a non-volatile storage to yield updated content, the method comprising:

obtaining an error recovery result indicative of a result achievable by applying a first error recovery function to data which is used in updating the original content, wherein a part of said data can be recovered by applying a second error recovery function to (i) said error recovery result and (ii) another part of said data;

after obtaining the error recovery result, updating the original content while storing the updated content to the non-volatile storage in place of the original content.

In accordance with another embodiment of the invention, there is provided an apparatus for reliably in-place updating original content stored in storage blocks of a non-volatile storage to yield updated content, the method comprising:

an error recovery result obtaining unit for obtaining an error recovery result indicative of a result achievable by applying a first error recovery function to data which is used in updating the original content, wherein a part of said data can be recovered by applying a second error recovery function to (i) said error recovery result and (ii) another part of said data; and an updating processor responsive to said error recovery result for updating the original content while storing the updated content to the non-volatile storage in place of the original content.

In accordance with a still further embodiment of the invention, there is provided a method for generating an update package that is configured for reliably in-place updating original content to yield updated content stored in n storage blocks of a non-volatile storage device, the method comprising:

obtaining a number (k);

generating the update package, wherein the update package is configured to instruct an update process to perform n+x storage operations, x is a function of k wherein x<n.

In accordance with as still further embodiment of the invention, there is provided a method for reliably in-place updating original content stored in storage blocks of a non-volatile storage to yield updated content, the method comprising:

obtaining an update package;

reliably in-place updating the original content while performing no backup storage operations.

In accordance with a still further embodiment of the invention, there is provided a method for protecting data used for reliably in-place updating original content stored in storage blocks of a non-volatile storage device to yield updated content, the method comprising:

calculating an error recovery result, by performing an error recovery function, wherein at least one operand of said function includes one of the following: (i) original content, (ii) updated content, and (iii) content that requires protection; and writing said error recovery result into non-volatile memory.

In accordance with a still further embodiment of the invention, there is provided an apparatus for protecting data, the data is used for reliably in-place updating original content stored in storage blocks of a non-volatile storage device to yield updated content, the apparatus comprising:

a calculator for calculating an error recovery result by performing an error recovery function, wherein at least one operand of said function includes one of the following: (i) original content, (ii) updated content, and (iii) content that requires protection; and an error recovery result writing unit responsive to said calculator for writing the error recovery result into a non-volatile memory.

In accordance with a still further embodiment of the invention, there is provided a method for recovering non-reliable content that is a result of an interrupted in-place update of content stored in storage blocks of a non-volatile storage device, wherein one of the blocks stores non-reliable content and each one of the other blocks stores one of the following: (i) original content, and (ii) updated content, the method comprising:

obtaining an error recovery result indicative of data, said data includes one of the following: (i) original content, (ii) updated content, and (iii) content that requires protection;

recovering said non-reliable content by applying an error recovery function to said error recovery result and to one of the following: (a) content stored in the other blocks, (b) content calculated based on content stored in the other blocks, and (c) content requiring protection calculated based on the content stored in the other blocks.

In accordance with a still further embodiment of the invention, there is provided an apparatus for recovering non-reliable content that is a result of an interrupted in-place update of content stored in storage blocks of a non-volatile storage device, wherein one of the blocks stores the non-reliable content and each one of other blocks stores one of the following: (i) original content, and (ii) updated content, the apparatus comprising:

an error recovery result obtaining unit for obtaining an error recovery result indicative of data, said data includes one of the following: (i) original content, (ii) updated content, and (iii) content that requires protection;

a recovery processor responsive to said error recovery result for recovering said non-reliable content by applying an error recovery function to said error recovery result and to one of the following (a) content stored in the other blocks or (b) content calculated based on content stored in the other blocks or (c) content requiring protection calculated based on the content stored in the other blocks.

In accordance with a still further embodiment of the invention, there is provided a method for reliably in-place updating original content of an original version stored in non-volatile storage including blocks to yield updated content of an updated version, comprising:

applying a first subgroup of an error recovery group of functions to data which is used in achieving an updated version in non-volatile storage, thereby generating an error recovery result; and storing said error recovery result in non-volatile storage prior to writing updated content from volatile memory to non-volatile storage in place of original content;

wherein a part of said data can be recovered by applying another subgroup of said error recovery group of functions to said error recovery result and a result of said first subgroup applied to another part of said data.

According to one aspect of the embodiment of the invention, the method further comprises a group of error recovery functions which includes a pair of XOR functions.

According to yet another aspect of the embodiment, the method further comprises:

updating original content to updated content in volatile memory;

wherein said data includes at least some of said updated content in volatile memory.

According to yet another aspect of the embodiment, the method further comprises data which includes at least some of said original content.

According to yet another aspect of the embodiment, the method further comprises an error recovery result which is stored in a predetermined number of blocks in non-volatile storage.

According to yet another aspect of the embodiment, said predetermined number is 1.

According to yet another aspect, the embodiment further comprises a group of functions containing a pair of error recovery functions, said subgroup is one error recovery function from said pair, and said another subgroup is another error recovery function from said pair.

According to yet another aspect, there is an update sequence for updating content in blocks in said non volatile storage, the method further comprising:

protecting original content in at least one instance of a protection buffer in volatile memory, wherein said data includes said at least one protection buffer instance.

According to yet another aspect, the embodiment said error recovery result is stored in a number of blocks in said non-volatile storage equivalent to a number of blocks in one protection buffer instance.

According to yet another aspect of the embodiment, the method further comprising:

after an interruption which erases volatile memory, retrieving said stored error recovery result from non volatile storage to volatile memory;

recovering a part of said data by applying said another subgroup of said recovery group of functions to said error recovery result and a result of said first subgroup applied to another part of said data; and utilizing said recovered part of data to write content to non-volatile storage.

According to yet another aspect, said recovered part of said data includes updated content corresponding to a block in said non-volatile storage; and said another part of said data includes updated content associated with at least one other block which is not said block corresponding to said recovered updated content, and said utilizing includes writing said recovered updated content to said corresponding storage block.

According to yet another aspect, said recovered part of said data includes original content corresponding to a block in said storage; and said another part of said data includes original content original associated with at least one other block which is not said block corresponding to said recovered original content;

said method further comprising: updating said recovered original content, wherein said utilizing includes: writing said updated recovered original content to said corresponding storage block.

According to yet another aspect of the embodiment of the invention, the method further comprises:

rebuilding each at least one protection buffer instance using original or updated content from non-volatile storage except for one protection buffer instance which can not be rebuilt based on said original or updated content; wherein said recovered part of said data includes said protection buffer instance which can not be rebuilt, and wherein said another part of said data includes at least one rebuilt protection buffer instance; and updating content using said recovered protection buffer instance, wherein said utilizing includes writing said updated content to said non-volatile storage.

In accordance with a still further embodiment of the invention, there is provided a method for in-place updating original content of an original version stored in non-volatile storage including blocks to yield updated content of an updated version, wherein there is an update sequence for updating content in said blocks in said non-volatile storage, the method comprising:

providing a predetermined number of blocks in non-volatile storage for storing a XOR result;

protecting original content in at least one instance of a protection buffer in volatile memory, each instance equivalent in size to said predetermined number of blocks and corresponding to at least one sequential block in said update sequence, wherein no two instances correspond to the same block in the update sequence and wherein for each instance, all original content protected in said instance originates from said at least one corresponding sequential block and is used to update said at least one corresponding sequential block;

performing at least one XOR operation, thereby generating a XOR result, wherein at least one operand in each said at least one XOR operation includes at least part of a protection buffer instance; and writing said XOR result to said predetermined number of blocks prior to writing updated content from volatile memory to non-volatile storage in place of original content.

According to one aspect of the embodiment of the invention, the method further comprises:

retrieving said stored XOR result from non volatile storage to volatile memory after an interruption which erases volatile memory and precludes rebuilding of a protection buffer instance from any of original or updated content in said non-volatile storage;

rebuilding each of said at least one protection buffer instances using original or updated content from non-volatile storage except for said protection buffer instance which can not be rebuilt based on said original or updated content;

executing at least one XOR operation, thereby recovering said protection buffer instance which can not be rebuilt, wherein at least one operand in each said at least one XOR operation includes said retrieved XOR result or at least part of a rebuilt protection buffer instance; and updating content using said recovered protection buffer instance, and writing said updated content to said non-volatile storage.

In accordance with a still further embodiment of the invention, there is provided a method for in-place updating original content of an original version stored in non-volatile storage including blocks to yield updated content of an updated version, comprising:

providing one block in non-volatile storage for storing a XOR result;

performing at least one XOR operation, thereby generating said XOR result, wherein at least one operand in each said at least one XOR operation includes original content corresponding to at least part of a storage block or wherein at least one operand in each said at least one XOR operation includes updated content corresponding to at least part of a storage block; and writing said XOR result to said provided block prior to writing updated content from volatile memory to non-volatile storage in place of original content.

According to one aspect of the embodiment of the invention, the method further comprises:

retrieving said stored XOR result from non volatile storage to volatile memory after an interruption which erases volatile memory and precludes restoration from non-volatile storage of some content corresponding to a block;

performing at least one XOR operation, thereby recovering said some content which could not be restored from non-volatile storage, wherein at least one operand in each said at least one XOR operation includes original content associated with at least part of a block which is not said block corresponding to said recovered content, or wherein at least one operand in each said at least one XOR operation includes updated content associated with at least part of a block which is not said block corresponding to said recovered content;

updating said recovered content if said recovered content is original content; and writing said recovered updated content to said corresponding block in said non-volatile storage.

In accordance with a still further embodiment of the invention, there is provided a method for in-place updating original content of an original version stored in non-volatile storage including blocks to yield updated content of an updated version, wherein there is an update sequence for updating content in said blocks in said non-volatile storage, the method comprising:

prior to updating a storage block in non-volatile storage:

(i) protecting in a protection buffer in volatile memory data related to said storage block which is required for updating said storage block or for updating any storage block later in said update sequence; and (ii) writing said data related to said storage block which is required for updating said corresponding storage block or for updating any storage block later in said update sequence, or writing a function thereof, to non-volatile storage;

wherein after using any of said data to update in volatile memory content corresponding to said storage block or corresponding to said any storage block later in said update sequence, said used data is replaced in said protection buffer by other data.

According to one aspect of the embodiment of the invention, said data related to said storage block which is required for updating said storage block or for updating said any storage block later in said update sequence includes original content from said storage block.

According to yet another aspect of the embodiment of the invention, said data related to said storage block which is required for updating said storage block or for updating said any storage block later in said update sequence also includes data to facilitate the locating of original content in the protection buffer.

According to yet another aspect, said function is a subgroup of an error recovery group of functions which encodes said data related to said storage block which is required for updating said storage block or for updating said any storage block later in said update sequence along with other data required for updating storage blocks.

According to still another aspect of the embodiment, said subgroup is a XOR function.

According to yet another aspect of the embodiment, The method further comprises:

after an interruption which erases volatile memory, retrieving said stored error recovery result from non volatile storage to volatile memory; and recovering said data related to said storage block which is required for updating said storage block or for updating said storage any block later in said update sequence by applying another subgroup of said error recovery group of functions to said error recovery result and a result of said subgroup applied to said other data required for updating storage blocks.

According to yet another aspect of the embodiment of the invention, the method further comprises:

after an interruption which erases volatile memory, retrieving said data related to said storage block which is required for updating said storage block or for updating said any storage block later in said update sequence from non volatile storage to volatile memory; and utilizing said retrieved data to update said corresponding storage block in non-volatile storage.

In accordance with a still further embodiment of the invention, there is provided a method for generating an update package for in place updating original content of an original version stored in non-volatile storage with blocks to yield updated content of an updated version, the method comprising:

providing a protection buffer of equivalent size to a predetermined number of blocks; and prior to updating or simulating updating of content corresponding to a storage block, for each piece of data related to said corresponding storage block which is required for updating said corresponding storage block or for updating any storage block later in said update sequence performing the following: if there is space available in said protection buffer, protecting or simulating protecting of said piece of data, but if there is no available space inserting said piece of data in said update package;

wherein after said protected or simulated to be protected piece of data has been used to update or simulate update of content corresponding to said storage block or corresponding to said any storage block later in said update sequence, said used piece of data is replaced or simulated to be replaced in said protection buffer by other data.

According to one embodiment, there is provided a program storage device readable by machine, tangibly embodying a program of instructions executable by the machine to perform a method for reliably in-place updating original content stored in storage blocks of a non-volatile storage to yield updated content, the method comprising:

obtaining an error recovery result indicative of a result achievable by applying a first error recovery function to data which is used in updating the original content, wherein a part of said data can be recovered by applying a second error recovery function to (i) said error recovery result and (ii) another part of said data;

after obtaining the error recovery result, updating the original content while storing the updated content to the non-volatile storage in place of the original content.

According to another embodiment, there is provided a program storage device readable by machine, tangibly embodying a program of instructions executable by the machine to perform a method for generating an update package that is configured for reliably in-place updating original content to yield updated content stored in n storage blocks of a non-volatile storage device, the method comprising:

obtaining a number (k);

generating the update package, wherein the update package is configured to instruct an update process to perform n+x storage operations, x is a function of k wherein x<n.

According to another embodiment, there is provided a program storage device readable by machine, tangibly embodying a program of instructions executable by the machine to perform a method for reliably in-place updating original content stored in storage blocks of a non-volatile storage to yield updated content, the method comprising:

obtaining an update package;

reliably in-place updating the original content while performing no backup storage operations.

According to yet another embodiment, there is provided a program storage device readable by machine, tangibly embodying a program of instructions executable by the machine to perform a method for protecting data used for reliably in-place updating original content stored in storage blocks of a non-volatile storage device to yield updated content, the method comprising:

calculating an error recovery result, by performing an error recovery function, wherein at least one operand of said function includes one of the following: (i) original content, (ii) updated content, and (iii) content that requires protection; and writing said error recovery result into non-volatile memory.

According to yet another embodiment, there is provided a program storage device readable by machine, tangibly embodying a program of instructions executable by the machine to perform a method for recovering non-reliable content that is a result of an interrupted in-place update of content stored in storage blocks of a non-volatile storage device, wherein one of the blocks stores non-reliable content and each one of the other blocks stores one of the following: (i) original content, and (ii) updated content, the method comprising:

obtaining an error recovery result indicative of data, said data includes one of the following: (i) original content, (ii) updated content, and (iii) content that requires protection;

recovering said non-reliable content by applying an error recovery function to said error recovery result and to one of the following: (a) content stored in the other blocks, (b) content calculated based on content stored in the other blocks, and (c) content requiring protection calculated based on the content stored in the other blocks.

According to yet another embodiment, there is provided a program storage device readable by machine, tangibly embodying a program of instructions executable by the machine to perform a method for reliably in-place updating original content of an original version stored in non-volatile storage including blocks to yield updated content of an updated version, comprising:

applying a first subgroup of an error recovery group of functions to data which is used in achieving an updated version in non-volatile storage, thereby generating an error recovery result; and storing said error recovery result in non-volatile storage prior to writing updated content from volatile memory to non-volatile storage in place of original content;

wherein a part of said data can be recovered by applying another subgroup of said error recovery group of functions to said error recovery result and a result of said first subgroup applied to another part of said data.

According to yet another embodiment, there is provided a computer program product comprising a computer useable medium having computer readable program code embodied therein for reliably in-place updating original content of an original version stored in non-volatile storage including blocks to yield updated content of an updated version, the computer program product comprising:

computer readable program code for causing the computer to apply a first subgroup of an error recovery group of functions to data which is used in achieving an updated version in non-volatile storage, thereby generating an error recovery result; and computer readable program code for causing the computer to store said error recovery result in non-volatile storage prior to writing updated content from volatile memory to non-volatile storage in place of original content;

wherein a part of said data can be recovered by applying another subgroup of said error recovery group of functions to said error recovery result and a result of said first subgroup applied to another part of said data.

According to yet another embodiment, there is provided a computer program product comprising a computer useable medium having computer readable program code embodied therein for in-place updating original content of an original version stored in non-volatile storage including blocks to yield updated content of an updated version, wherein there is an update sequence for updating content in said blocks in said non-volatile storage, the computer program product comprising:

computer readable program code for causing the computer to provide a predetermined number of blocks in non-volatile storage for storing a XOR result;

computer readable program code for causing the computer to protect original content in at least one instance of a protection buffer in volatile memory, each instance equivalent in size to said predetermined number of blocks and corresponding to at least one sequential block in said update sequence, wherein no two instances correspond to the same block in the update sequence and wherein for each instance, all original content protected in said instance originates from said at least one corresponding sequential block and is used to update said at least one corresponding sequential block;

computer readable program code for causing the computer to perform at least one XOR operation, thereby generating a XOR result, wherein at least one operand in each said at least one XOR operation includes at least part of a protection buffer instance; and computer readable program code for causing the computer to write said XOR result to said predetermined number of blocks prior to writing updated content from volatile memory to non-volatile storage in place of original content.

According to yet another embodiment, there is provided a computer program product comprising a computer useable medium having computer readable program code embodied therein for in-place updating original content of an original version stored in non-volatile storage including blocks to yield updated content of an updated version, the computer program product comprising:

computer readable program code for causing the computer to providing one block in non-volatile storage for storing a XOR result;

computer readable program code for causing the computer to perform at least one XOR operation, thereby generating said XOR result, wherein at least one operand in each said at least one XOR operation includes original content corresponding to at least part of a storage block or wherein at least one operand in each said at least one XOR operation includes updated content corresponding to at least part of a storage block; and computer readable program code for causing the computer to write said XOR result to said provided block prior to writing updated content from volatile memory to non-volatile storage in place of original content.

According to yet another embodiment, there is provided a computer program product comprising a computer useable medium having computer readable program code embodied therein for in-place updating original content of an original version stored in non-volatile storage including blocks to yield updated content of an updated version, wherein there is an update sequence for updating content in said blocks in said non-volatile storage, the computer program product comprising:

computer readable program code for prior to updating a storage block in non-volatile storage causing the computer to:

(i) protect in a protection buffer in volatile memory data related to said storage block which is required for updating said storage block or for updating any storage block later in said update sequence; and (ii) writing said data related to said storage block which is required for updating said corresponding storage block or for updating any storage block later in said update sequence, or writing a function thereof, to non-volatile storage;

wherein after using any of said data to update in volatile memory content corresponding to said storage block or corresponding to said any storage block later in said update sequence, said used data is replaced in said protection buffer by other data.

According to yet another embodiment, there is provided a computer program product comprising a computer useable medium having computer readable program code embodied therein for generating an update package for in place updating original content of an original version stored in non-volatile storage with blocks to yield updated content of an updated version, the computer program product comprising:

computer readable program code for causing the computer to provide a protection buffer of equivalent size to a predetermined number of blocks; and computer readable program code for prior to updating or simulating updating of content corresponding to a storage block, for each piece of data related to said corresponding storage block which is required for updating said corresponding storage block or for updating any storage block later in said update sequence, causing the computer to perform the following: if there is space available in said protection buffer, protecting or simulating protecting of said piece of data, but if there is no available space inserting said piece of data in said update package.

In accordance with still further embodiments of the invention, there are provided computer programs comprising computer program code means for performing the methods described when said programs are run on a computer.

In accordance with still further embodiments of the invention, these computer programs are embodied on a computer readable medium.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
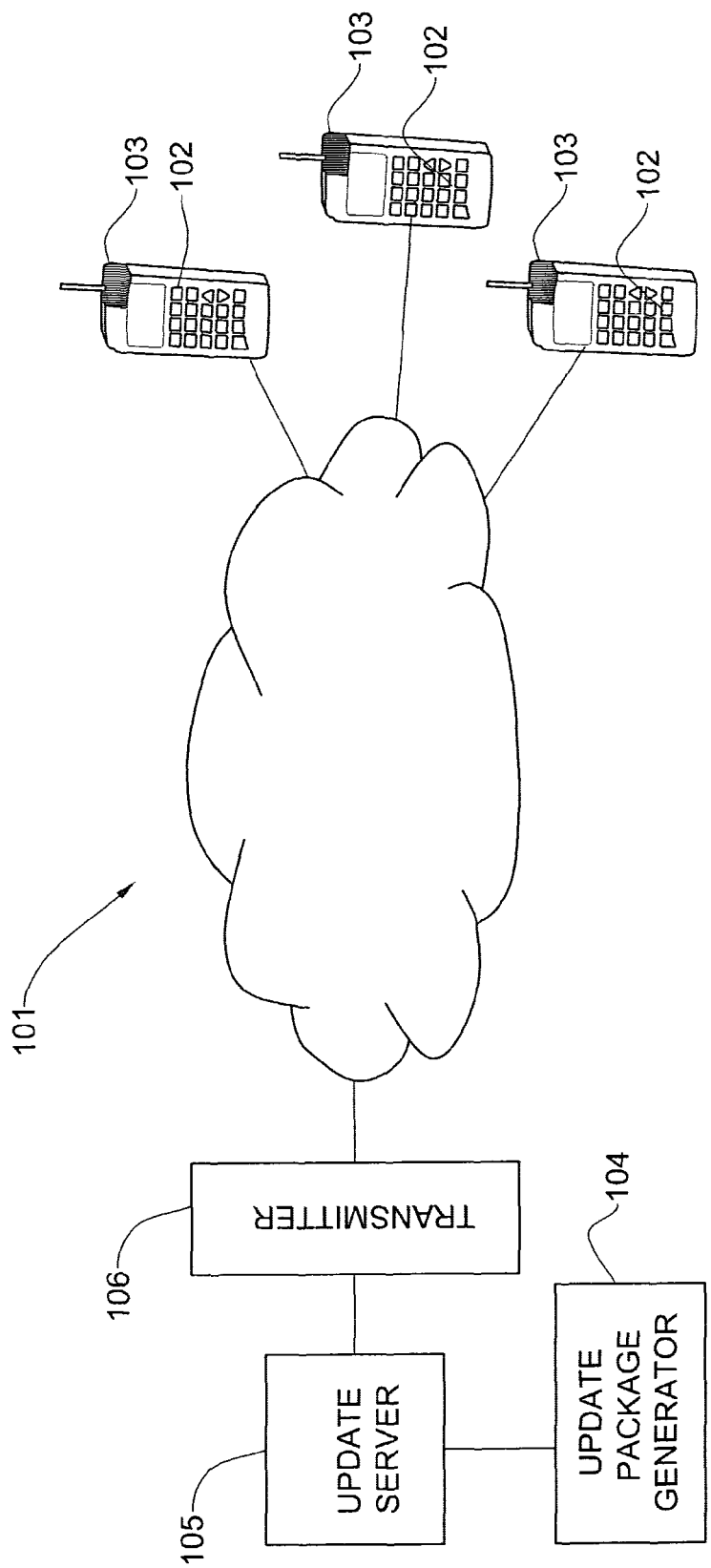
FIG. 1 is a schematic illustration of a system for reliably updating versions in a cellular network, in accordance with an embodiment of the invention.

In the following description elements that are common to more than one figure will be referenced by the same reference numerals.

Furthermore, unless specifically noted, the term "update" is used hereinafter to refer to "in-place update".

As used herein, the phrase "for example," "such as" and variants thereof describing exemplary implementations of the present invention are exemplary in nature and not limiting.

Reference in the specification to "one embodiment", "an embodiment", "some embodiments", "another embodiment", "other embodiments" or variations thereof means that a particular feature, structure or characteristic described in connection with the embodiment(s) is included in at least one embodiment of the invention. Thus the appearance of the phrase "one embodiment", "an embodiment", some embodiments" "another embodiment", "other embodiments" or variations thereof are not necessarily referring to the same embodiment(s).

FIG. 1 is a schematic illustration of a system 101 for reliably updating versions in a cellular network, in accordance with one embodiment of the invention. Cellular telephones 102 that are coupled to or include storage devices 103, execute programs that enable their operation. Programs are normally stored in files. The version of the program currently executing on a cellular telephone is referred to, hereinafter, as an "old version" or as an "original version". An update process is termed herein "reliable", provided that the update process can be resumed even subsequent to an interruption which caused volatile memory to be erased and possibly a block in storage to be corrupted. It should be appreciated that the content of this block is sometimes corrupted during the interruption and sometimes not. Yet, because it is sometimes impossible to determine or to be certain whether the content thereof is corrupted or not, the content stored in this block is considered as non-reliable content.

It is noted that memory devices, such as the storage devices 103, are sometimes referred to also as "memory devices" or "memory units".

Sometimes there is a need to update the programs in order for a telephone 102 to execute a newer version thereof, constituting an "updated version" or a "new version". Such an updated version is generated by an "update process" or an "update processor" operating in the telephone. The update process operates in accordance with an update package (constituting a "delta file") that the telephone receives.

According to the invention, an update package is generated in an update package generator 104, operating, for example, in a personal computer (PC) or in any other type of computer. The update package is stored in an update server 105 and transmitted, via a transmitter 106 to the cellular telephones 102. Hence it is clear that the update server, or the update generator includes or has access to a non-volatile memory on which the update package can be stored.

It should be noted that the system 101 illustrated in FIG. 1 is a non-limiting example and the invention is not limited to updating programs. Many other types of content stored in storage devices require update, such as data stored in databases, files stored in the storage device etc. Therefore, hereinafter the term "content" will be used instead of "program".

In the same way, the invention is not limited to cellular networks and/or to cellular telephones 102. It should be appreciated that cellular telephones belong to a group referred to as embedded devices. There are other embedded devices, such as Personal Digital Assistants (PDAs), set-top boxes and other consumer electronic devices that are coupled to storage devices for storing content, and sometimes it is required to update the content stored therein. Yet, it is possible to update also content stored in storage devices coupled to non-embedded devices, such as PCs or other computers. The storage devices 103 can be, for example, hard-disk drives, Flash-memory devices, EPROMs (Erasable Programmable Read-Only Memory) and EEPROMs (Electrically EPROM) or any other storage device.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updated devices" will be used hereinafter, and it should be noted that the term "updated device" can refer to any device that is coupled to or includes a storage device 103 and allows updating content stored therein.

It was previously explained that in order to update content stored in the storage devices, update packages are generated, stored in the update server 105 and conveyed to the updated devices (such as the cellular telephones 102) and the storage devices 103 coupled or included therewith. Alternatively, it is possible to convey an update package without storing it first in an update server 105. For example, it is possible to convey the update package directly from the update package generator where it is generated. In such a case the machine where the update generator operates, or the update generator itself is considered as the update server 105.

Furthermore, in the example illustrated in FIG. 1 the update package is conveyed via the transmitter 106. This is also non-limiting and any other way applicable for conveying the update package can be used. For example, it is possible to store the update package on a portable storage device 103 such as a compact disk or disk-on-key thus allowing an updated device (such as the telephones 102) to access the update package by reading it therefrom.

When an updated device receives an update package, it can operate an update process in accordance with the update package, wherein the update process updates the original version for generating an updated version. It should be noted that the updated device can operate the update process immediately after receiving the update package. Alternatively it can store the update package in a non-volatile memory, such as in the storage device 103, and operate the update process at some later time (such as the next time the updated device reboots).

Herein below, for simplicity of description storage device 103 and/or updated device (such as cellular telephone 102) will be written without reference numerals. In the description below, it is assumed that any storage device 103 at least includes non-volatile memory organized in blocks, and therefore unless otherwise noted, herein below the term "storage" or "storage device" is used for referring to non-volatile memory organized in blocks and the term "storing" is used to refer to storing in non-volatile memory organized in blocks. Unless otherwise noted, herein below the term "writing" or "saving" to non-volatile memory is used for referring to writing to non-volatile memory which may or may not be organized in blocks. In the description below it is assumed that the updated device is coupled to or includes volatile memory which is not organized in blocks, for example random access memory RAM, and therefore unless otherwise noted, the term "volatile memory" is used to refer to volatile memory which is not organized in blocks.

It is noted that a storage device can store content of more than one original and/or updated version. For example, it is appreciated that there can be several computer programs installed in a single hard disk.

In many cases a file is constituted of logically sequential content. For example, in a file including text, wherein the text is "123456789", the character '2' is logically consecutive to the character '1', the character '3' is logically consecutive to the character '2', etc. However, those versed in the art would appreciate that when storing this file in a storage device, the stored file, or the content included therein can be fragmented, i.e., different portions of the file can be stored in different portions, or blocks, of the storage device. In other words, a logically sequential content is not necessarily stored in a physically sequential manner in the storage device.

Bearing in mind that a logically sequential content is not necessarily stored in a physically sequential manner in the storage device and/or that the size of the logically sequential content can be larger than the size of a block, it should be appreciated that logically sequential content can be spread over several storage blocks. Furthermore, one storage block can include content belonging to several logically sequential contents (such as several files). Returning now to the previous example, where the text "123456789" constitutes logically sequential content, it should be appreciated that the content "1234" can be stored in one physical block, while the content "56789" in this example can be stored in a different physical block that physically precedes the block where "1234" is stored (yet it is clear that logically the content "1234" precedes the content "56789").

The logically sequential text "123456789" will be further considered as an original version. According to the example, it is possible to update this file to include an updated version, wherein the text stored in the updated version is "123756489". In this updated version the characters '4' and '7' were switched, compared to their position in the original version. In other words, the character '7' in the updated version replaces the character '4' that appears in the original version, while the character '4' replaces the character '7'. It should thus be appreciated that in order to generate this updated version, it is possible, e.g., to divide the original version into several segments (each segment constitutes a "logical block"). The first segment includes the content "123", the second segment's content is "4", the third segment includes "56", the fourth includes "7" and the fifth includes "89". When generating the updated version, the first, third and fifth segments are left intact, while the content of the second and fourth segments are switched. Thus, a segment includes logically sequential content.

The previous example of the "123456789" text and the update thereof to the updated version "123756489" is a simplified example. In other examples it is possible to divide the content into segments that occupy physically sequential area in one or more physical blocks. Thus, if "123" is fragmented in a way where "12" is stored in a first block, while "3" is stored in a second block, wherein "12" does not sequentially precede "3", then according to this example "123", although logically sequential, should be divided into two segments (specifically these are "12" and "3").

In this latter example the segment "12" can yet reside on two different blocks, as long as the blocks are sequential (a first block sequentially preceding a second block) and as long as the character '1' is stored in an area ending the first block while the character '2' is stored in the area opening the second block.

This latter example is non-limiting. For example, an alternative embodiment can limit a segment to occupy physically sequential area in one physical block (unlike "one or more" in the previous example). Thus, if "12" is sequentially stored in two sequential blocks it must be further divided into two segments (one is "1" and the second is "2").

In addition, moving a segment or leaving it intact are not the only behaviors, or transformations, that are allowed. For example, it is possible to delete a segment or to perform a calculation on the content stored therein. Thus, instead of switching the "4" and "7" segments in the "123456789" example, it is possible to add 3 to the numerical value corresponding to the content of the "4" segment (4 plus 3 yield 7) Similarly, it is possible to subtract 3 from the numerical value corresponding to the content of the "7" segment (7 minus 3 yield 4). In accordance with this case, "4" and "7" are still considered segments in the original version.

When content of a segment in the updated version (an "updated segment") corresponds to content of a segment in the original version (an "original segment"), these segments are considered as "corresponding segments" or "matched segments". Correspondence refers to any logical or arithmetic connection between the segments, wherein the updated segment can be a copy of the original segment, it can be a modified copy of the original segment (e.g., it is sometimes preferred to copy the content of a segment and then modify part or all of the copied content), it can include content received by computing the content of the updated segment based on content of the original segment, etc.

It is noted that sometimes there may be more than one updated segment corresponding to a certain original segment (e.g., the content of the original segment is copied twice, thus generating two updated segments corresponding thereto). The opposite is also true. Sometimes there may be more than one original segment corresponding to a single updated segment (e.g., in order to calculate the content of a single updated segment it is possible to use content stored in two distinct original segments).

Some embodiments of the invention provide reliable methods for updating that requires only a selectable predetermined number, k, of storage operations above the number of storage blocks updated by the update process. Recall that for the update process to be considered reliable, the update process should be able to be resumed even subsequent to an interruption which caused volatile memory to be erased and possibly a block in storage to be corrupted. Assuming that the updated version is stored in l blocks and that content stored in n out of the l (where n≤0 blocks is updated by the update process (i.e., it is possible that during the update process content of one or more of the l blocks does not change and hence remains identical to the original content that occupied these blocks as part of the original version), embodiments of the invention allow a reliable updating process to be achieved with n+k storage operations, where typically, although not necessarily, k<n. For example, in embodiments where calculation of the error recovery result is performed prior to the update process, such as in an external source, k may equal zero or more storage operations. As another example, in embodiments where calculation of the error recovery result is performed during the update process but prior to the actual storing of updated content in place of original content, k may equal one or more storage operations. It should be understood that there is no limitation that requires k to equal zero or one storage operation and embodiments of the invention also envision the possibility of k equaling a plurality of storage operations (see for example some of the embodiments of FIG. 8 described below).

Accordingly, when the update package is generated, it is configured to instruct the update process to in-place update the content while performing no more than n+k storage operations, wherein k<n. Furthermore, according to certain embodiments, instead of performing n+k storage operations, the update package can be configured to instruct the update process to in-place update the content while performing no more than n+x storage operations, wherein x is a function of k. For example, x can be equal to k+1, k*2 or any other function, as long as x<n.

In order to better understand certain embodiments of the invention, assume that a first function f( ) and a second function g( ) are error recovery functions under the following condition:

If $x_1, x_2, \ldots, x_n$ is a set of data, and the error recovery result $F=f(x_1, x_2, \ldots, x_n)$, then given F and any subset of $x_1 \ldots x_n$ where one element $x_i$ is missing (i.e. $x_1, x_2, \ldots, x_{i-1}, x_{i+1}, \ldots, x_n$), one can obtain $x_i=g(x_1, x_2, \ldots, x_{i-1}, x_{i+1}, \ldots, x_n, F)$.

Some examples of error recovery function f( ) or g( ) include inter-alia the XOR function, the summation function and the subtraction function. Depending on the embodiment, functions f( ) and g( ) may or may not be identical. In some cases, the properties of error recovery functions f( ) and g( ) allow the equation for xi to be equivalent to the following: $x_i=g(f(x_1, x_2, \ldots, x_{i-1}, x_{i+1}, \ldots, x_n, F)$. It should be evident that in both equation formats, namely $x_i=g(x_1, x_2, \ldots, x_{i-1}, x_{i+1}, \ldots, x_n, F)$ and $x_i=g(f(x_1, x_2, \ldots, x_{i-1}, x_{i+1}, \ldots, x_n), F)$, part of the data, $x_i$, is obtained by applying the function g( ) to the error recovery result, F, and to another part of the data. In some embodiments of the invention, f( ) and g( ) are together considered an error recovery group of functions. However, the invention is not limited to a specific group of error recovery functions or error recovery result(s). For example, in some embodiments there may be more than two functions in the error recovery group of functions, where a sub-group of the error recovery group of functions is used to calculate the error recovery result, F, and another sub-group of the group is used to calculate the recovered data, $x_i$. Depending on the embodiment, there may or may not be common functions in both subgroups, and each subgroup may comprise one or more functions from the group. In order to not burden the reader, the description below refers to applying an error recovery function (i.e. f( )) in order to obtain the error recovery result (i.e. F) and applying an error recovery function (i.e. g( )) to obtain the missing element (i.e. $x_i$).

For simplicity's sake, some embodiments below describe the XOR function as an example of an error recovery function, where f( )=XOR and g( )=XOR, but in other embodiments one or more other error recovery functions may be used alternatively or additionally, mutatis mutandis. Similarly, in some embodiments below the XOR result(s) is/are used as example(s) of error recovery result(s), but in other embodiments other error recovery result(s) may be used alternatively or additionally, mutatis mutandis. For example, in another embodiment the error recovery functions used may be addition and subtraction, for example, where f( ) is addition and g( ) is subtraction or the opposite. In other words, one of the error recovery functions is addition and the other is subtraction. Continuing with the example if $F=+x_1+x_2+ \ldots +x_n$ then $x_i=F-(x_1+x_2+ \ldots +x_{i-1}+x_{i+1}+x_{i+2}+ \ldots +x_n)$. In one embodiment where f( ) is addition or subtraction, the error recovery result, F, may occupy enough bits to hold the sum or difference of all the required bits from all the protection "blocks" instances or from all the blocks in the update sequence and not necessarily one bit in the error recovery result per each bit of the protection buffer "block" or block in the update sequence, as is the case when f( )=XOR.

In some embodiments it is mentioned that an error recovery result can be obtained from an external source, after being computed therein or elsewhere (i.e., not within the update process). Regardless of the specific embodiment, such calculation of an error recovery result can be done, for example, as follows: (1) obtaining an update package, (2) simulating the update process while calculating the error recovery result, and (3) writing the error recovery result obtained in (2), e.g., by incorporating it into the update package, by writing it to a non-volatile memory or by conveying it to an updated device.

In some embodiments of the invention relating to the update process, it is assumed that an updated device obtains an update package and will operate the update process in accordance with the update package, wherein the update process updates the original content (i.e. content being part of the original version/old version), generating updated content (i.e. content being part of an updated version/new version).

For example, when an update process starts operating, the updated device may obtain, or access an update package saved in volatile or non-volatile memory. It is appreciated that the updated device could receive or could have previously received the update package from the update server 105. Alternatively, the update package may be loaded or may have been previously loaded for example to the storage device by any applicable means, such as by copying it from a portable (i.e. removable) memory device (e.g., a floppy or compact disc) or from a connected external memory device or by receiving it from the Internet. In embodiments, where an error recovery result is calculated, the result is calculated before the actual storing of updated content in place of original content. For example, in some of these embodiments where an error recovery result is calculated, the error recovery result may be computed by the updated device during the update process but prior to the actual storing of updated content to non-volatile storage in place of the original content. As another example, in some of these embodiments where an error recovery result is calculated, the error recovery result may be computed additionally or alternatively prior to the update process, e.g., by an external source, such as by update package generator 104, during generation of the update package or otherwise. In some of the embodiments where the error recovery result is calculated prior to the update process, the calculated error recovery result may be written inside the update package or written to other non-volatile memory by generator 104 or server 105. In some of the embodiments where the error recovery result is computed prior to the update process, the updated device may receive the computed error recovery result in conjunction with the update package (for example within the update package or at the same time as the update package within accompanying non volatile memory) or separately from the update package. In embodiments where the error recovery result is calculated prior to the update process, the error recovery result can be provided to the updated device by any applicable means, for example by transmission thereof from server 105, or for example by loading it by any applicable means such as by copying it from a portable (i.e. removable) memory device (e.g., a floppy or compact disc) or from a connected external memory device or by receiving it from the Internet. Generally, the error recovery result can be received from an external source that calculated the result prior to updating.

The flowcharts of FIGS. 2A, 2B, 2C, 3A, 3B, 3C, 4, 5, 6, 7 and 8 presented below include stages presented in a particular sequence. In other embodiments of any of these figures, the sequence of stages may be changed and/or stages shown as sequential may be performed simultaneously. In other embodiments of any of these Figures, there may be fewer, more and/or different stages than those illustrated in the figures.

Figure 2A:
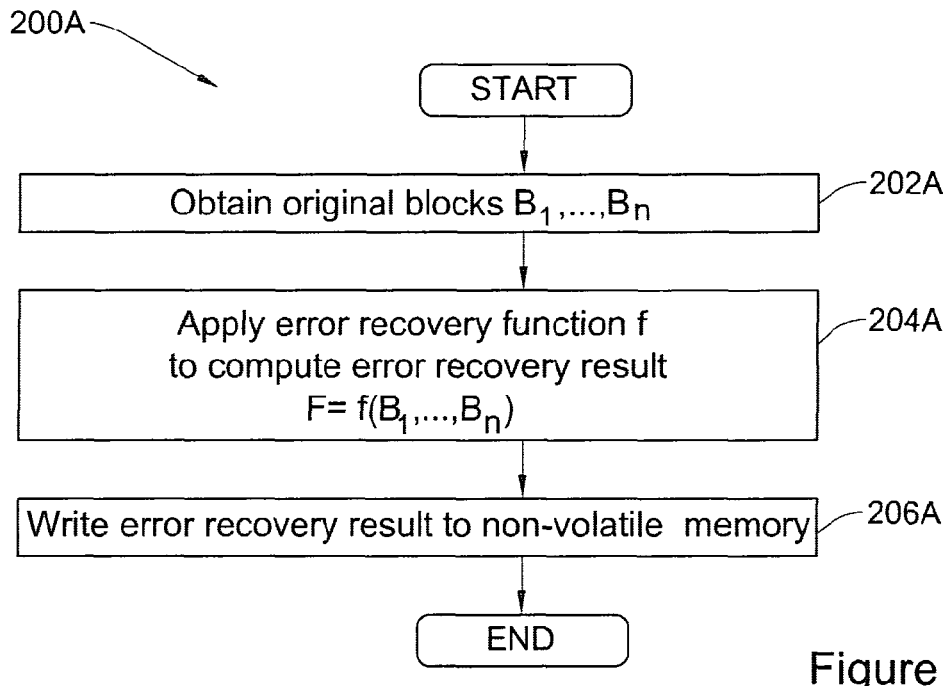
FIG. 2A is a flowchart of a method for computing an error recovery result for original content, in accordance with an embodiment of the invention.

FIG. 2A is a flowchart of a method 200A for computing, or calculating an error recovery result for original content, in accordance with an embodiment of the current invention. Method 200A may be executed at any time prior to the storing by the updated device of the updated content to storage in place of the original content. For example, in one embodiment, method 200A may be performed by update package generator 104 during generation of the update package, by server 105 prior to transmission of the update package and/or by the updated device during the update process but before the actual storing of updated content.

In stage 202A, the n blocks whose original content will be updated by the update process are obtained. The n blocks are denoted in FIG. 2A as $B_1$ to $B_n$. In stage 204A, the error recovery function f( ) is applied to the original content of the n blocks in order to obtain the error recovery result, F (i.e. the original content of the n blocks are operands of the error recovery function f( )). In stage 206A, the error recovery result is written to non-volatile memory. For example, the error recovery result may be written to storage by the updated device, or may be written to the update package or to other non-volatile memory which accompanies the update package by update package generator 104.

Figure 2B:
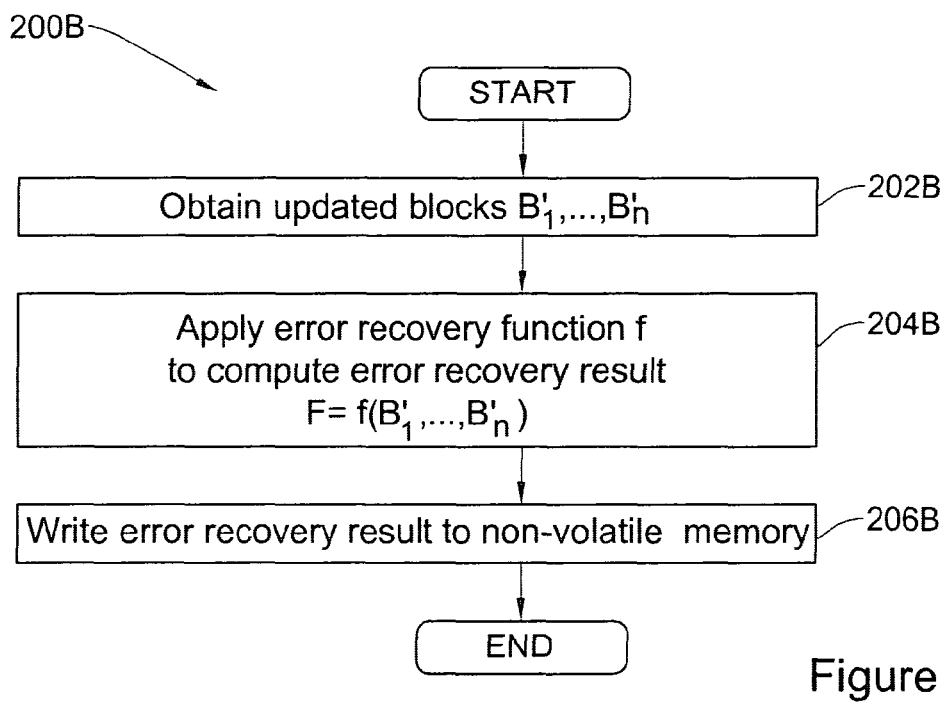
FIG. 2B is a flowchart of a method for computing an error recovery result for updated content, in accordance with an embodiment of the invention.

FIG. 2B is a flowchart of a method 200B for computing, or calculating an error recovery result for updated content, in accordance with an embodiment of the current invention. Method 200B may be executed at any time prior to the storing by the updated device of the updated content to storage in place of the original content. For example, in one embodiment, method 200B may be performed by update package generator 104 during generation of the update package, by server 105 prior to transmission of the update package and/or by the updated device during the update process but before the actual storing of updated content.

In stage 202B, the n blocks of updated content whose content was updated by the update process are obtained. It is noted that in those embodiments where the update package generator 104 performs method 200B, the updated content is available to the update package generator. In one of the embodiments where the updated device performs method 200B, the obtaining of the updated blocks in stage 202B include generating the updated content to be stored in the updated blocks in volatile memory. The n blocks are denoted in FIG. 2A as $B_1'$ to $B_n'$. In stage 204B, the error recovery function f( ) is applied to the updated content of the n blocks in order to obtain the error recovery result, F (i.e. the updated content of the n blocks are operands of the error recovery function f( )). In stage 206B, the error recovery result is written to non-volatile memory. For example, the error recovery result may be written to storage by the updated device, or may be written to the update package or to other non-volatile memory which accompanies the update package by update package generator 104. According to a different example, wherein the error recovery result is calculated at the generator 104, for example, the generator (or any alternative external source applicable to the case) may transmit the calculated error recovery result directly, without storing it before in a non-volatile memory. In this case it is appreciated that the result is written into the communication protocol's buffers, which should be considered equivalent to writing it into non-volatile memory.

Figure 2C:
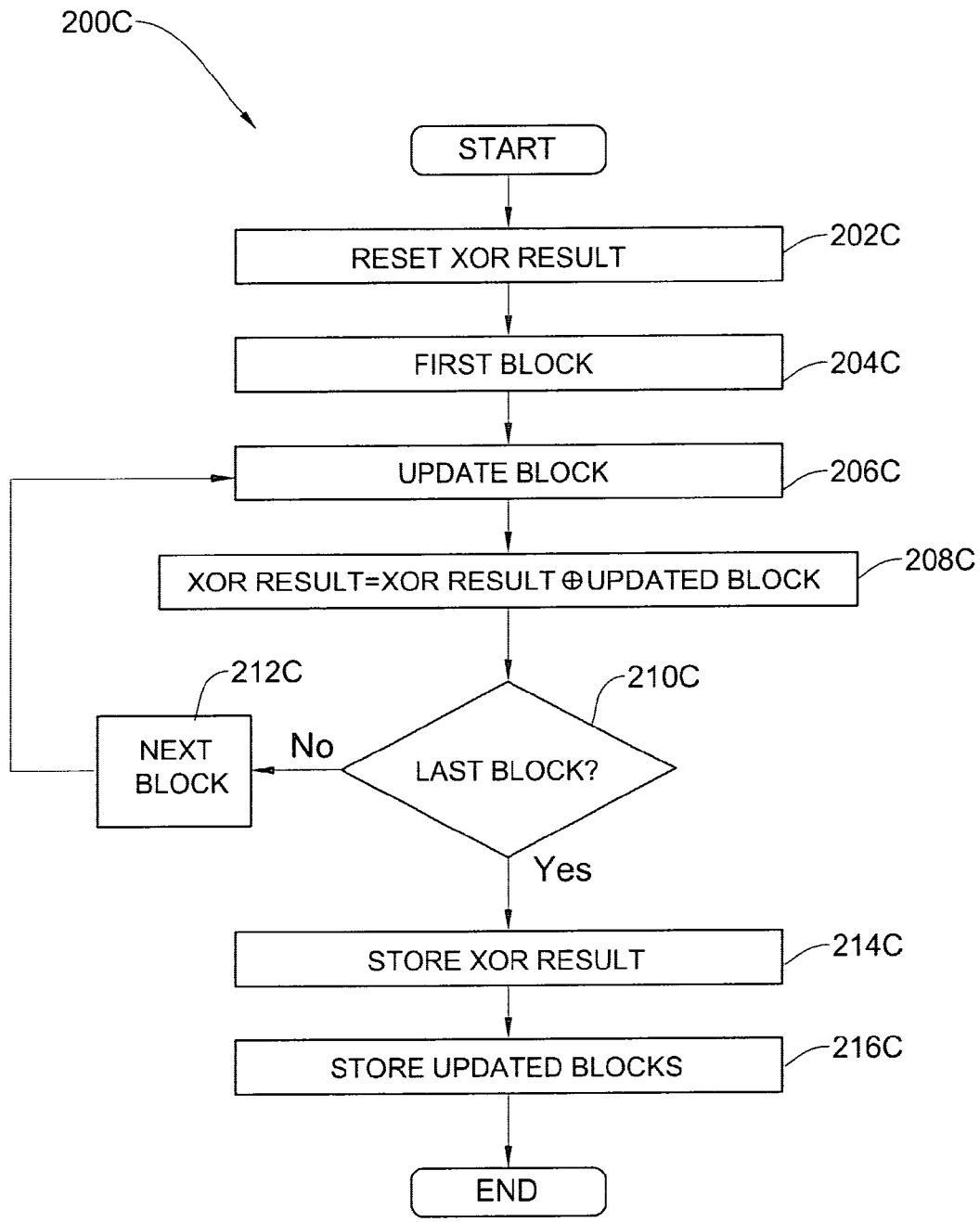
FIG. 2C is a flowchart of a reliable update method during which a XOR error recovery result is computed, in accordance with an embodiment of the invention.

FIG. 2C is a flowchart of a reliable update method 200C during which a XOR error recovery result is computed by the updated device, in accordance with an embodiment of the current invention. In other words, in method 200C, f( ) is the XOR function. In the embodiment illustrated in FIG. 2C, the XOR error recovery result is calculated for updated content and therefore represents a particular case of method 200B. In another embodiment also described herein, the XOR error recovery result is calculated for original content and therefore represents a particular case of method 200A.

Before proceeding to describe the stages of method 200C, briefly will be discussed the properties of the XOR (exclusive or, symbolized herein below as "$\oplus$"). If a bit "0" is XOR'ed with a bit "0", the result is "0". If a bit "1" is XOR'ed with a bit "1", the result is also "0". If a bit "0" is XOR'ed with a bit "1" (or vice versa), the result is "1". Therefore, it can be concluded that a "0" bit results whenever two bits of the same value are XOR'ed with each other, and if a bit with a value of x (x=0 or 1) is XOR'ed with a bit "0", the same value of x results. It should also be noted that XOR is commutative, i.e. $y \oplus z = z \oplus y$, and associative, i.e. $(a \oplus b) \oplus c = a \oplus (b \oplus c)$.

It is assumed that prior to stage 202C, the updated device has obtained an update package and will update content in accordance with the update package. In stage 202C, an area in volatile memory for example equaling the size of a storage block, has contents thereof ("XOR result") set to "0". The concept of setting the contents to zero is used to contrast with stage 304C of FIG. 3C, but it should be evident that in another embodiment the contents may not be set to "0" and stage 208C described below can be modified so that when it is executed for the first block to be updated, the XOR result is set to equal the first updated block.

Starting in stage 204C with the first block to be updated in accordance with the update package, the update process updates in volatile memory each block which is to be updated by the update package (stage 206C). In stage 208C the previous XOR result is bitwise XOR'ed with the updated block, resulting in a XOR result which reflects all of the previously updated blocks. The method continues with the next block (stage 212C) until all the blocks have been updated in volatile memory (yes to stage 210C). The final XOR result is stored to the non-volatile storage (214C). For example, assuming for simplicity's sake a simplistic case of seven updated blocks, $B_1, B_2 \ldots B_7$, the final XOR result will equal:

$B_1 \oplus B_2 \oplus B_3 \oplus B_4 \oplus B_5 \oplus B_6 \oplus B_7$, where $\oplus$ represents the bitwise XOR operation.

In stage 216C, each of the blocks updated in stage 206C is stored to the non-volatile storage. The storing of the final XOR result in stage 214C and the storing in stage 216C of each of the blocks which had been updated represents n+1 storage operations and therefore in this embodiment k=1.

If there is no interruption in stage 216C, and all updated blocks are successfully written to storage, then the previously stored XOR result is not required and can be discarded, if desired, once all updated blocks have been successfully stored. However, assume that during stage 216C, there is an interruption of the storing of the updated blocks and volatile memory is erased. In this case, the storage device will include a block to be updated ('block including resume point' or for short 'resume block') which is the block in the update sequence immediately following the last block in the update sequence to be successfully stored in non-volatile memory prior to interruption. (For example, if the interruption occurred during the storing of the first block in the update sequence then the first block would be the resume block but if the interruption occurred after the successful storing of the first block in the update sequence then the second block would be the resume block). The contents of the resume block may be old or corrupted. Optionally, the storage device will also at the point of interruption include one or more old blocks (not yet updated) which would have been written to storage after the resume block and optionally one or more new blocks (already updated) which were written to storage prior to the resume block.

The reader will understand that if instead the interruption occurred in method 200C, prior to beginning to store update blocks (i.e. prior to stage 216C), the blocks in storage would contain the original content and therefore the update process could be successfully concluded by re-executing some or all of method 200C. For example, in one embodiment if the interruption occurred after stage 214C was executed but before stage 216C was executed, then the update process could continue beginning with stage 216C, whereas if the interruption occurred prior to execution of stage 214C, the update process could restart beginning with stage 202C.

Figure 3A:
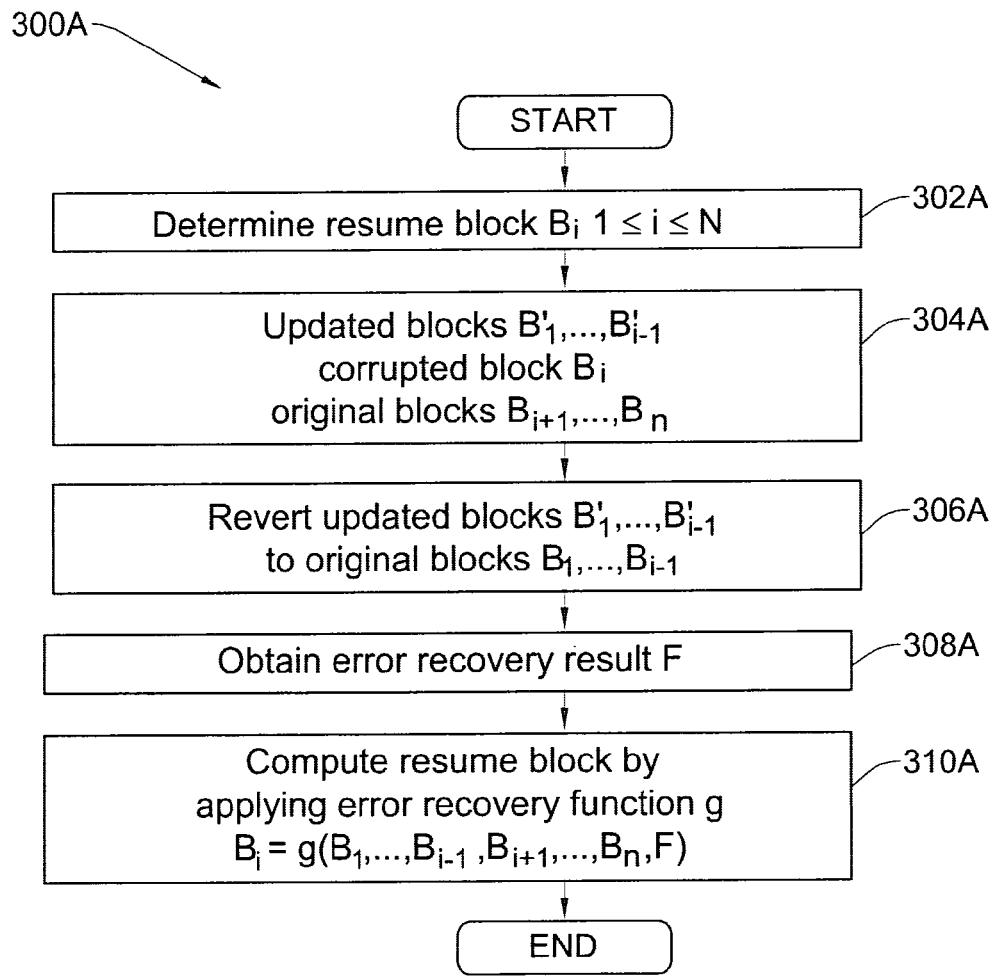
FIG. 3A is a flowchart of a method for computing original content corresponding to a resume block after an interrupted update, using the error recovery result of the method of FIG. 2A, in accordance with an embodiment of the invention.
Figure 3B:
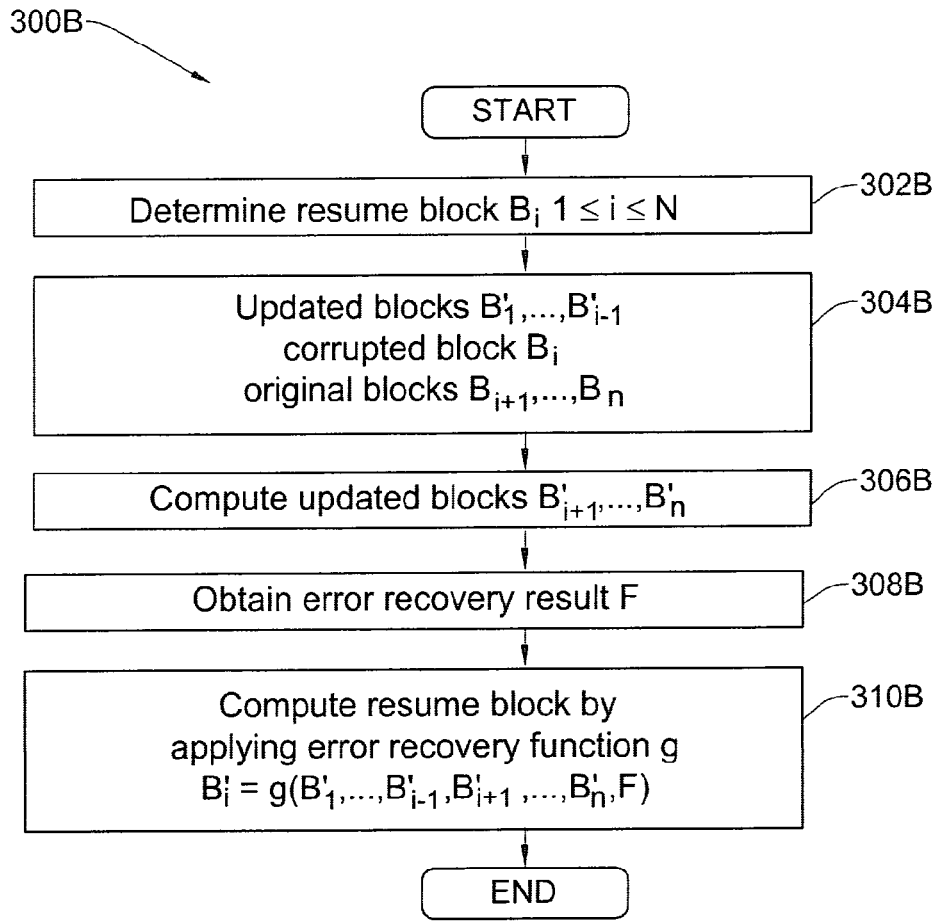
FIG. 3B is a flowchart of a method for computing updated content corresponding to a resume block after an interrupted update, using the error recovery result of the method of FIG. 2B, in accordance with an embodiment of the invention.
Figure 3C:
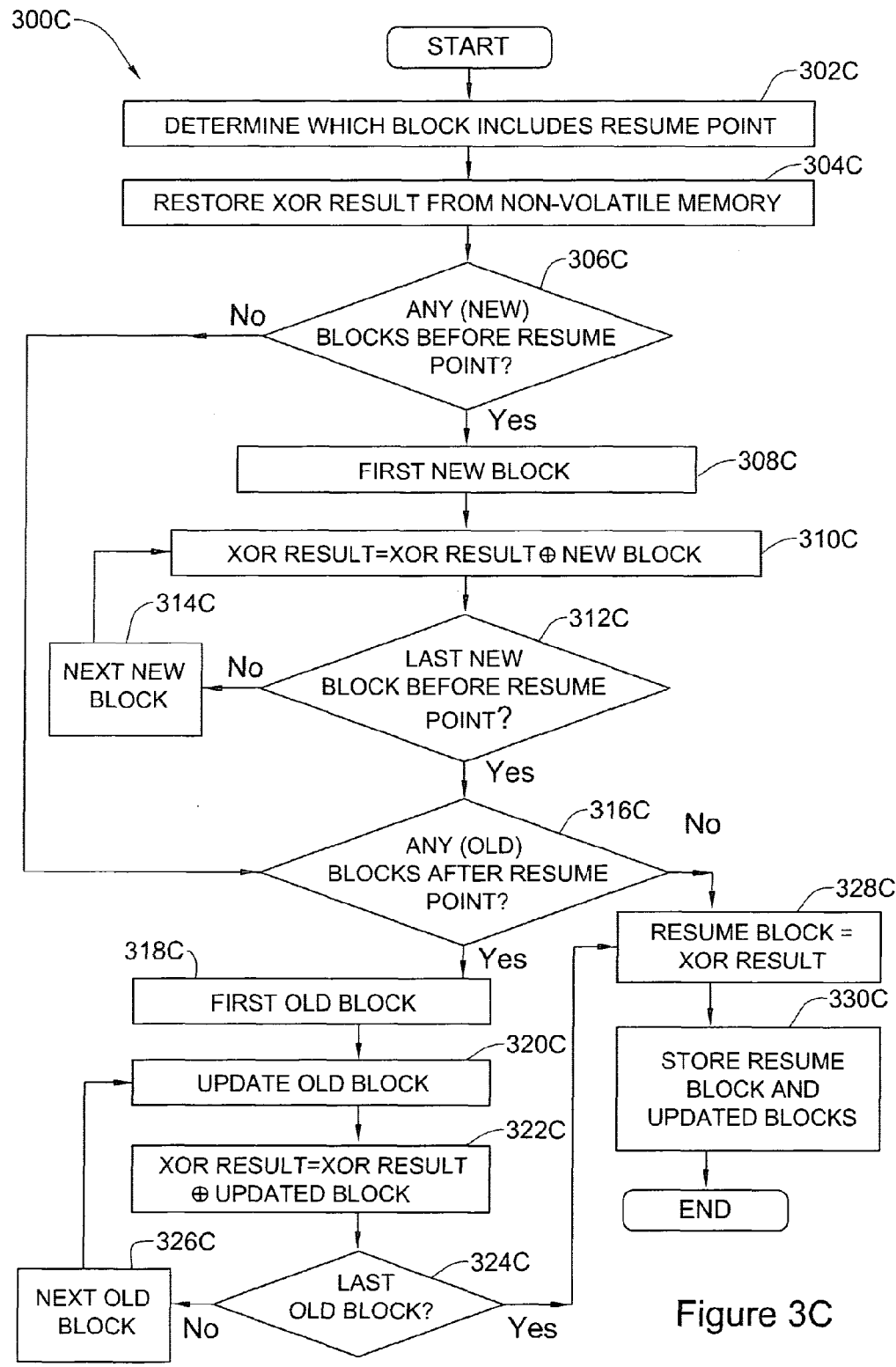
FIG. 3C is a flowchart of a method for resuming the interrupted update method of FIG. 2C, in accordance with an embodiment of the invention.

FIGS. 3A, 3B and 3C illustrate embodiments for computing the resume block, using the error recovery result calculated in methods 200A (FIG. 2A), 200B (FIG. 2B), and 200C (FIG. 2C) respectively, after an interruption which caused volatile memory to be erased and possibly the resume block to be corrupted. Because the resume block includes content which may be corrupted, its content is assumed to be non-reliable and it is recoverable through the usage of the error recovery result, for example as in methods 300A, 300B, or 300C. The content of the other blocks are recoverable without usage of the error recovery result. In stage 302A, 302B and 302C, it is determined which block is the resume block. The resume block may be determined for example as in US Published Application Number 20050216530 to Meller et al, which is incorporated by reference herein.

Referring first to FIG. 3A, in method 300A the updated device computes the original content of the resume block using the error recovery result for original content which was calculated in method 200A, according to an embodiment of the present invention. Assuming that the n blocks in the update sequence contributed to the error recovery result, the resume block may be any block $B_i$ in the update sequence, where $1 \leq i \leq n$. For example, stage 304A illustrates one particular case where $1 \leq i \leq n$, and therefore there are updated (new) blocks $B_1', \ldots, B_{i-1}'$, the possibly corrupted resume block $B_i$, and original (old) blocks $B_{i+1}, \ldots, B_n$.

In stage 306A, the content of each updated block (for example $B_1', \ldots, B_{i-1}'$) is reverted to the original content, for example by applying in reverse the commands in the update package, as explained, e.g., in US Published Application Number 2006004756 to Peleg et al, which is incorporated by reference herein.

In stage 308A, the error recovery result that was computed for original content in method 200A is obtained. For example the error recovery result may be obtained from the update package, from storage, from other non-volatile memory, etc, depending on the embodiment. Stage 308A is not necessarily performed after stage 306A and may be performed at any time prior to the computation of the resume block in stage 310A.

In stage 310A, the (original content of the) resume block is computed by applying an error recovery function go to all the original blocks which contributed to the error recovery result, other than the resume block, and to the error recovery result, F. For example, assuming the n blocks in the update sequence contributed to the error recovery result, the original content of the resume block $B_i = g(B_1, \ldots B_{i-1}, B_{i+1}, \ldots, B_n, F)$, where $(B_1, \ldots B_{i-1}, B_{i+1}, \ldots, B_n)$ and F are operands of the error recovery function g( ). As noted above the error recovery function g( ) applied in FIG. 3A may or may not be identical to the error recovery function f( ) applied in FIG. 2A to obtain the error recovery result.

Method 300B of FIG. 3B illustrates the updated device computing the resume block's updated content using the error recovery result for updated content which was calculated in method 200B, according to an embodiment of the present invention. Assuming that the n blocks in the update sequence contributed to the error recovery result, the resume block may be any block $B_i$ in the update sequence, where $1 \leq i \leq n$. For example, stage 304A illustrates one particular case where $1 \leq i \leq n$, and therefore there are updated (new) blocks $B_1', \ldots, B_{i-1}'$, the possibly corrupted resume block $B_i$, and original (old) blocks $B_{i+1}, \ldots, B_n$.

In stage 306B, the content of each original block (for example $B_{i+1}, \ldots, B_n$) is updated, as explained, e.g., in US Published Application Number 2006004756 to Peleg et al, which is incorporated by reference herein. In stage 308B, the error recovery result for updated content that was computed in method 200B is obtained. For example the error recovery result may be obtained from the update package, from storage, from other non-volatile memory, etc, depending on the embodiment. Stage 308B is not necessarily performed after stage 306B and may be performed at any time prior to the computation of the resume block in stage 310B.

In stage 310B, the (updated content of the) resume block is computed by applying an error recovery function g( ) to all the updated blocks that contributed to the error recovery result, other than the resume block, and to the error recovery result, F. For example, assuming the n blocks in the update sequence contributed to the error recovery result, $B_i' = g(B_1', \ldots, B_{i-1}', B_{i+1}', \ldots, B_n', F)$, where $(B_1', \ldots, B_{i-1}', B_{i+1}', \ldots, B_n')$ and F are operands of the error recovery function g( ). As noted above the error recovery function g( ) applied in FIG. 3B may or may not be identical to the error recovery function f( ) applied in FIG. 2B to obtain the error recovery result.

Refer now to FIG. 3C which is a flowchart of a method 300C for the updated device resuming the update method 200C of FIG. 2C, upon interruption of stage 216C, in accordance with an embodiment of the present invention. In this particular embodiment, the error recovery function go is the XOR function. In the embodiment illustrated in FIG. 3C, the XOR error recovery result reflects updated content and therefore represents a particular case of method 300B. In another embodiment, also described herein, the XOR error recovery result reflects original content and therefore represents a particular case of method 300A.

In stage 302C, it is determined which block is the resume block. In stage 304C, the XOR result which was stored in stage 214C is retrieved from non volatile memory into volatile memory. Assuming that the block with the resume point was not the first block to be written to storage ("yes" to stage 306C), then beginning with one of the previously stored updated (new) blocks (stage 308C), each new block has contents thereof bitwise XOR'ed with the previously calculated XOR result (stage 310C). Therefore each time stage 310C is executed, the XOR result in volatile memory reflects the XOR result of all (for example n) updated (i.e. new) blocks (as retrieved in stage 304C) as well as any of the new blocks already processed in stage 310C. The processing of new blocks continues (stage 314C) until all new blocks have been processed ("yes" to stage 312C).

Assuming that the block with the resume point was not the last block to be written to storage ("yes" to stage 316C), then beginning with a not yet updated (old) block (stage 318C), each old block is updated in volatile memory in stage 320C. In stage 322C the updated contents of each block updated in stage 320C is bitwise XOR'ed with the previously calculated XOR result. Therefore each time stage 322C is executed, the XOR result in volatile memory reflects the XOR result of all (for example n) updated blocks (as retrieved in stage 304C) as well as any blocks already processed in stage 310C or stage 322C. The processing of old blocks continues (stage 326C) until all old blocks have been processed ("yes" to stage 324C). It should be noted that in accordance with method 300C, the block with the resume point is the only one not yet bitwise XOR'ed with the previously calculated XOR result.

In stage 328C, the block with the resume point has contents thereof set to equal the XOR result in volatile memory (i.e. the XOR result in volatile memory at this point contains what is the updated version of the block with the resume point), as will be further illustrated with a simple example below. In stage 330C, the (updated) block with the resume point, as determined in stage 328C, and any blocks updated in stage 320C are written to storage. Method 300C then ends. It should be evident that if method 300C is interrupted one or more times during stage 330C, then after each interruption method 300C may be re-executed beginning with stage 302C and the determination of the block where the current interruption occurred, i.e. with the current resume point.

To further illustrate stage 328C, a simple example is now provided. The example should not be construed as necessarily typical. Assume as above that there are seven blocks to be updated and that the process interrupts when storing block number 5, i.e. at interruption the block with the resume point is block 5, blocks 1-4 in the storage device are new, and blocks 6-7 in the storage device are old. Therefore after processing all new blocks (yes to stage 312C), the XOR result equals:

$B_1 \oplus B_2 \oplus B_3 \oplus B_4 \oplus B_5 \oplus B_6 \oplus B_7 \oplus B_1 \oplus B_2 \oplus B_3 \oplus B_4$ where all the blocks are updated blocks, where the result of $B_1 \oplus B_2 \oplus B_3 \oplus B_4 \oplus B_5 \oplus B_6 \oplus B_7$ was retrieved in stage 304C, and where the XOR'ing a second time of $B_1$, $B_2$, $B_3$, $B_4$ occurred during the iterations of stage 310C.

After processing stage 322C for all updated old blocks (yes to stage 324C), the XOR result equals:

$B_1 \oplus B_2 \oplus B_3 \oplus B_4 \oplus B_5 \oplus B_6 \oplus B_7 \oplus B_1 \oplus B_2 \oplus B_3 \oplus B_4 \oplus B_6 \oplus B_7$, where all the blocks are updated blocks, where the result of $B_1 \oplus B_2 \oplus B_3 \oplus B_4 \oplus B_5 \oplus B_6 \oplus B_7$ was retrieved in stage 304C, where the XOR'ing a second time of $B_1$, $B_2$, $B_3$, $B_4$ occurred during the iterations of stage 310C, and where the XOR'ing a second time of $B_6$ and $B_7$ occurred during the iterations of stage 322C. Note that there is no second XOR'ing of $B_5$ (the resume block)

Based on the XOR properties explained above, an equivalent expression prior to stage 328C would be $(B_1 \oplus B_1) \oplus (B_2 \oplus B_2) \oplus (B_3 \oplus B_3) \oplus (B_4 \oplus B_4) \oplus (B_6 \oplus B_6) \oplus (B_7 \oplus B_7) \oplus B_5$ The bitwise XOR'ing of each block with itself results in zero since any bit XOR'ed with itself results in zero. Therefore each parenthesis reduces to zero. What remains as the XOR result is $B_5$ (the updated version of the block with the resume point) XOR'ed with zeros which results in the XOR result being identical with the contents of $B_5$ (since as explained above if a bit with a value of x (x=0 or 1) is XOR'ed with a bit "0", the same value of x results). Based on this simple example, it should be evident that the contents of the (updated) resume block can be set to equal the contents of the XOR result in volatile memory in stage 328C, regardless of the number of blocks updated by the update package.

In another embodiment, the original version (i.e. original content) of each block to be updated is bitwise XOR'ed and the XOR result is stored. In this case, if there is an interruption during the storage of the updated blocks, the stored XOR result is restored to volatile memory. In addition, any block which had already been updated is restored in volatile memory to the original content thereof by applying in reverse the commands in the update package. In this embodiment as part of the resumption process, all blocks (in the original version) except for the resume block are XOR'ed with the XOR result (restored from non-volatile memory to volatile memory), and once all the original blocks have been XOR'ed during the resumption process, the original version (i.e. original content) of the resume block may be set to equal the content of the volatile XOR result. The update package is then applied beginning with the resume block to all blocks remaining in the update sequence, and the updated blocks which remained in the update sequence are written to storage beginning with the resume block.

The reader will recognize that some of the embodiments described above with respect to FIGS. 2A, 2B, 2C, 3A, 3B and 3C provide for a usage of error recovery functions, f( ) and g( ) which allow the determination (i.e. recovery) of data relating to the update process, which would otherwise have been lost and/or suspect upon interruption. In the description of some embodiments relating to FIGS. 2A, 2B, 2C, 3A, 3B, and 3C, the determined data is the original or updated content of the resume block which is being updated in accordance with the update package, however the invention is not limited to this type of data nor limited to data of any particular type. For example further below, with respect to FIG. 8 will be described other embodiments where data related to the update process, which would otherwise have been lost and/or suspect upon interruption, can be determined (i.e. recovered) through the usage of an error recovery function (in FIG. 8—the XOR function).

In some implementations of the update process, it may be preferable to provide a protection buffer (AKA backup buffer) in volatile memory and/or in non-volatile storage which contains segments of content and thus protects those segments during the update process.

In some cases, the usage of the protection buffer allows a smaller update package to be generated and provided to the updated device. It will now be explained some examples of usage of such a protection buffer.

For example, in some embodiments original content is protected (e.g., by storing a copy thereof in a protection buffer) before overwriting it with content of another segment. However, this in non-limiting and there are other circumstances where protection of original content is required in some embodiments. For example, the content of a segment (or a portion thereof) is sometimes modified during update. Yet, there may be other segments whose update requires the original content of the modified segment. For example, an original segment ("segment A") originally contains a number (such as 2), wherein the updated content thereof contains a different number (such as 4). The size of the updated content in this case stays similar to that of the original content. However, there may be another segment or portion thereof ("segment B") whose update requires, e.g., to add the value contained in the original segment A to a number contained in the original segment B, wherein the result of the addition is contained in the updated segment B. Even though the position of the updated segment A (or the portion storing the number in it) is kept similar to the position of the original segment A, indeed its content is changed (the original 2 is replaced by 4). Thus, by updating segment B after updating segment A, the update process must avoid using the updated content of segment A. This can be done by storing the original content of segment A in the protection buffer (or in the update package), thus protecting the original content of segment A.

Figure 4A:
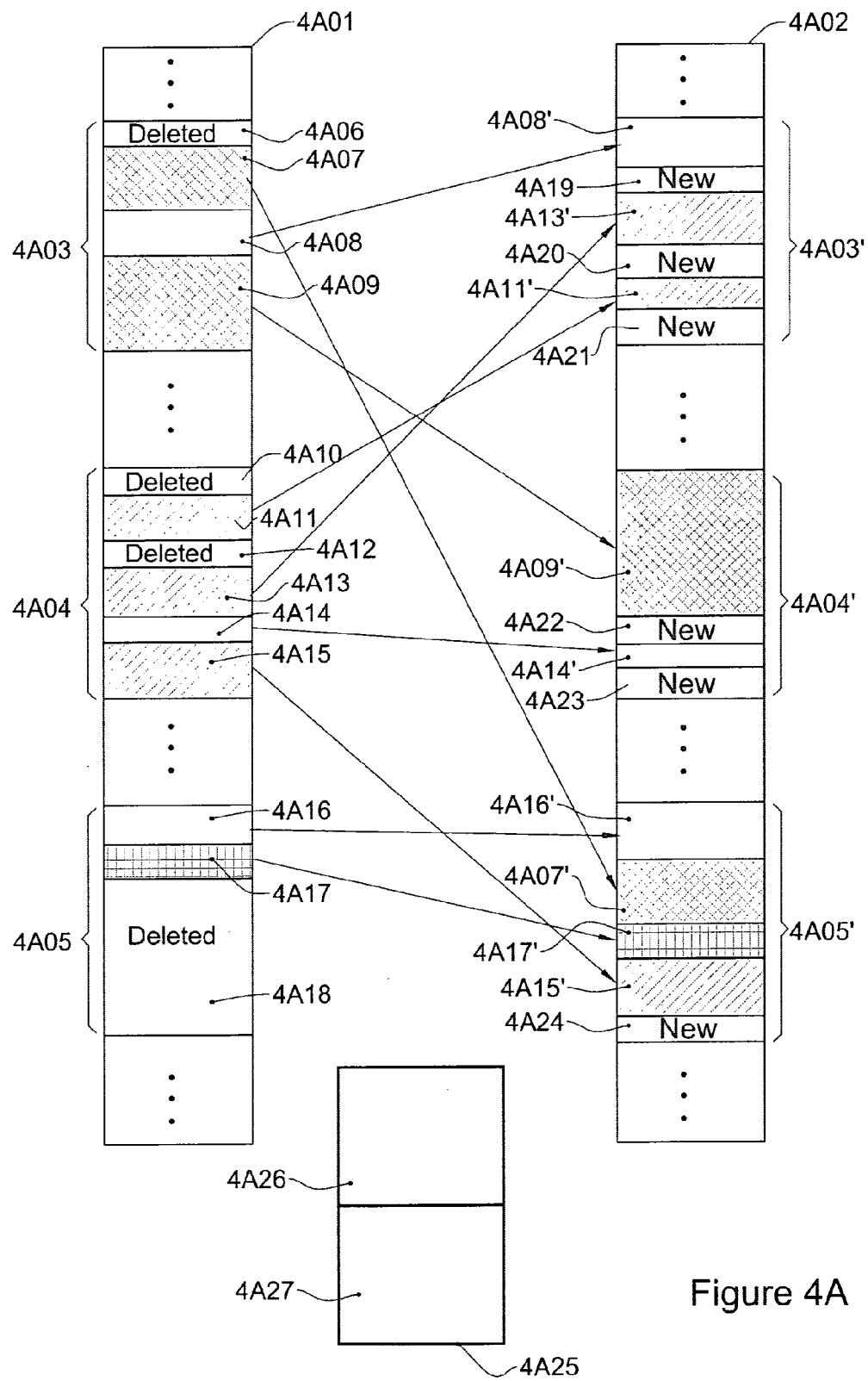
FIG. 4A is a schematic illustration of an example of an original version, and the updated version thereof.

FIG. 4A is a schematic illustration of another example of an original version 4A01, and an updated version 4A02 thereof. It should be appreciated that the updated version 4A02 occupies basically the same blocks in the storage device previously occupied by the original version 4A01. The original version 4A01 occupies at least three storage blocks, specifically referenced as 4A03, 4A04 and 4A05. The updated version 4A02 occupies at least the same blocks. However, in order to differentiate between original and updated content, 4A03' denotes block 4A03 when updated content is stored therein; 4A04' denotes block 4A04 when updated content is stored therein; and 4A05' denoted block 4A05 when updated content is stored therein.

The block 4A03 includes four segments: 4A06, 4A07, 4A08 and 4A09; The block 4A04 includes six segments: 4A10, 4A11, 4A12, 4A13, 4A14 and 4A15; and the block 4A05 includes three segments: 4A16, 4A17 and 4A18.

During update, the content stored in segment 4A06 is deleted and thus it has no corresponding segment in the updated version 4A02. Other deleted segments are 4A10, 4A12 and 4A18. Furthermore, the content stored in segment 4A07 is moved (copied) to block 4A05', thus generating segment 4A07'. The content stored in segment 4A08 is left in block 4A03', constituting segment 4A08', but as segment 4A06 is deleted, the segment 4A08' (or at least part thereof) now occupies addresses in the block that previously were occupied by the content of 4A06, or in other words, it becomes the first segment in the block, which belongs to the updated version 4A02. The content stored in segment 4A09 is copied from block 4A03 to block 4A04', constituting segment 4A09' therein. It is noted that the segments 4A07', 4A08' and 4A09' are segments in the updated version that correspond to segments 4A07, 4A08 and 4A09, respectively.

The content of segments 4A11 and 4A13 are copied to block 4A03', generating the corresponding segments 4A11' and 4A13' therein, respectively. Yet, in the original version segment 4A11 precedes segment 4A13, while in the updated version 4A02 their respective order changes and segment 4A13' precedes segment 4A11'. In addition, content is inserted into three new segments (4A19, 4A20 and 4A21) in block 4A03', and it is noted that none of these new segments (4A19, 4A20 and 4A21) correspond to segments in the original version. Similarly, content is inserted into two new segments (4A22 and 4A23) in block 4A04' and into one new segment (4A24) in block 4A05'. Neither 4A22, 4A23 nor 4A24 correspond to segments in the original version.

The content stored in segment 4A14 of block 4A04 is left in the same block 4A04', giving rise to the corresponding segment 4A14', and the content stored in segment 4A15 of the same block (4A04) is moved (copied) into block 4A05', constituting segment 4A15'.

The segment 4A16 of block 4A05 corresponds to segment 4A16' in block 4A05'. Similarly to the segment 4A16, which is the first segment in the block 4A05 being part of the original version 4A01, the segment 4A16' is the first segment in block 4A05' being part of the updated version 4A02. However, it is noted that the updated content of segment 4A16' is not necessarily identical to original content stored in segment 4A16, and in this case the size of the updated content of 4A16' is larger than the size of the original content of 4A16. For example, an update command can insert one or more zeros (0's) along the content of the updated segment. Such a command could, for example, insert a hundred zeros after each original thousand bytes. The update command allowing updating the content of 4A16 to the content of 4A16' can be indicative of any other transforming operation, such as "convert lower case characters to lower case character" etc. The segment 4A17 of block 4A05 corresponds to segment 4A17' of block 4A05', but their physical positions in the block are different.

Although not specifically noted before, there may exist additional corresponding segments, such as 4A14 and 4A14', whose physical position within their respective blocks have changed.

It is noted that according to this example there is a protection buffer 4A25 available for the update process. As the size of a protection buffer is not limited by the invention, in the present example of FIG. 4A the protection buffer size is two storage blocks wherein one storage block is referenced as 4A26 and the other as 4A27. Yet, it is noted that this is a non limiting example, and the protection buffer can be of any size.

Embodiments of the invention are adapted to storage devices including blocks, wherein writing updated content into a block affects other content stored therein. Hence, as of access efficiency considerations, it is possible to group together update commands writing content into a specific block, operating in accordance therewith, before operating in accordance with update commands writing content into a different block. In the present example of FIG. 4A, the update process updates block 4A05', then block 4A04' and then block 4A03'.

Yet, in volatile memory such as RAM (Random Access Memory) there is no such limitation relating to storing content in segments of the same block. RAM includes no blocks and hence, content written to the RAM does not affect other content written therein. For example, there is no requirement to erase content stored in a block before writing any piece of content (e.g., a segment) thereto and similarly, there is no requirement to write the complete content of a block during one write operation. Hence, it is possible to generate a copy of an updated block in RAM, one segment after the other (operating in accordance with the update commands), then writing the content of the complete block into the block in the storage device including blocks. In addition, there is no special importance to the order of the update commands relating to one updated block, as long as access efficiency is considered.

That is, the update package includes the commands "insert 4A24", then "copy 4A15 to 4A15'", followed by "copy 4A17 to 4A17'", "copy 4A07 to 4A07'", and "update 4A16 to yield 4A16'". Yet, as for access efficiency considerations, this is equivalent to "copy 4A17 to 4A17'", followed by "update 4A16 to yield 4A16'", "copy 4A15 to 4A15'", "copy 4A07 to 4A07'" and "insert 4A24".

It was noted, with reference to FIG. 4A, that the original content stored in segment 4A13 is required for updating segment 4A13' in block 4A03'. Considering the update sequence, it is appreciated that block 4A03' is updated further to updating block 4A04'. That is, the content of the updated block 4A03' (including segment 4A13') is not yet generated while the update process operates in accordance with the update command "copy 4A09 to 4A09'", overwriting the original content of segment 4A13 (or at least a portion thereof). Therefore, it is appreciated, that upon reaching the "copy 4A13 to 4A13'" command, the content stored in segment 4A13 will already be updated content being part of segment 4A09', and not the original content of 4A13. Hence, the "updated" content to be stored in 4A13', in this case, would not be the expected content (it would not be a copy of the original content of 4A13). In order to avoid this error, the original content stored in 4A13 needs to be protected (e.g., in the protection buffer) before overwriting it with segment 4A09'.

Understanding this, it is possible to determine that before overwriting original content stored in a segment, this original content should be protected if it is required for at least one update command yielding updated content to be stored in a block further in the update sequence.

It was also noted with reference to FIG. 4A, that the content of segment 4A17 is copied into segment 4A17' of the same block (4A05). 4A17' appears to precede 4A17, i.e., the updated content of 4A17' does not overwrite the original content of 4A17. Hence, it appears, prima facie, that the original content of 5A17 is implicitly protected by 4A17', and this original content does not require explicit protection (e.g., in a protection buffer). However, in those cases when the updated device has a storage device including blocks, such as flash memory, it is appreciated that usually a copy of the updated content is generated, in volatile memory e.g., in RAM (Random Access Memory), and after completing the updated content generation of the whole updated block (4A05' in this case), the updated content is copied from the RAM to the updated block 4A05' further to deleting the content of original 4A05. It is appreciated thus that while overwriting the original content of 4A05 with the updated content of 4A05', if the writing operation fails further to success of the delete operation, the original content of 4A17 will be lost, regardless of the fact that it is not overwritten by 4A17'. Therefore it should be noted that protection is required also for purpose of reliability, in those cases when the content of the original segment is required to update the content of a corresponding updated segment in the same block.

On the other hand, segment 4A15 is copied into segment 4A15' of block 4A05'. This is done while updating block 4A05', i.e., before updating blocks 4A04' and 4A03'. Hence, it can be appreciated that upon updating block 4A04' and overwriting the original content of 4A15 with the updated content of segments 4A23, 4A14' and possibly also 4A22, the original content of 4A15 has already been copied into 4A15', which is in a block preceding 4A04' in the update sequence. Therefore, in the example of FIG. 4A there is no need to explicitly protect the original content of 4A15.

Even further, if in the example there was an additional update command copying the original content of 4A15 into a corresponding segment in block 4A03', in addition to the presently existing copy command, copying the content of 4A15 into 4A15' in block 4A05' (it is noted that block 4A03' follows block 4A05' in the update sequence), there would still be no requirement to explicitly protect the content of 4A05. Although block 4A03' follows block 4A04' in the update sequence, hence overwriting the original content of 4A15 before updating block 4A03', it is possible to use the content stored in 4A15' instead of a copy thereof explicitly stored in the protection buffer.

Hence, there is no requirement to explicitly protect content of a segment if there is at least one update command copying the content thereof in a block that precedes the original block of the original segment in the update sequence.

Understanding that, it is appreciated that in block 4A05 the segments 4A16 and 4A17, or portions thereof, require protection. In block 4A04, the segments 4A11, 4A13 and 4A14, or portions thereof require protection, while in 4A03 it is 4A08, or a portion thereof that requires protection.

It is noted that the example of FIG. 4A is non-limiting. In the example the update package allows the update process to update the original version 4A01 to the updated version 4A02, while first executing update commands for updating block 4A05', then update commands for updating block 4A04' and then update commands for updating block 4A03'. Alternatively, after updating block 4A05' it is possible to update 4A03' and finally block 4A04'. It is still possible to update block 4A04' first, followed by block 4A03' and 4A05' etc. It should be noted that according to this example there are six different update sequences allowed. Generally, there are n! possible update sequences, wherein n is the number of blocks that include modified data being part of the new version. All these n! update sequences give rise to the same updated version. An "update sequence" or "update order" is the order in accordance with which blocks of the updated version are updated (or written).

According to some embodiments of the invention, an operating environment of an updated device can be pre-configured to allocate one or more areas in volatile and/or non-volatile memory that are used for backup and/or protection purposes of operations performed by any software executed by the device. Updating content is one example for such an operation. Such an area is the "protection buffer". According to one embodiment it is possible to protect original content of a segment by storing a copy thereof in a protection buffer in volatile memory and/or in the storage device thus reducing the size of the update package, compared to a package storing content of protected segments therein.

According to another embodiment, content of more than one segment (or one or more portions thereof) can be stored in the protection buffer. It is noted that if after storing portions the protection buffer includes unused area, it is possible to use this unused area for storing copies of content stored in additional segments requiring protection (or portions thereof). That is, it is possible to store segments or portions thereof in the protection buffer, instead of copying complete blocks thereto.

When discussing the examples of FIGS. 4B and 4C below, instead of splitting the segments to sub-segments/portions in order to keep the description as simple as possible, reference will be made to the complete "original" segments. For example, it appears from FIG. 4A that 4A17 should be split into two portions or sub-segments; one is overwritten be the updated content of segment 4A16' and the other by the updated content of segment 4A07'. Yet, the description below refers to protecting the original content of the complete segment 4A07.

Figure 4B:
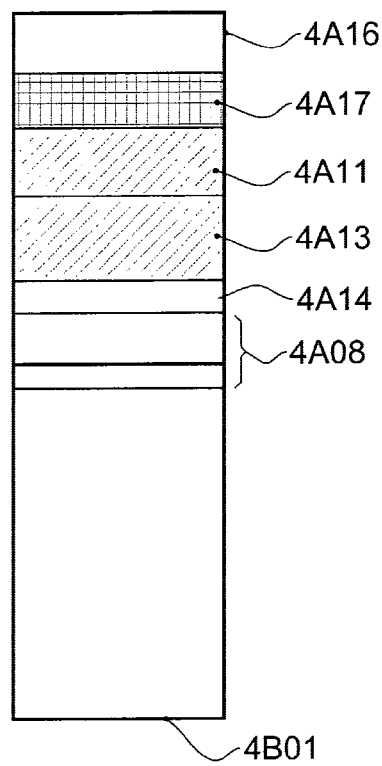
FIG. 4B is a schematic illustration of a protection buffer used while updating the original version of FIG. 4A to the updated version thereof, in accordance with an embodiment of the invention.

FIG. 4B is a schematic illustration of a protection buffer 4B01 used while updating the original version of FIG. 4A to the updated version thereof, in accordance with one embodiment of the invention. In this example the size of the protection buffer 4B01 is two storage blocks, as is the case with the protection buffer 4A25 of FIG. 4A, however, this is non-limiting and the protection buffer can be of any applicable size. It is noted that when the update process begins operating, the protection buffer is empty, or in other words, the size of the unused area thereof is similar to the size of the protection buffer.

In the current example the selected update sequence is 4A05', 4A04' and then 4A03'. Thus, when updating the original content of block 4A05' (which means overwriting the original content stored in 4A05), the original content of segment 4A16 requires protection. The size of segment 4A16 is smaller than the size of the protection buffer, and therefore the original content of segment 4A16 is copied thereto.

The segment 4A17 also requires protection. Because the size of segment 4A17 is smaller than the unused area of the protection buffer, the original content of segment 4A17 can also be copied thereto. Now, when all the segments of 4A05 that require protection are protected, the content stored in block 4A05 can be safely overwritten by the updated content of 4A05' (that is, by the updated content of segments 4A16', 4A07', 4A17', 4A15' and 4A24). As already explained, copying original content into the protection buffer provides protection to segments as and/or reliability of the update process.

Furthermore, before updating block 4A04' (thus overwriting the original content stored in 4A04), and as long as there is unused area in the protection buffer, the original content of the segments 4A11, 4A13 and 4A14 is copied thereto, while there is no need to further protect the original content of segment 4A15, and therefore its content is not copied to the protection buffer (4A15 is implicitly protected by 4A15', as was previously explained with reference to FIG. 4A). In addition, before updating block 4A03', and as long as there is sufficient unused area in the protection buffer, the original content of 4A08 should also be copied thereto.

It is noted though that now the used area of the protection buffer 4B01 is a little larger than the size of one storage block. If the size of the protection buffer would have been only one storage block, thus, there would not have been enough unused area to store the copy of segment 4A08 therein. When the protection buffer does not have sufficient unused area for protecting all segments requiring protection, their content needs to be backed up in alternative storage areas, such as the update package itself as described in U.S. Pat. No. 6,018,747.

Figure 4C:
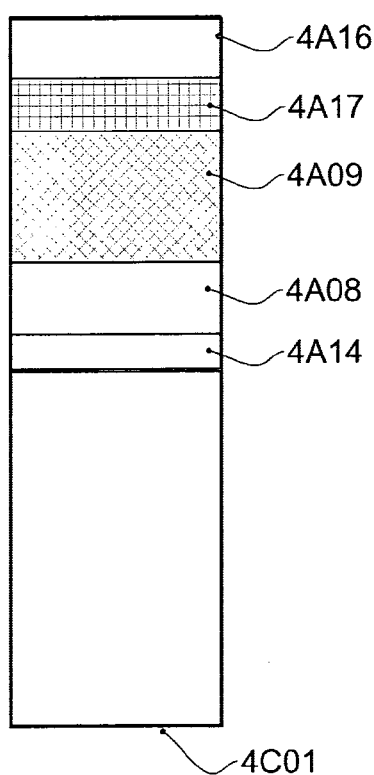
FIG. 4C is a schematic illustration of a protection buffer used while updating the original version of FIG. 4A to the updated version thereof, in accordance with another embodiment of the invention.

FIG. 4C is a schematic illustration of a protection buffer 4C01 used while updating the original version of FIG. 4A to the updated version thereof, in accordance with another embodiment of the invention. According to this embodiment the update sequence is selected in order to reduce the number of protection operations or the area used by protected content. For example, the usage of the protection buffer 4C01 illustrates the protection operations required when the update sequence is 4A05', 4A03' and finally 4A04'. As was previously explained with reference to FIG. 4B the original content of segments 4A16 and 4A17 is copied into the protection buffer before overwriting them with the updated content of block 4A05'. Before updating block 4A03', and with reference to the disclosure of FIG. 4B, it should be appreciated that the segment 4A07 does not require protection. Hence, the content of segments 4A08 and 4A09 that needs protection, is copied into the unused area of the protection buffer 4C01 without copying the content of 4A07.

Now, turning to block 4A04', it should be understood that the segments 4A11, 4A13 and 4A15 do not require explicit protection, as their content was copied before to blocks 4A03' and 4A05' (their original content is implicitly protected). The only original content in block 4A04 that requires protection is the original content stored in segment 4A14, and therefore this content is copied into the unused area of the protection buffer 4C01.

By comparing the usage of the protection buffer 4B01 with that of the protection buffer 4C01 it is possible to see that the protection buffer 4C01 includes content of fewer segments compared to the protection buffer 4B01 (five segments in 4C01, unlike six segments in 4B01). A person versed in the art would appreciate that this reduction in the number of protected portions results due to the implicit protection of three segments (4A11, 4A13 and 4A15) achieved by updating block 4A03' before block 4A04'.

In addition, it is noted that the used area of the protection buffer 4C01, after protecting required original content of segments in all three blocks is smaller than the used area of the protection buffer 4B01. Again, this is due to having larger segments implicitly protected by selecting the abovementioned update sequence (4A05', 4A03' and then 4A04').

Generally, thus, by selecting a certain update sequence it may be possible to reduce the number of segments requiring protection and/or the time during which segments are required to be protected in the protection buffer.

In the example of FIG. 4A, e.g., segment 4A09 is required for updating block 4A04'. If the update sequence determines that block 4A03' should be updated before block 4A04', then the original content of segment 4A09 should be copied into the protection buffer. It is possible (although not shown in the figure) that between updating blocks 4A03' and 4A04' other blocks (additional blocks that not illustrated) are updated, while 4A04' is the last block updated in accordance with the update sequence. In such a case it should be appreciated that it is required to keep the protected content of segment 4A09 in the protection buffer until block 4A04' is updated, or in other words, almost until the end of the update process. During all this time the protected content of segment 4A09 occupies area of the protection buffer.

However, it is possible to modify the update sequence in this case, updating block 4A04' before the other segments. It was already noted that if 4A09' includes content identical to the content of 4A09 it can be used as implicit protection thereof, and therefore in this case it would be possible to free (or reuse) the area of the protection buffer occupied by the protected content of 4A09 after updating block 4A04'.

Yet, even in those cases when the content of 4A09' is different from the content of 4A09, it is still possible to select an update sequence that allows updating the blocks whose update depends on the original content of 4A09 before updating the rest of the blocks, thus allowing release or reuse of the area in the protection buffer previously occupied by the protected copy of the original content of 4A09.

As was noted above, it is possible in some embodiments to split a segment into several sub-segments (i.e. portions), for example if only part of a segment presents a conflict and/or for any other reason. Then the update commands may be adapted to correspond to the sub-segments. In other embodiments, a segment may not be split. For example in some of these embodiments, even if there is a possible reason to split, for example only part of a segment presents a conflict, the segment may be retained as is. Realizing this, it is noted that hereinafter, the referral to a segment may refer to a segment which has not been split or to a segment which has been split out of another segment.

Before proceeding with the description of an embodiment for determining an update sequence, it should be noted that "Size" of a segment is the number of bytes occupied by the segment. However, this is non-limiting and it is possible to measure the size of a segment by any other applicable measure, such as bits, words, etc.

In addition, every original block has a dependency value, denoted as DEP(block). The original segments of a block B that correspond to updated segments in the updated version constitute "original corresponding segments". Understanding that the segments in an old block that potentially require protection are original corresponding segments, the dependency value of a block is determined as the total size of all the original corresponding segments included therein. Initially the DEP value of a block is given by Equation 1.

$$DEP(B_i) = \sum_{j=1}^{m} \text{Size}(CS_j) \qquad \text{Equation 1}$$

Wherein:

$B_i$ is an i'th block in a storage device (it is noted that blocks mentioned herein are updated blocks, i.e., blocks whose original content is overwritten by updated content, while it is unnecessary to protect content stored in those blocks that are not updated);

m is the number of original corresponding segments in a block that potentially require protection (m>=0); and $CS_j$ is an original (corresponding) segment in $B_i$ that corresponds to an updated segment, wherein j=1, 2, . . . , m.

If m=0 then there are no original corresponding segments in $B_i$, and therefore $DEP(B_i)$=0.

For example, in FIG. 4A, the initial dependency of block 4A04 is:

DEP(4A04)=size(4A11)+size(4A13)+size(4A14)+ size(4A15)

Figure 5:
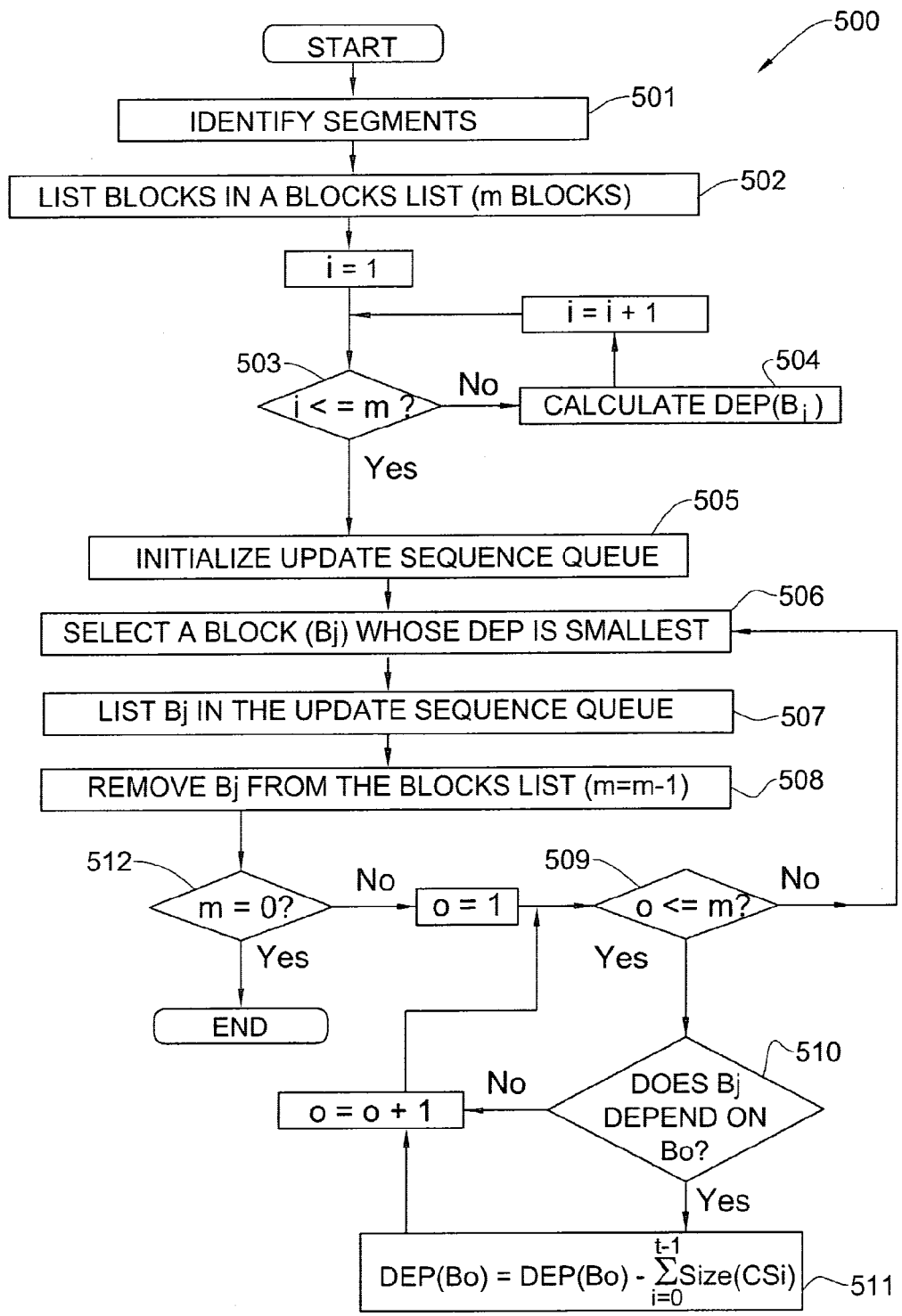
FIG. 5 is a flowchart illustrating in detail one embodiment for determining an update sequence.

FIG. 5 is a flowchart illustrating in detail a method 500 for determining an update sequence, according to an embodiment of the current invention. It is noted that an update sequence determined by the illustrated embodiment may allow in some cases a reduction of the area or space occupied by protected content. It should also be understood that being the order in accordance with which the updated blocks are updated in the storage device, an update sequence is always determined in connection with an update package (as it is the update package that determines the update sequence in accordance with which the update process operates).

In 501 an update package is analyzed in order to identify corresponding segments, e.g., by identifying original segments whose content is copied into segments of the updated version and/or updated segments whose content is calculated based on content of original segments etc. It is noted that non-corresponding segments included in the updated version (i.e., segments that have no correspondence with segments in the original version), such as new content that is inserted into the updated version without any correspondence to the original version, does not necessarily affect the update sequence. Alternatively, the corresponding segments can be pre-identified in which case 501 can be skipped.

In addition, a pre-prepared update package is not a prerequisite. If there is no pre-prepared update package, it is possible to generate one, for example, by utilizing a diff tool as is known in the art or by any other way such as by the methods described in U.S. Pat. No. 6,546,552, WO 2004/114130 or WO 2005/003963.

In 502 all the n blocks in the storage device that include updated content being part of the updated version (i.e. all n blocks which will be part of the update sequence) are listed in a list denoted "blocks list", wherein m is the number of listed blocks. For every block i (i=1, 2, . . . , m) in the list (see 503) $DEP(B_i)$ is calculated (in 504).

According to the illustrated embodiment, blocks will be listed in an "update sequence queue", wherein the block whose dependency (DEP) is lowest will be inserted thereto first (and therefore it will be the first to be retrieved). Thus, in 505 an empty queue is initialized. Yet, this embodiment is non-limiting and other data structures, such as a stack, can be used as well, as can be appreciated by those having skills in the art. The first block to be updated in accordance with the update sequence, i.e., the first block to be pushed into the update sequence queue, is the block whose DEP is lowest.

In 506 the block in the blocks list whose DEP value is the smallest is selected. It is noted that if there are several (more then one) blocks with the same smallest DEP value, then one of them is selected, e.g., according to the smallest i. The selected block is denoted $B_j$. In 507 $B_j$ is pushed into the update sequence queue and in 508 it is removed from the blocks list. Then, in 512, if the blocks list is empty (m=0), process 500 terminates.

It was already explained that it is possible that $B_j$ depends on other blocks. That is, there are possibly updated segments in $B_j$ (or more specifically, in the updated version of $B_j$) whose corresponding original segments are in other original blocks in the storage device. For each such other block $B_o$ that is still listed in the blocks list, segments corresponding to segments in the updated version of $B_j$ are identified (it is possible to recognize the segments according to the start and end addresses of the other blocks listed in the blocks list) and their size is reduced from DEP ($B_o$).

In order to do so, each block $B_o$ still listed in the blocks list (see 509 and 510) is tested to see whether $B_j$ depends on it or not (i.e., whether the updated content stored in $B_j$ includes a segment whose corresponding source segment is in the old version of that block $B_o$). If $B_j$ depends on the tested block $B_o$, in 511 the depending segments are identified and their total size is reduced from the dependency value (DEP) of the tested block $B_o$. That is, if there are t updated segments in $B_j$ that correspond to old segments in $B_o$, $$DEP(B_o) = DEP(B_o) - \sum_{i=0}^{t-1} \text{Size}(CS_i) \qquad \text{Equation 2}$$

Wherein:

$B_o$ is a block in the blocks list (not yet in the update list) on which $B_j$ depends;

t is the number of original corresponding segments (CS) in $B_o$ that correspond to updated segments in $B_j$ (t>=1); and $CS_i$ is an original (corresponding) segment in $B_o$. that corresponds to the updated segment in $B_j$ After the DEP values have potentially been modified at 511 the next block having the smallest dependency value is selected (506) and the process repeats itself, until the blocks list is found to be empty (then, it is appreciated that m=0).

Upon termination, the update sequence queue represents the determined update sequence. It should be noted that according to one embodiment the update package can be re-arranged to reflect the update sequence. Alternatively it is possible to associate the update sequence, or more accurately, a representation thereof, with the update package. A representation of the update sequence can be, for example, by sorting and storing the update commands in the update package according to their target segments addresses, in accordance with the update sequence.

It is appreciated that the illustrated method 500 assumes that any segment CS for block $B_o$ which is required to update block $B_j$ is not required to update other blocks. However in an embodiment where any particular segment of $B_o$ may be required to update other blocks in addition to $B_j$, equation 2 can be modified so that the size of a particular CS is only subtracted from the DEP of $B_o$ if all dependent blocks which require the particular CS are prior to $B_o$. For example, stage 510 can be modified to ask "Is $B_j$ the latest block in the update sequence which depends on $B_o$ for the particular CS?". In another embodiment where any particular segment of $B_o$ may be required to update other blocks in addition to $B_j$, equation 2 can be modified so that the size of a particular CS is only subtracted from the DEP of $B_o$ if $B_j$ is the earliest dependent block in the update sequence to require the particular CS. For example, stage 510 can be modified to ask "Is $B_j$ the earliest block in the update sequence that depends on $B_o$ for the particular CS?". This other embodiment for example may assume that any dependent blocks which are later in the update sequence than $B_j$ can determine the particular CS from the updated content of $B_j$.

In one embodiment, a particular CS required to update more than one command is counted and copied for every command which requires the CS for updating. In another embodiment, there may be one copy of the particular CS and a reference counter. In this case, a segment stored in a protection buffer (as described further below) becomes free when the corresponding reference counter has counted down to zero.

Figure 6A:
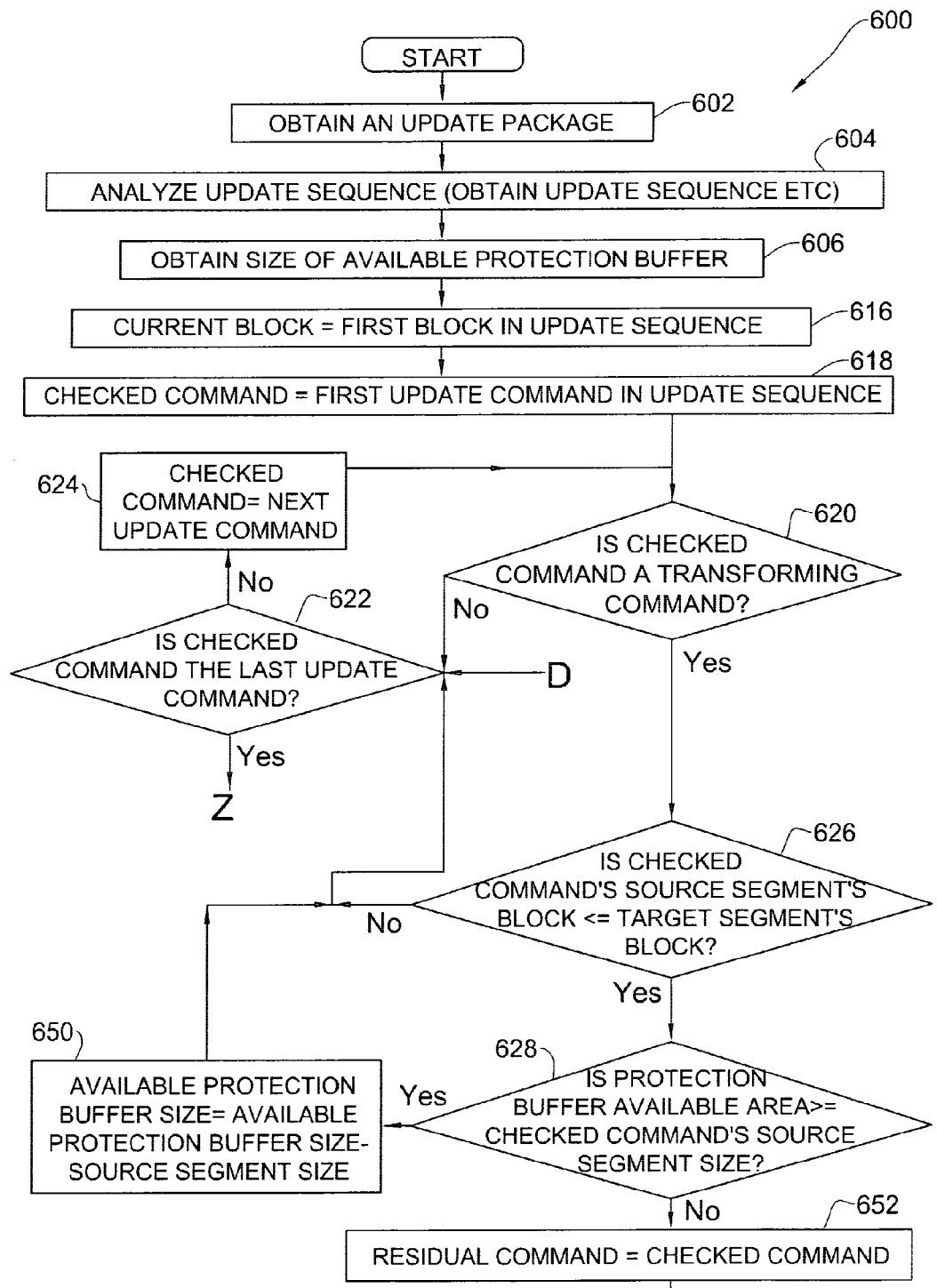
FIG. 6 (including, FIGS. 6A, 6B, and 6C) is a flowchart of a method for generating an update package, in accordance with an embodiment of the invention.
Figure 6B:
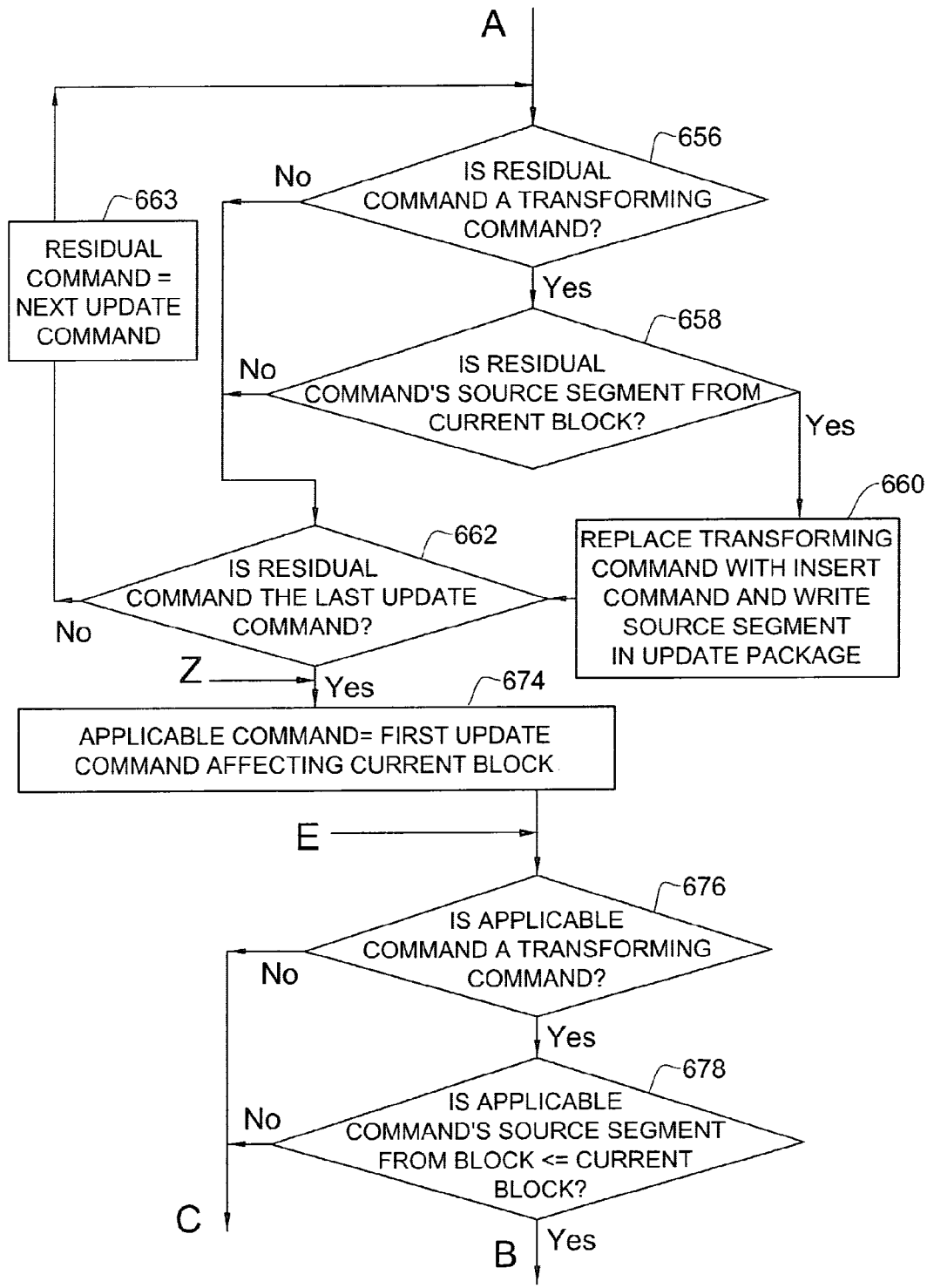
Figure 6C:
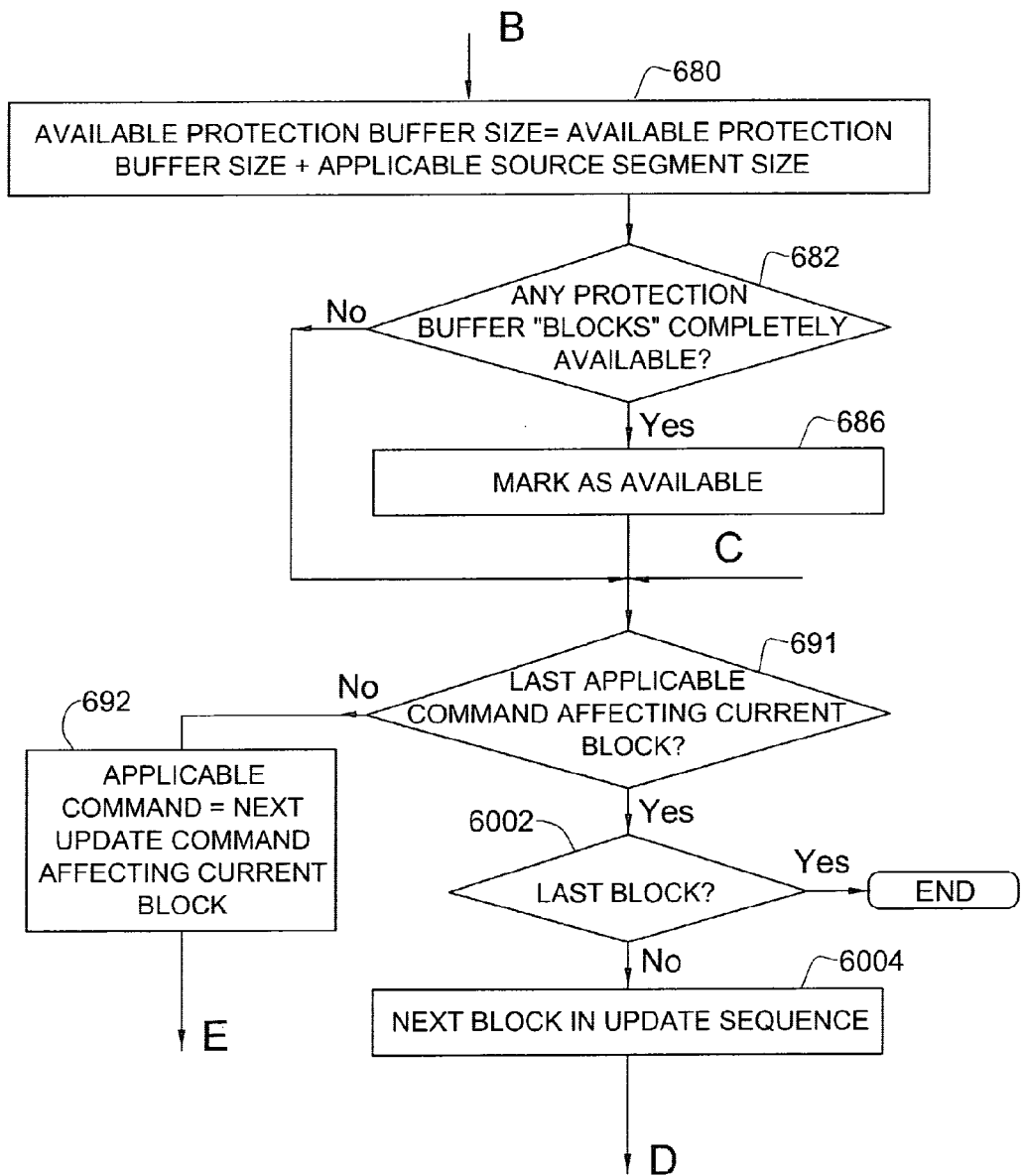
Figure 7A:
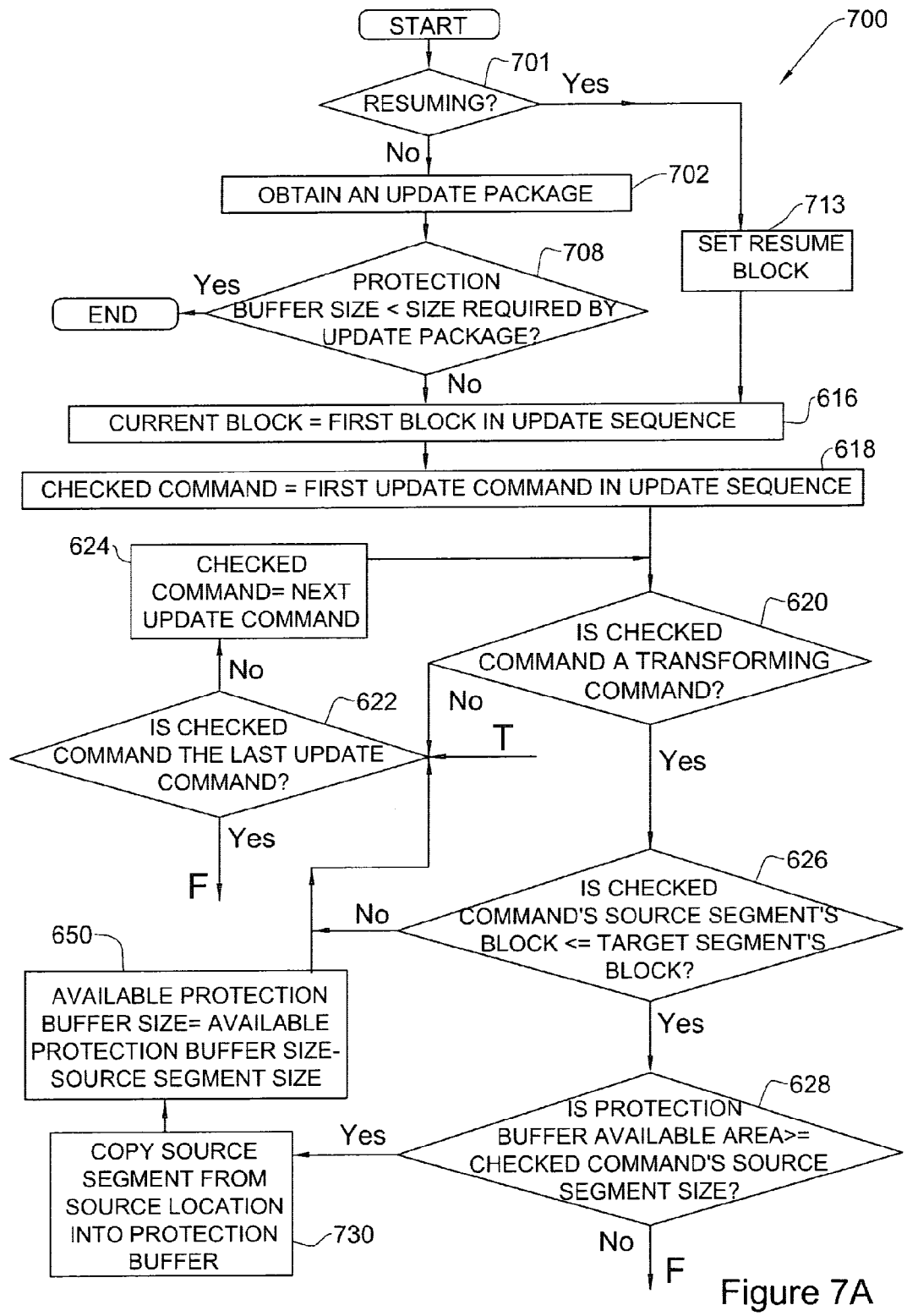
FIG. 7 (including FIGS. 7A, 7B, and 7C) is a flowchart of a method for reliably updating an original version to an updated version thereof, in accordance with another embodiment of the invention.
Figure 7B:
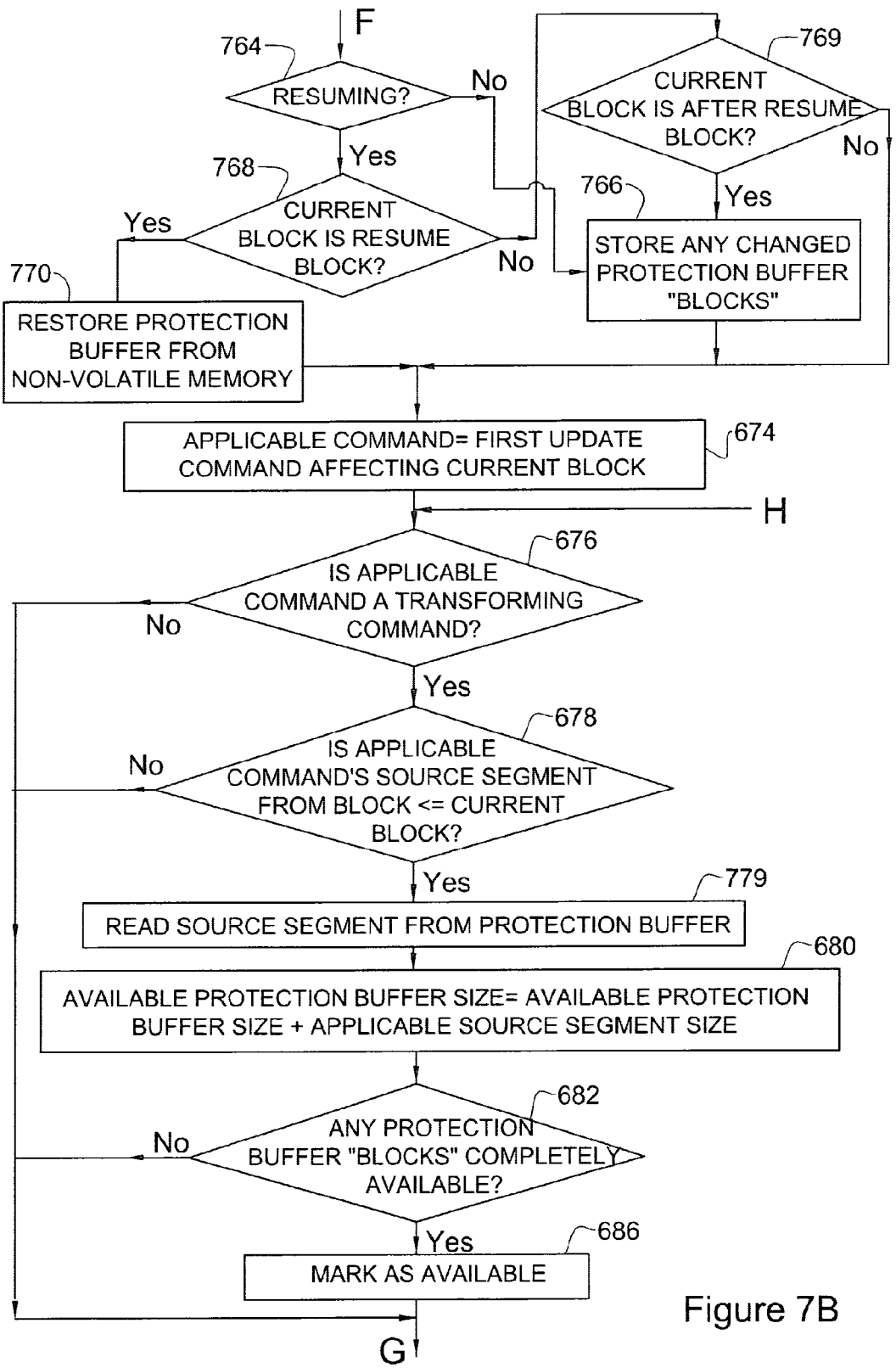
Figure 7C:
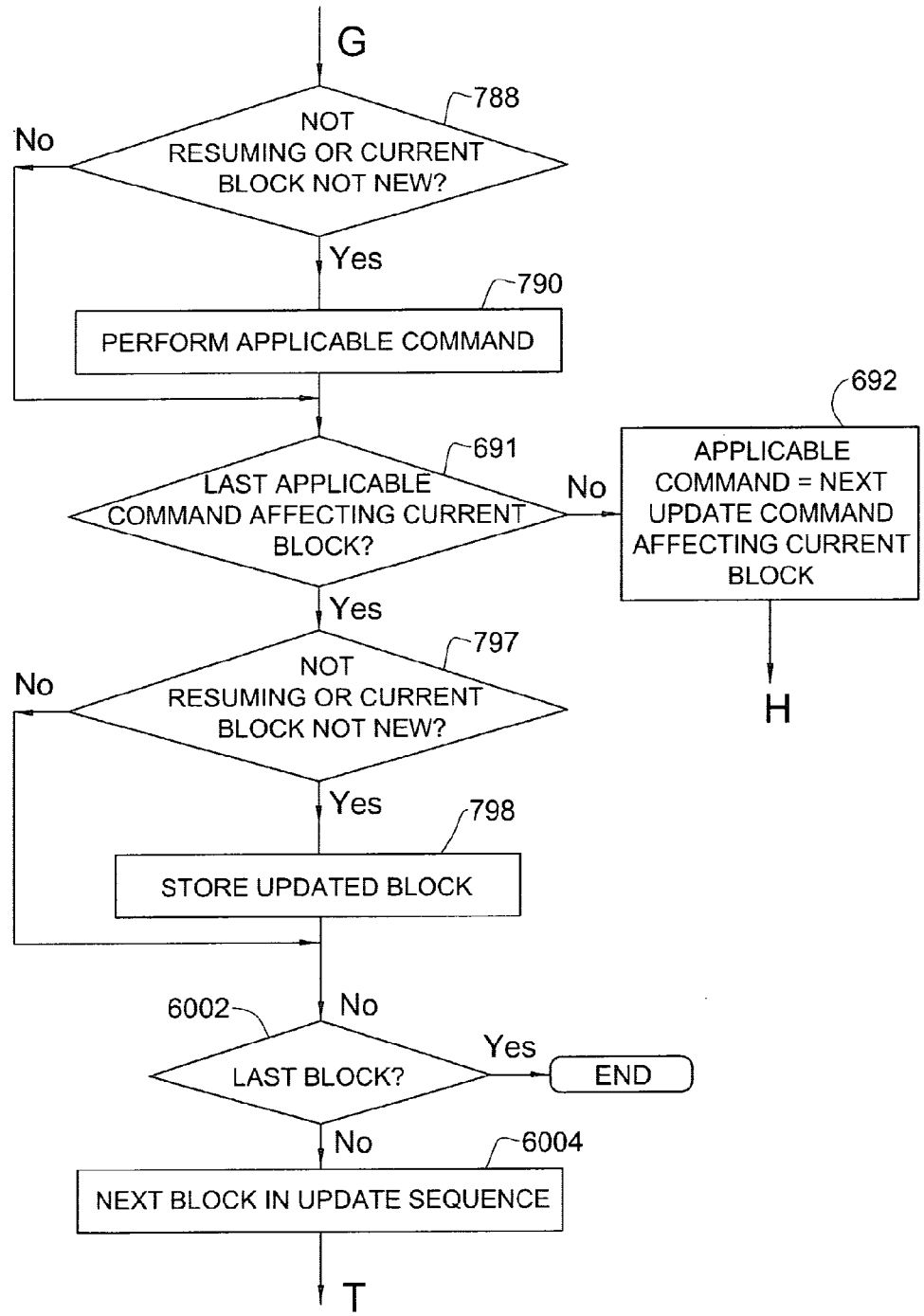
Figure 8A:
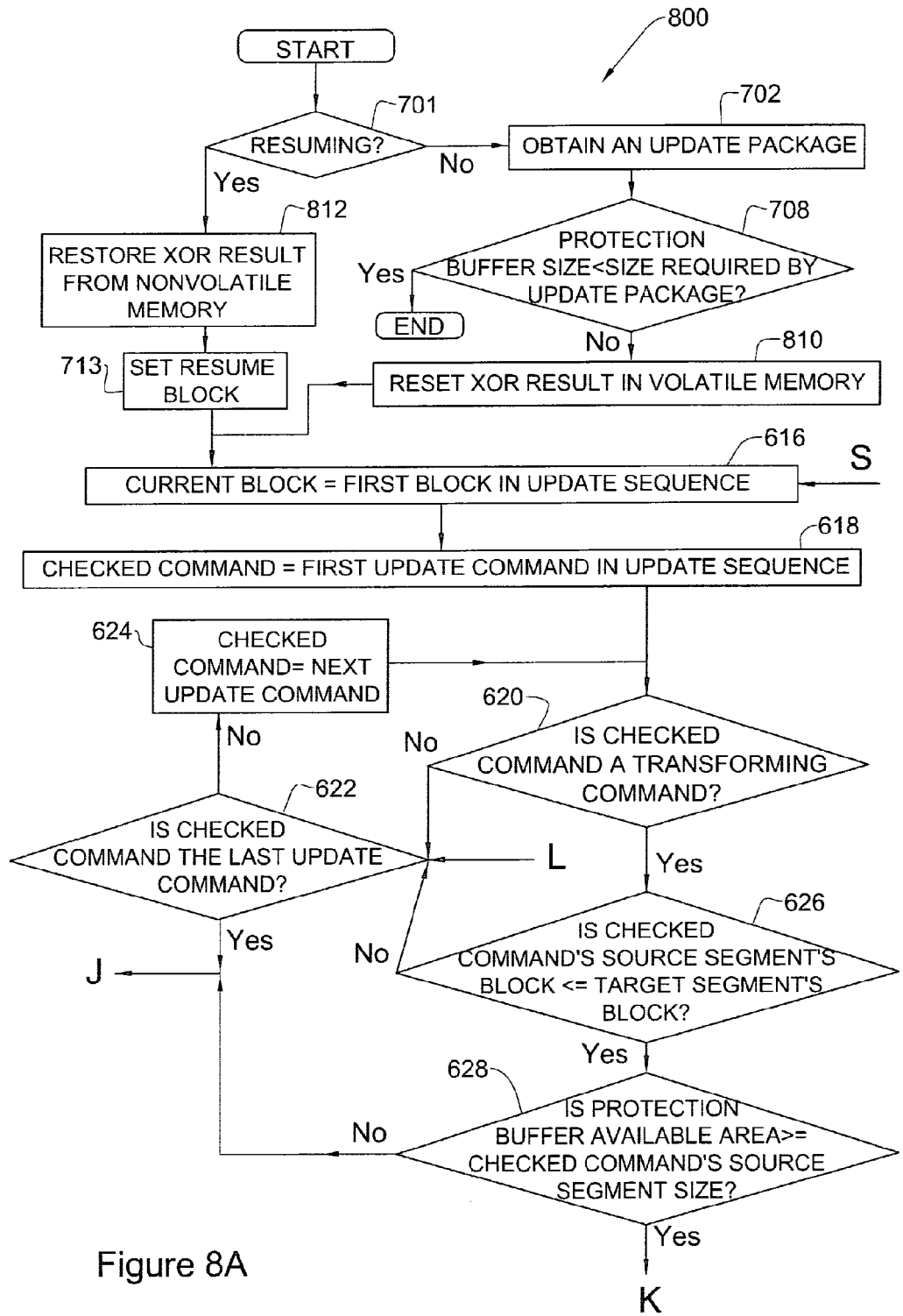
FIG. 8 (including FIGS. 8A, 8B, 8C, and 8D) is a flowchart of a method for reliably updating an original version to an updated version thereof, in accordance with another embodiment of the invention.
Figure 8B:
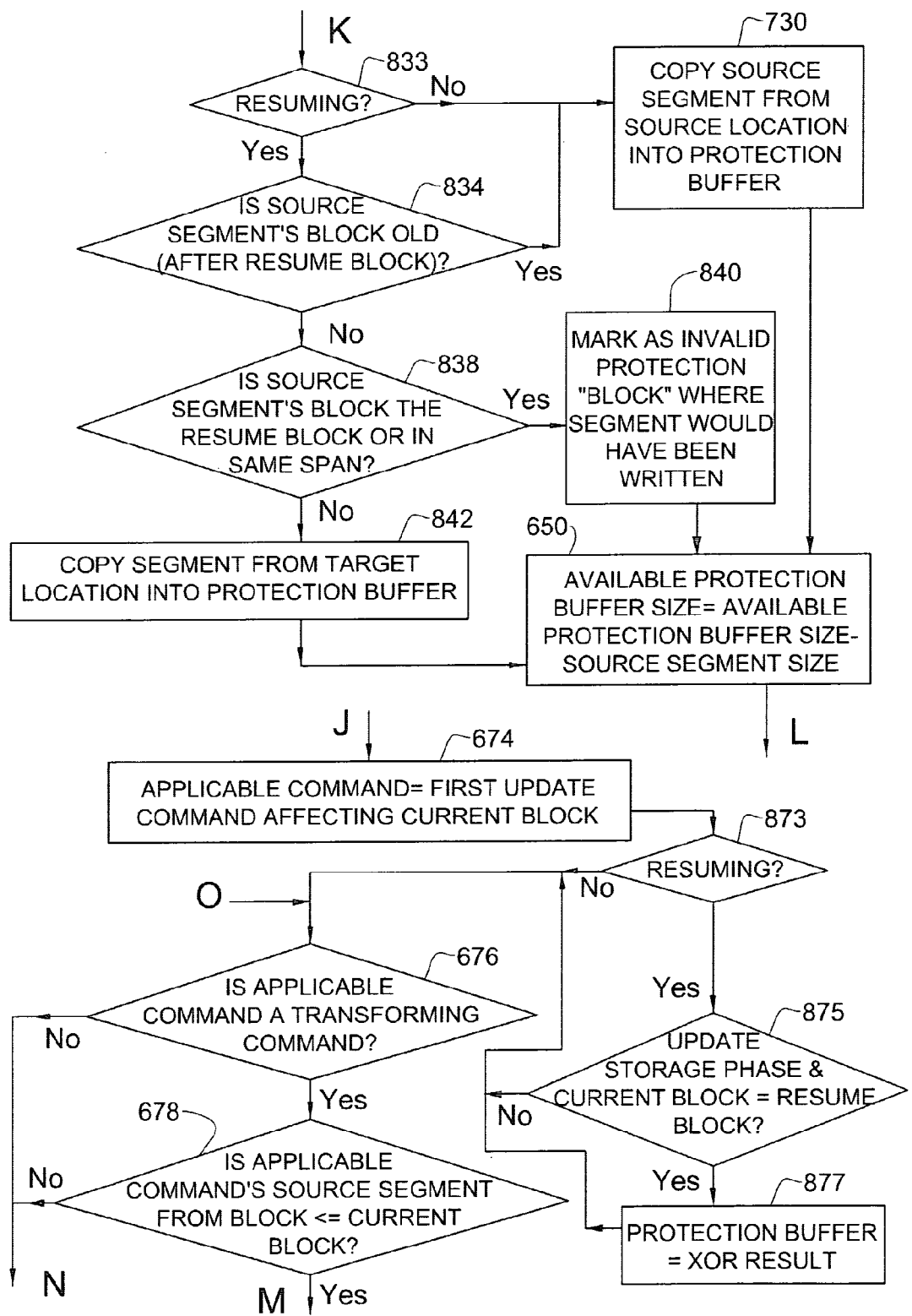
Figure 8C:
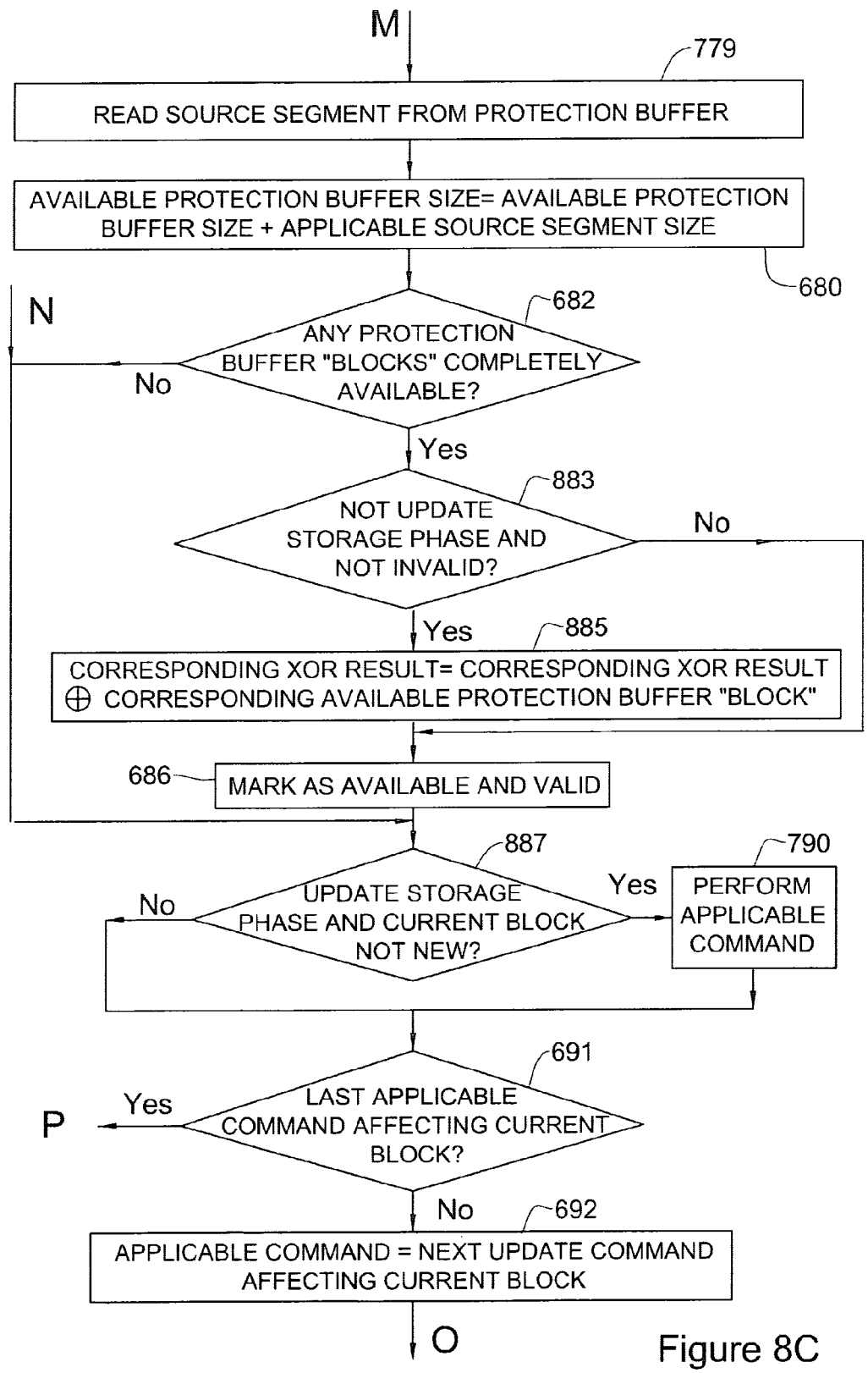
Figure 8D:
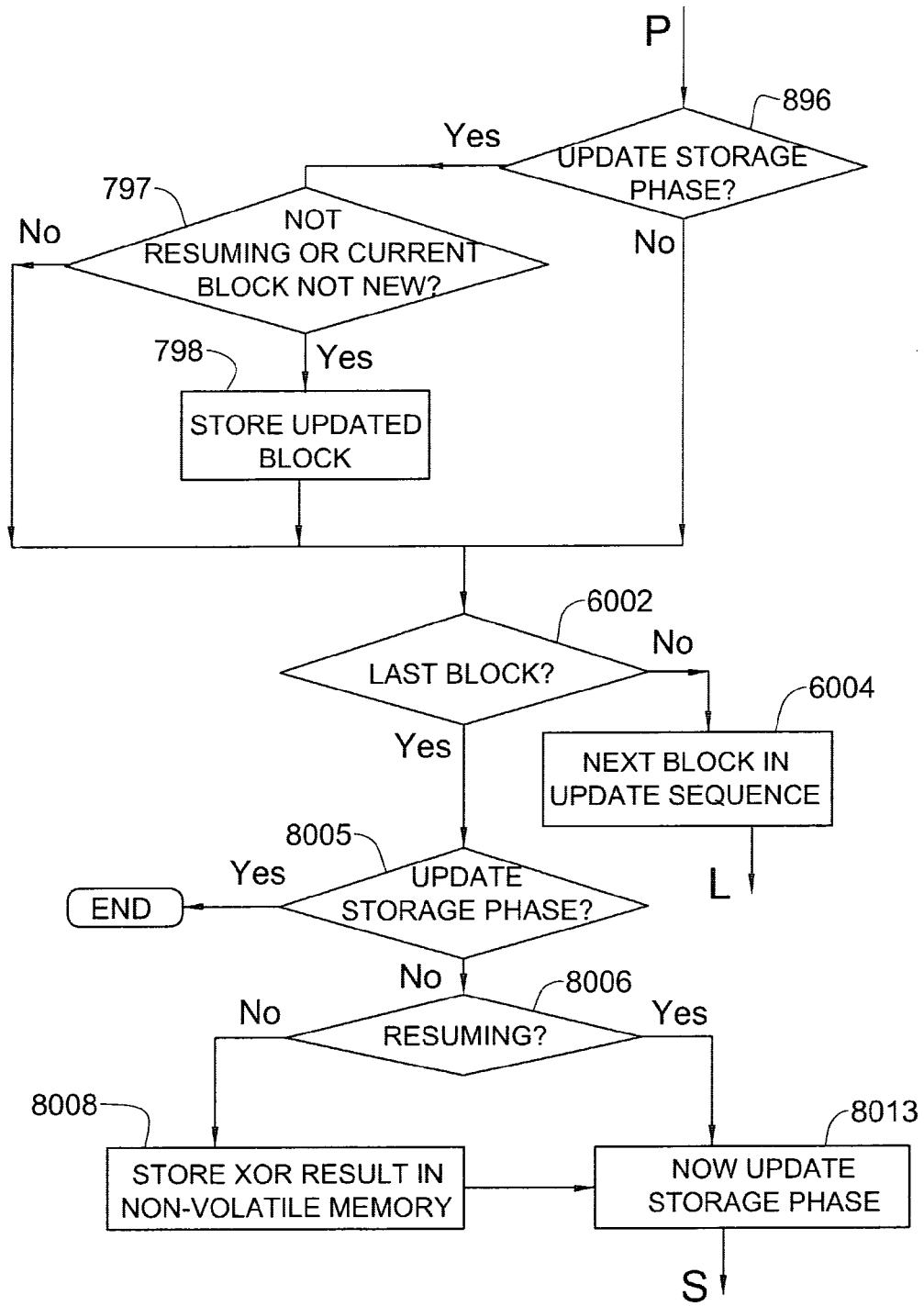

FIGS. 6, 7, and 8 are flowcharts relating to embodiments where there is a protection buffer which can be reused for protecting content. FIG. 6 includes the simulation (prediction) of insertion and reading of protected content to and from the protection buffer and FIGS. 7 and 8 include the actual insertion and reading of protected content to and from the protection buffer.

It should also be evident to the reader that in some embodiments relating to the flowcharts of FIGS. 6, 7, and/or 8, it is desirable to keep track of different positions including inter-alga any of the following: which block(s) is being processed at a given stage, which segment(s) is being processed at a given stage, which update command(s) is being processed at given stage, which location(s) in the protection buffer is being processed at a given stage, etc where there is no limitation on the processing implied. In some of these embodiments one or more pointers, cursors and/or cross reference tables, inter-alia may be used to keep track of different positions. For example, in one embodiment the protection buffer can be initiated as a FIFO stack. The usage of FIFO stacks, pointers, cursors, cross reference tables and/or other mechanisms to keep track of positions is well known in the art and therefore in order to simplify the description, there is no further reference to which mechanism, if any, is used to keep track of positions unless the reference is considered helpful for the further enlightenment of the reader.

FIG. 6 is a flowchart illustrating generation of an update package, in accordance with one embodiment of the invention. For example, FIG. 6 may be executed by update package generator 104.

Before describing FIG. 6, it is noted that update commands are generally divided, according to the embodiment, into three main categories. One category includes commands that are founded, or based on original content in segments of the original version, or in other words, such commands use original content in order to generate updated content. These commands constitute "founded commands" or "transforming commands". For example, a "copy command" belongs to the category of transforming commands. A transforming command, thus, has a "source segment" (the original segment on whose original content the command is based) and a "target segment" (the updated segment whose updated content is generated by the transforming update command). The second category, of "incorporating commands", includes update commands that incorporate into the updated version updated content that is not based on original content. For example, an "insert command" introduces content into the updated version; this content is not taken from the original version, but more likely from the update package or from any other source. The third category is of "erasing commands". An erasing command erases original content included in a segment of the original version, without yielding a corresponding segment thereof in the updated version. An example of an erasing command is the "delete" update command.

It is noted that copy commands are not the only transforming commands. Any command that has a source segment and a target segment is a transforming command. For example, one such transforming command can transform all lower case characters in the source segment to upper case. Another transforming command can multiply a number in the source segment by a certain value, etc.

In addition, the content affected by a transforming command constitutes "modified content". When considering the block where the source segment resides (constituting a "source block"), and the block where the target segment resides (constituting a "target block"), it should be appreciated that at least part of the content of the source block is modified in the target block. That is, it is possible that part of the source block is, e.g., deleted, and hence does not form part of the content stored in the updated block.

Before providing detailed explanation of FIG. 6 it should be appreciated that when generating an update package, the generator has to predict the updated devices' behavior, including protection buffer usage, thus allowing to improve usage thereof, e.g., by determining the update sequence. Only upon predicting that the protection buffer is fully occupied (or unavailable), transforming commands are replaced with incorporating commands, as done, for example, in U.S. Pat. No. 6,018,747. In embodiments described here, it is assumed that a "block" in the protection buffer may be reused once all protected segments in that protection "block" no longer need to be protected. For example, assuming segments that were protected in a protection "block" relate to one or more commands, then after those command(s) have been executed the protection buffer may be reused.

The term protection "block" or protection buffer "block" is used herein below in quotation marks because as explained above the protection buffer may occupy storage blocks, for example in a storage device and/or may occupy an area in volatile memory equal in size to one or more storage blocks. Therefore the usage of the term protection "block" should be construed as referring to an actual storage block and/or an area in volatile memory equivalent in size to a block. It is acknowledged that herein an original and/or an updated block of content is also so-termed when discussing the original and/or updated block of content occupying an area in volatile memory equivalent in size to a block. However, the description does not use quotes for the original and/or updated block of content because the occupancy of the original and/or updated block of content in volatile memory is typically although not necessarily a brief finale and/or prelude to the storage of the block. No limitation should be construed that a protection buffer "block" in storage may not be retained for a lengthy period of time, however once the update process has been successfully completed the retention is unnecessary although of course allowed. No limitation should be construed that an original or updated block must be retained for a lengthy period in storage compared to the duration in volatile memory, although in some cases such a comparison is valid.

In 602 an update package (constituting a first update package) is obtained by any method. It can be generated locally, or received from an external source, e.g., via a communication network, in an inter-process communication, by reading it from any kind of storage device, etc. To this end the update package (constituting a first update package) can be generated by any known method, such as in accordance with U.S. Pat. No. 6,546,552, WO 2004/114130 or WO 2005/003963 or by utilizing a known per se diff tool.

The first update package is analyzed in 604 in order to identify corresponding segments and an update sequence. The update sequence can be determined, for example, in accordance with FIG. 5 described above. It is noted that before determining the update sequence it is possible to analyze the update package in order to identify corresponding segments therein. Alternatively, it is possible to identify corresponding segments when determining the update sequence (see for example, 501 in FIG. 5). In addition, in those cases when the update package is pre-organized in accordance with a preferred update sequence, or when it is associated, e.g., with information laying out a preferred update sequence (such as a list), 604 can be skipped.

In order to generate the update package in accordance with the embodiment it is required to obtain (606) the size of the area (i.e. number of protection "blocks") available to be used as a protection buffer in an updated device, thus generating an update package optimized for this device. For example, assuming a protection buffer at least in storage, this embodiment assumes that all the updated devices that will be updated in accordance with the generated update package have an available storage whose size is substantially equal to the obtained size. For example, assuming a protection buffer at least in volatile memory, this embodiment assumes that all the updated devices that will be updated in accordance with the generated update package have an available volatile memory whose size is substantially equal to the obtained size.

Alternatively, according to another embodiment, it is possible to have a predetermined size for the protection buffer. An update package generated in accordance with this latter embodiment is adapted for updated devices that have free area larger or equal in size to the predetermined size. For example, it is possible to determine the required size of the protection buffer (such as the predetermined size), e.g. in the update package generator, and write the required size in the update package. When an updated device receives the update package, or when the update process starts operating accordingly, the updated device can try to allocate a protection buffer, in accordance with the required size written in the update package. If there is not enough free area in the device, for example for allocating the protection buffer, it is possible to terminate the operation of the update process, thus avoiding, e.g., memory overflow. It is even further possible to inform the update package server 105 about the situation, possibly including the updated size of the available area, thus allowing transmission or re-transmission of an update package better adapted to the updated device. It is noted that such an update package can be pre-prepared by the update-package generator 104 and be pre-saved in the update server as described below. Alternatively, the update server can instruct the update package generator 104 to generate an update package adapted to the available size etc.

Yet other embodiments are also allowed. For example, it is possible to communicate with the updated devices for obtaining their available area, (unlike receiving the information from the device upon transmitting thereto an update package that is not adapted), and then to generate an update package adapted for the obtained size, and to convey it to the updated device. Combinations of the abovementioned embodiments are also allowed.

Those versed in the art would appreciate that when an updated device receives an update package it writes it in an accessible memory (volatile memory and/or storage). Therefore, when considering available memory space in an updated device, it should be taken into account that the update package needs to be saved therein too. Similarly, a certain memory area may be required for the operation of the update process etc.

Before discussing in detail further stages of FIG. 6, it will be briefly explained that in order to generate an update package in accordance with an embodiment which allows for a reuse of the protection buffer, method 600 includes two sub-methods which are performed inter-dependently. In the first sub-method, the filling up of any available protection buffer "block(s)" is simulated in accordance with the update sequence until no more segments which need to be protected can be simulated to fit. Once no more segments are predicted to fit, it is desirable to perform the second sub-method which simulates the updating of a block in the update sequence, and simulates the reading from the protection buffer of any protected segments which are necessary for updating the block. Any protection "block" which has been simulated to be completely read, is subsequently available for re-filling by the first sub-method. However prior to simulating the updating of a block in the second sub-method, it is checked whether the block includes any (original) segments which require protection but which have not been simulated to be protected in the protection buffer. These segments require a different way of protection which makes use of the update package. One way of protecting these segments is to write the original segments in the update package and modify accordingly the transforming commands. In general, the transforming commands are effectively converted into incorporating commands. This embodiment of method 600 then repeats with the first sub-method executing after the simulation of updating each block, and the second sub-method executing after no more segments can be simulated to fit into the protection buffer and after the insertion into the update package of any (original) segments requiring protection from the block to be updated in the second sub-method which have not been simulated to be protected the protection buffer. It should be evident that other sequences of performing the stages of method 600 and/or other inter-triggering of the sub-methods of method 600 may be followed in other embodiments.

In the illustrated embodiment, the first block whose updating is to be simulated is the first block in the update sequence (stage 616) The first command to be checked is the first update command in the update sequence (stage 618).

In accordance with the embodiment illustrated in FIG. 6, it is determined in 620 whether the current checked command is indicative of a transforming command, and if so, it is checked whether the original content of the source segment requires protection or not. If the current checked command is not a transforming command (no to stage 620) and/or if the original content of the source segment does not require protection (no to stage 626), then if the checked command is not the last update command (no to stage 622), method 600 proceeds with checking the next update command (stage 624).

It was previously demonstrated, with reference to FIGS. 4A and 4B, for example, that when updating content in an updated block, protection of an original segment's content is not required when, in accordance with the update sequence, a transforming command's target segment's block precedes the transforming command's source segment's block. Therefore, in 626 it is checked whether the source segment's block precedes the target segment's block, or if the source segment's block is the same as the target segment's block, and if so, the content of the source segment requires protection.

Before simulating the protection of the content, it is further checked in 628 whether the protection buffer has enough available storage area to hold the protected copy of the source segment.

If there is enough available space available in the protection buffer, then in 650 the available size of the protection buffer is reduced by the size of the source segment. Since method 600 is a simulation no copying of the source segment to the protection buffer is necessary, although in some embodiments actual copying may be performed.

The reader will understand that if the protection buffer is assumed to include more than one protection buffer "block", then in some embodiments there is a predetermined order for checking the availability of space in protection buffer "blocks" in 628. For example in some of these embodiments, each time a segment needs protection, the same protection buffer "block" (for example identified as "a") is checked for availability, and only if protection buffer "block" "a" does not have sufficient availability then the next protection buffer "block" (for example identified as "b") is checked for availability, and only if protection block "b" does not have sufficient availability, then the additional, if any, protection buffer block (for example identified as "c") is checked for availability and so forth. Continuing with the example, there may be policy considerations for determining whether a segment fits. In one embodiment, there may need to be sufficient space in a protection "block" to include the entire segment for the answer to stage 628 to be yes. However, in another embodiment, the answer to stage 628 may also be yes if different parts of the segment may be simulated to be copied to different protection "blocks" provided the different parts are adjacent to one another. In another embodiment, the answer to stage 628 may also be yes if different parts of the segment may be simulated to be copied to different protection "blocks", regardless of adjacency. Therefore depending on the embodiment in stage 650, the first protection buffer "block" (or "blocks" in some embodiments) in the predetermined order which is simulated to have availability for the segment, has the available size thereof reduced.

In one embodiment, each time stage 650 is executed, there may be saved in the protection buffer "block" a notation that the source segment for a particular command is simulated to be included in that "block". The notation can include for example the associated transforming command, source block/position in source block, and/or target block/position in target block. In one embodiment, each time stage 650 is executed, in addition or instead an entry may be made in a cross reference table in memory listing which protection "block" corresponds to the source segment and/or command.

In some embodiments, each time stage 650 simulates the inclusion of a source segment in a protection buffer "block" there is a simulation of inclusion in the protection buffer "block" of an indication of the current block in the update sequence. In one embodiment, the indication may be simulated to be overwritten if a source segment is written to the same protection buffer "block" while processing a later current block in the update sequence (i.e. in this embodiment, there is a tracking only of the latest current block corresponding to the protection buffer "block")

It should be noted that method 600 simulates the behavior of the updated device with respect to the protection buffer, for example as discussed below in method 700 or 800. Therefore, in embodiments where there is simulated to be more than one protection buffer "block" and there is a predetermined order simulated in method 600 for checking the protection "blocks" for availability, the simulated predetermined order should be provided to/known by method 700 and 800. Policy considerations used in the simulation of method 600, for example protecting each segment only in one protection "block", allowing each segment to run over adjacent protection "blocks" boundaries, allowing each segment to have different parts copied if necessary to different protection "blocks" without restriction, etc should be provided to/known by method 700 or 800. Methods of providing information regarding which protection "block" is simulated to include the segment, for example in the protection buffer "block" or elsewhere in memory should be provided to/known by method 700 and 800. For example the predetermined order policy considerations, and/or methods of providing information regarding which protection buffer block is simulated to include which segment can be provided in the update package to the updated device or can be decided in advance by the updated device and/or update package generator with both knowledgeable of any decisions, for example because both execute the same logic.

Once the availability of the protection buffer has been reduced, and assuming the checked command is not the last update command (no to stage 622), method 600 proceeds with checking the next update command (stage 624).

If on the other hand, there is not enough available space in the protection buffer to hold the protected content of the source segment (no in stage 628), it is understood that this content must be protected elsewhere before overwriting it with updated content. It was previously noted that the content can be protected, e.g., by writing a copy thereof in the update package itself (see, for example. U.S. Pat. No. 6,018,747 or WO2005/101200).

Therefore prior to simulating the updating of the current block, method 600 begins with the update command whose source segment was simulated to not fit in the protection buffer (stage 652) and proceeds with all remaining update commands in the update sequence, determining whether there are any remaining ("residual") update commands that require protection of source segments from the current block (prior to updating the current block).

It is assumed that any commands earlier in the update sequence (i.e. earlier than the update command whose source segment did not fit in the protection buffer) which required source segment protection have already been simulated to be protected in the protection buffer or have been protected in the update package.

Therefore in each iteration of stage 656, it is determined if the residual command is a transforming command. If the residual command is a transforming command it is determined if the source segment for the residual command is from the current block (stage 658). If the source segment is from the current block, the residual command is changed from a transforming command to an incorporating command such as an insert command and the source segment is written in the update package (stage 660). If the residual command is not a transforming command (no to stage 656), the source segment is not from the current block (no to stage 658), or after executing stage 660, method 600 proceeds to the next residual command, if any (stage 663). Each residual command is thus processed until the last update command is reached (yes in stage 662).

After reaching the last residual command in stage 662 or alternatively after the last update command has been checked ("yes" to stage 622), then in stage 674 begins the second sub method of simulating the reading from the protection buffer of segments required for updating the current block in the update sequence so that any protection buffer "block" which has been completely read may be subsequently reused.

Beginning with the first update command for updating the current block ("applicable command"), it is determined if the applicable command is a transforming command (stage 676) and if the source segment of the applicable command is from the same block as the current block or from a block earlier in the update sequence (stage 678). If the answers to stages 676 and 678 are yes then it is assumed that the source segment was (simulated to be) protected in the protection buffer. Therefore in stage 680, the available space in the protection buffer "block" or "blocks" where the segment was simulated to be protected is increased by the size of the source segment. It is assumed that protection of the source segment would no longer be necessary once the current block has been updated.

In one embodiment conforming with the flowchart of FIG. 6, it may be assumed that if a source segment corresponds to a plurality of target segments (i.e. the same source segment is required to update a plurality of target segments) there are separate update commands relating to each target segment, and each update command is processed separately in method 600.

In another embodiment conforming with method 600, it may be assumed that if a source segment corresponds to a plurality of target segments (i.e. the same source segment is required to update a plurality of target segments), update commands later in the update sequence relate to the earlier (updated) target segments (as the source segments of the command) and not to the original (old) source segments and therefore these later update commands are ignored when simulating the filling/reading of the protection buffer and when inserting segments in the update package.

In another embodiment where a source segment corresponds to a plurality of target segments (i.e. the same source segment is required to update a plurality of target segments), prior to simulating the recapture of the space occupied by the source segment in the protection buffer (i.e. prior to stage 680), there may be a check if the source segment is required for any other update commands later in the update sequence. In this embodiment, only if the source segment is not required for other update commands (for example the reference counter has counted down to zero) will there be a simulation of the recapture of the space occupied by the source segment in stage 680. In this other embodiment, if the source segment is required for other update commands later in the update sequence, the source segment remains in the protection buffer for the time being. Other variations are possible depending on the embodiment.

If there is more than one protection buffer "block", then in 680, method 600 should simulate the recovery of the space of the source segment to the protection buffer "block" which had the insertion simulated in stage 650. For example, in one embodiment each time stage 650 was executed, there may have been saved in the protection buffer "block" a notation that the source segment for a particular command was simulated to be included in that "block". In another embodiment, each time stage 650 was executed, in addition or instead an entry may have been made in a cross reference table in memory listing which protection "block" corresponds to the source segment and/or command. In these embodiments, in stage 680 it may be determined from the previously save data which block should have space simulated to be recovered.

In one embodiment, based on the predetermined order in which the availability of space in the plurality of protection "blocks" was determined in previous iterations of stage 650, as discussed above, and possibly keeping track of the simulated recovery of space in previous iterations of stage 680, in each iteration of stage 680 it may be determined which protection buffer "block" should be simulated to have space recovered.

It should be noted that because method 600 simulate the behavior of the updated device, for example in method 700 or 800, the simulation of method 600 and methods executed by the updated device should follow the same procedures when dealing with a source segment corresponding to a plurality of target segments and/or the same methods of determining which of a plurality of protection "blocks" should be simulated to have space recovered. For example, the procedures/methods can be provided in the update package to the updated device or can be decided in advance by the updated device and/or update package generator with both knowledgeable of any decisions. It should be noted that in case of method 700, method 600 in one embodiment may 'lock' protection "blocks" once they have been simulated to be stored in non-volatile memory. In this embodiment, once a protection buffer "block" is determined to be full and no more segments can fit in the simulation of protection, the free space of the protection buffer "block" may be set to 0 to prevent any further attempt to further fill it in the following iterations prior to simulation causing the protection "block" to become "available" again. The locking is further explained with reference to FIG. 7.

In stages 682 and 686, any protection "block" in the protection buffer which has been simulated to no longer contain any segments which still require protection, is now available for subsequent refilling simulation (i.e. during subsequent iterations of stage 628 the answer will be yes). Stages 682 and 686 assume that protected segments or a function thereof can be erased from and/or stored (i.e. written to storage) block by block rather than segment by segment and therefore until all the protected segments in a protection "block" no longer need to be protected, the protection "block" is not simulated to be made available for subsequently reuse. In an embodiment without this constraint of writing to and/or erasing from storage block by block, each time a segment is no longer required in the protection buffer, the space that the segment occupied may be simulated to be refilled and in this embodiment stages 682 and 686 may be adapted to designate any space in the protection buffer previously occupied by segments which no longer need protection as available for simulated refilling.

It should be noted that in one embodiment any commands which in stage 660 were changed into incorporating commands would not be considered transforming commands in stage 676 and would therefore not affect the simulation of restoring space in the protection buffer.

It is also noted that during update package generation of method 600 there is no need to update the original version to the updated version, and "simulation" thereof is sufficient. Thus, when operating in accordance with the flow chart of FIG. 6, the update package generator (or any other processor generating the update package accordingly) does not have to operate in accordance with the update commands. However, the update package generator may update the original version, if desired.

If the applicable command is not a transforming command (no to stage 676), the source segment of the applicable command is from a block later in the update sequence (no to stage 678), or after processing the protection buffer for the no longer required source segment (i.e. after executing stages 680-686), the next applicable command, if any, is processed (stage 692 then iterating back to stage 676). Once the last applicable command updating the current block has been processed (stage 691), and the last block to be updated in the update sequence has not been reached (no to 6002), the next block is readied to have the updating thereof simulated (stage 6004). However prior to simulating the updating on the next block, returning to step 622 and subsequent stages, it is checked whether any additional segments can now fit into the protection buffer. Therefore in the next iteration of stage 628, the checked command whose source segment did not fit into the protection buffer on the previous iteration, is tried again to be (simulated to be) put into the protection buffer based on possibly newly available space as discussed above with reference to stages 682 and 686. If the checked command now would fit (yes to 628), then the next update command, if any, is checked as the method proceeds as discussed above. If on the other hand the checked command would still not fit (no to 628), then as discussed above, method 600 continues with 652, processing the checked command as well as all remaining residual commands to see if source segments need to be inserted in the update package based on the now current block and the now current block is then simulated to be updated. Once the last block has been processed in stage 6002 or once the last update command has been checked (yes to stage 662) then method 600 ends because in either case the protection buffer can remain as is without further simulation of reuse.

It is noted that the embodiment depicted in FIG. 6, when the available protection buffer size is too small for the source segment of one transforming command (see 628), the embodiment assumes that there is no room for any other source segments relating to other transforming commands. In other embodiments, as long as the protection buffer's available size is larger than zero, it is assumed that it is possible that contents of other source segments (being source segments of other transforming update commands further in the update sequence) are small enough for protection therein. Therefore in one of these other embodiments, whenever a residual command's source segment is from the current block (stage 658), it is first attempted to determine whether the source segment may fit in the protection buffer (i.e. 628 and if necessary 650 are executed) and if the source segment does not fit, the insertion of the source segment and the change into an insert command in stage 660 are executed.

In one embodiment, where the error recovery result is calculated by the update package generator 104, each protection buffer "block" which becomes completely available ("yes" to stage 682 in any iteration) is an operand of the error recovery function f( ). The calculated error recovery result can be written for example to the update package or to other non-volatile memory.

The reader will understand that the update package generation of method 600 assumes reuse of the protection buffer but places no conditions on the location of the protection buffer (e.g. in volatile memory and/or non-volatile memory) at the updated device which may vary depending on the embodiment. Method 600 also does not place conditions on whether the protection buffer, a part of the protection buffer, one or more instances of the protection buffer (i.e. where each instance reflects the protection buffer at a different point in the update process), and/or a part of one or more instances are stored in non-volatile memory or not. Method 600 also does not place conditions on whether there is a transformation or not of the protection buffer, a part of the protection buffer, one or more instances of the protection buffer, and/or a part of one or more instances of the protection buffer using a function which may vary depending on the embodiment. Method 600 also does not place conditions on whether any such transformation is stored in non-volatile memory or not. Method 600 also imposes no conditions on the size of the protection buffer which may vary depending on the embodiment.

It will also be understood that once method 600 has been executed, an original version may be reliably updated to the updated version using the contents of the update package. In one embodiment, the reusable protection buffer of method 700 or 800 is the same size as the simulated size.

FIGS. 7 and 8 below are flowcharts depicting methods 700 and 800 of reliably updating an original version to an updated version thereof using the update package generated in method 600, according to embodiments of the present invention. For conciseness, if any stage in a method is the same as in a previously described method, the stage is referred to by the same reference numeral so the reader can refer to the description above. However when referring above to stages of method 600 in relation to methods 700 and 800, it should be understood that in many cases the term "simulate" and similar terms are superfluous.

FIG. 7 depicts method 700 which in one embodiment includes the writing to a protection buffer "block" or "blocks" in non-volatile storage and subsequent rewriting to the protection buffer "block" or "blocks" in non-volatile storage as many times as necessary. For example, the writing can occur each time the content in a protection buffer "block" in volatile memory is no longer required or each time a protection buffer "block" in volatile memory is filled up in anticipation of updating. Depending on the embodiment the protection buffer may comprise one or more "blocks". Assuming that the number of segments which require protection in the protection buffer during the update process is less than the number of segments in all of the updated blocks, the number of times all protection buffer "blocks" are stored in non-volatile storage is typically although not necessarily less than the number of updated blocks. The update process therefore typically although not necessarily requires less storage operations than if each updated block were stored in an auxiliary storage block prior to storing the updated block and verifying the contents (i.e. k is typically although not necessarily less than n). A lower number of storage operations translates into a faster update process. In addition, in method 700 the protection buffer is reused. Therefore, typically although not necessarily less content needs to be protected in the update package compared to an implementation where the protection buffer is not reused.

Method 700 is applicable, for example, in an update process operable in an updated device.

When an update process starts operating (assuming that the update process has not been interrupted and thus is not resuming), in 702 it obtains, or accesses an update package stored in volatile or non-volatile memory. It is appreciated that the updated device could have received the update package previously from the update server 105. Alternatively, the update package may have been loaded for example to the storage device by any applicable means, such as by copying it from a portable (removable) memory device (e.g., a memory card or compact disc) or from a connected external memory device or by receiving it from the Internet. It should be further appreciated that according to the illustrated embodiment, the accessed update package has a certain update sequence. The update sequence can be determined simply by the order of the update commands in the update package, or is can be determined in accordance with additional information stored in association with the update package, such as a list determining the sequence for executing update commands, e.g., if different from the sequence in which the commands appear in the package. According to the example, the update sequence is adapted to reduce protection buffer usage in the updated device, or at least improves utilization of the protection buffer available therein. According to one embodiment, the update package could have been generated and the update sequence could have been determined (e.g., in an update package generator) in accordance with the flowcharts of FIGS. 5 and/or 6.

According to the illustrated embodiment, before updating any content (thus risking with overwriting original content requiring protection), the update process checks in 702 that there is enough storage device space available in the updated device for running the update process in accordance with the update package obtained in 702. According to the embodiment, if the update package includes an indication of the required protection buffer size, this required protection buffer size is compared in 708 with the protection buffer size available in the updated device, terminating the update process if the available protection buffer size is not enough.

Like method 600, method 700 includes two sub-methods which are performed inter-dependently. In the first sub-method, available protection buffer "block(s)" are filled up in accordance with the update sequence until no more segments which need to be protected can fit. Once no more segments can fit, it is desirable to perform the second sub-method which updates a block in the update sequence and stores the updated block to non-volatile memory, reading from the protection buffer any protected segments which are necessary for updating the block. Any protection buffer "block" which has been completely read is subsequently available for refilling by the first sub-method. However prior to the updating of the block by the second sub-method, it is desirable to store any changed protection buffer "block(s)" in non-volatile memory in case the update process is interrupted, so that the updating can be resumed as detailed further below. Once a changed protection "block" is stored in non-volatile memory, the free space in the protection buffer "block" may be set to 0 (i.e. 'locked') in one embodiment, in order to prevent any further attempt to further fill that "block" in subsequent iterations until that protection "block" become available again. This embodiment, ensures in this way that various copies of a "block" (i.e. in volatile and non-volatile memory) are consistent to allow proper resumption if necessary upon interruption. This embodiment of method 700 then repeats with the first sub-method executing after the updating of each block and storage thereof, and the second sub-method executing after no more segments fit into the protection buffer and any changed protection buffer "blocks" have been stored. It should be evident that other sequences of performing the stages of method 700 and/or other inter-triggering of the sub-methods of method 700 may be followed in other embodiments.

The first sub-method of method 700 proceeds as described above for method 600, executing stages 616 through 650 but in method 700 actual insertion into the protection buffer is necessarily performed (rather than optionally performed as in method 600). Provided the checked command is a transforming command (yes to 620), and/or if the original content of the source segment does require protection (yes to 626), and there is available space in the protection buffer (yes to 628), then the space availability of the protection buffer is decreased by the size of the source segment (650). In method 700 the source segment is necessarily copied into the available space in the protection buffer in stage 730. In one embodiment, the protection buffer into which the source segment is copied is in volatile memory, for example in RAM.

In cases of a plurality of protection "blocks", if method 600 followed a predetermined order for checking "blocks" for space availability, and/or policy considerations as discussed above with respect to stage 650, then method 700 should also follow the same predetermined order and/or policy considerations.

In some embodiments, there may be a predetermined order for method 700 determining within a protection buffer "block" with available space larger than the size of the segment, the location of insertion of a source segment. For example in one of these embodiments, the segment may be copied to the lowest available address. There may also be predetermined criteria on whether or not a segment may be copied into non-adjacent to other protected segments or not within a single protection buffer "block"

In one embodiment, in stage 730 or stage 650, method 700 saves information which facilitates the locating of the copied source segment in the protection buffer and/or facilitates resumption upon interruption. For example, along with the source segment may be copied to the protection buffer a notation which identifies the transforming command associated with the source segment. As another example, along with the source segment may be copied to the protection buffer in addition or instead a notation indicating the source block and/or position in the source block. As another example, along with the source segment may be copied to the protection buffer in addition or instead a notation indicating the target block and/or position in the target block. In another embodiment, information which facilitates the locating of the copied segment in the protection buffer and/or facilitates the resumption upon interruption may be saved in addition or instead in other memory such as a cross reference table.

In some embodiments, each time a source segment 730 is copied to a protection buffer "block", method 700 includes in the protection buffer "block" an indication of the current block in the update sequence, in case of interruption as will be explained further below. In one embodiment, the indication may be overwritten if a source segment is written to the same protection buffer "block" while processing a later current block in the update sequence (i.e. in this embodiment, there is a tracking only of the latest current block corresponding to the protection buffer "block").

If the checked command is not a transforming command (no to 620), or the source segment of the checked command is after the block of the target segment (no to 626), or after the source segment is inserted into the protection butler (730 and 650), then method 700 proceeds to checking the next update command (624), if any.

If there is not enough availability in the protection buffer to store the source segment (no to stage 628) or having processed the last update command (yes to stage 622), method 700 proceeds to storing the protection buffer in non volatile memory. In stage 766 in one embodiment the contents of any changed protection buffer "block" in volatile memory is copied to non-volatile memory. In this embodiment it is assumed that any protection "block" which has not been changed has (the current version of) content already stored in non-volatile memory. In another embodiment, in stage 766 all protection buffer "blocks" in volatile memory are stored to non-volatile memory whether changed in stage 730 or not. In these embodiments, it is assumed that any protection buffer "blocks" in non-volatile memory which will be overwritten in stage 766 are entirely erased and completely overwritten, however in an embodiment where partial erasure and partial writing to a block in non-volatile memory is permissible, it is possible that only changed segments are backed up in storage in stage 766. In one embodiment prior to storing any protection buffer "block" in stage 766, an indication of the current block is added to the protection buffer "block", in case of interruption as will be explained further below.

Once the protection buffer has been backed up in storage, method 700 can proceed with the second sub-method of updating blocks, executing stages 674 to 6004 as described above with respect to method 600 but in method 700 actual update of blocks occurs rather than simulation of the updating. As described above, if the source segment of any transforming command (yes to 676) which updates (i.e. is applicable to) the current block is from a block earlier in the update sequence or from the same block (yes to 678), then the source segment is assumed to have been protected in the protection buffer, and after using the source segment, the source segment will no longer need to be protected, and therefore the space occupied by the source segment in the protection buffer could be considered as available. See the discussion above with respect to stage 680 regarding embodiments when more than one target segments depend on a source segment.

However because method 700 includes the actual update of content, in stage 779, the source segment is read from the protection buffer. In one embodiment, the source segment may be located in the protection buffer in stage 779 based on the predetermined order in which the availability of space was determined in previous iterations of stage 650/730, as discussed above, while possibly keeping track of readings in previous iterations of stage 779. In another embodiment, the source segment may be located in the protection buffer in stage 779, using the information stored in the protection buffer or other memory discussed above with reference to stages 730/650.

As described above if all the source segments in a protection "block" no longer need to be protected (i.e. the space occupied by all the source segments in the protection buffer is now available—yes to stage 682), then in method 700 the protection "block" is marked as available for erasure and reuse (stage 686). In an embodiment where the copying of source segments in stage 730 is to a volatile memory having no full block writing or erasure requirement it should be evident that availability of a complete protection buffer "block" in volatile memory is not required in order to rewrite the "block". However for simplicity's sake, the illustrated embodiment has the protection buffer in volatile memory mimic the features of the protection buffer in non-volatile memory where it is assumed that full writing or full erasure of a block is required. In an embodiment without this constraint of writing to and/or erasing from storage block by block, each time a segment is no longer required in the protection buffer, the space that the segment occupied may be refilled and in this embodiment stages 682 and 686 may be adapted to designate any space in the protection buffer previously occupied by segments which no longer need protection as available for refilling. In one embodiment, stages 682 and/or 686 may be skipped if there are no more checked commands (yes to stage 622), because the refilling of the protection buffer is not required.

In stage 790 the applicable command is performed in volatile memory (because the process is not resuming, stage 790 is not omitted for any command, i.e. the answer to stage 788 is "yes"). In another embodiment, the application of the command can be skipped if the process is resuming and the resume block has not yet been reached (i.e. the current block is new), rendering the actual computation of the updated blocks unnecessary.

In the illustrated embodiment which assumes that it is not possible to erase only part of a storage block, it is appreciated that method 700 can copy and write the content of an updated block from volatile memory into nonvolatile memory if in 790 the last applicable command for updating the block in volatile memory was executed. Therefore, in 691 method 700 checks whether the last applicable command has been performed and if so, the content of the updated block, currently saved in volatile memory, is copied and written in 798 into the updated block in the storage device. (Because the process is not resuming, stage 798 is not omitted for any block, i.e. the answer to 797 is yes).

It is noted though that if in 691 it was determined that the update command is not last in the updated block, method 700 processes the next applicable command (692) without copying the saved volatile memory content into non-volatile storage.

Assuming that the updated block is not the last in the update sequence (no to stage 6002), the next block in the update sequence is readied to be updated and stored (stage 6004). Prior to updating and storing the next block, it is checked whether any additional segments can now fit into the protection buffer. Therefore method 700 iterates back to stage 622 and in the next iteration of stage 628, the checked command whose source segment did not fit into the protection buffer on the previous iteration, is tried again to have the source segment put into the protection buffer (628) based on possible newly available space as discussed above with reference to stages 682 and 686. If the source segment now fits (yes to 628), the source segment is inserted into the protection buffer (730 and 650), and the next update command (624), if any (no to 622), is checked. If the source segment however still does not fit (no to 628), after no more source segments of later update commands may be fit into the protection buffer (no to subsequent iteration of 628), or after there are no more update commands to check (no to stage 622), the now current block is updated and stored, optionally after first storing protection buffer "block(s)" (i.e. method 700 proceeds to 764). Each block is so processed until the last block has been processed (yes to stage 6002), ending method 700.

If there is no interruption of method 700, and thus all updated blocks are successfully written to storage, ending method 700, the previously stored protection buffer in non-volatile memory is not required and can be discarded, if desired, once all updated blocks have been successfully stored.

Assume instead that there is an interruption of method 700 and volatile memory is erased. If there is an interruption of method 700 prior to beginning the storage of the first updated block in the update sequence in stage 798, method 700 could potentially be restarted as if no interruption occurred because the storage device includes all the original blocks. Therefore in this case, the interruption does not necessarily have to be handled like a resumed process as described below (i.e. in this case, the answer to stage 701 may instead be no and the process could proceed directly to re-execute the update method beginning with any of stages 702, 708 or 616 of method 700.)

Assume however, that at least the first block in the update sequence has been updated or was in the process of being updated when the interruption occurred which erased volatile memory. For example, the interruption could have occurred in stage 798 during storage of any of the updated blocks, in 766 during storage of any modified protection "blocks", and/or at any point during or after the storage of the first updated block in the update sequence. In this case, similarly to method 300, the storage device will include a resume block which is the block in the update sequence immediately following the last block in the update sequence to be successfully stored in non-volatile memory prior to interruption. (For example, if the interruption occurred during the storage of the first block in the update sequence then the first block would be the resume block but if the interruption occurred after the successful storage of the first block in the update sequence then the second block would be the resume block). The contents of the resume block may be old or corrupted. Assuming that the interruption occurred during storing a protection "block" the resume block may be set to be the next block to be updated according to the update sequence but in that case content of the last stored protection "block" could be corrupted. A determination of the resume block and whether or not the contents of the resume block are corrupted may be determined for example as in US Published Application Number 20050216530 to Meller et al, which is incorporated by reference herein. Therefore it is assumed herein that the resume block may be determined.

Optionally, the storage device will also at the point of interruption include one or more old blocks (not yet updated) which would have been written to storage after the resume block and/or optionally one or more new blocks (already updated) which were written to storage prior to the resume block.

Upon resumption (yes to stage 701), the resume block is set in stage 713 as described above. Method 700 then proceeds to processing the update package and the updated blocks from the beginning by setting the first block in the update sequence as the current block (stage 616) in order to allow correct updating.

Note that during the resumed process, in stage 769 storage of changed protection "blocks" takes place only when blocks beyond the resume block are being updated (i.e. the current block is an old block, or equivalently a block later in the update sequence). Therefore, stage 769 ensures that when resuming and for all blocks prior to the resume block (i.e. the current block is a new block AKA block earlier in the update sequence), the first sub-method (stages 624-650) effectively just simulates the filling of the protection buffer and effectively recalculates "blocks" of the protection buffer. Optionally when the current block is a block earlier in the update sequence than the resume block (i.e. a new block), performance of the applicable commands may be omitted. When a current block is a block earlier in the update sequence than the resume block (i.e. a new block), the storage of stage 798 is omitted (i.e. no to stage 797).

When the current block to be updated is the resume block, prior to updating the resume block in volatile memory, the protection buffer is restored from non-volatile memory to volatile, memory ("yes" to stages 764 and 768 followed by stage 770). In another embodiment, the protection buffer is not copied to volatile memory but is read while in non-volatile memory. It should be noted that the protection buffer in non-volatile memory is the last version of the protection buffer, and therefore is the version which should correspond to the resume block (i.e. which should have protected segments required by the resume block).

According to some embodiment, if it is determined that the contents of the resume block are corrupted, then necessarily the corresponding protection buffer "blocks" are not corrupted, since the protection "blocks" and the update blocks are stored at different times and therefore interruption could not have corrupted both simultaneously. However in these embodiments, if the contents of the resume block are not corrupted, it is possible in some cases that a protection buffer "block" is corrupted. In one of these embodiments, if a stored protection "block" is corrupted, stage 770 should refrain from restoring that protection buffer "block" or any other protection "block" that should have been stored prior to updating the resume block as can be effectively determined by the first sub-method of method 700 (616-650) which simulates the update process until the resume block is encountered. In other words, stage 770 would be omitted for any protection buffer "block" that is corrupted or for any other "block" that should have been stored at stage 766 prior to updating the resume block. Therefore if the resume block is not corrupted (nor is any other old block), then in this embodiment any un-restored protection "blocks" may be instead calculated by executing as part of the resumption process the first sub-method (616-650). It should be noted that if a protection "block" was supposed to be stored during the original update process (i.e. prior to interruption) it means the "block" was modified and if it is assumed that during the original update process protection "blocks" were filled completely during the execution of the first sub-method (616-650), the contents of the protection "blocks" at the point of interruption would have contained only segments coming from blocks that are either the resume block or old blocks (later in the update sequence). Therefore, if none of the blocks in the update sequence are corrupted, the contents of protection "blocks" (as the contents were at the point of interruption) may be recalculated after resumption using the calculation of the first sub-method (616-650) as part of the resumption process, and hence the protection "blocks" do not require restoration in this embodiment.

Method 700 then proceeds to performing the second sub-method for the resume block, including examining applicable commands for the resume block (674), reading source segments from the protection buffer if necessary (stage 779) and freeing the space occupied by the read source segments (680), marking as available any completely read protection "blocks" (686), performing the applicable command (790), and once all applicable commands for the resume block have been applied storing the updated resume block (798).

Method 700 is then ready to process the block in the update sequence which follows the resume block (stage 6004), if any.

Prior to updating and storing the block after the resume block, protection buffer "blocks" may need to be stored in stage 766. It should be evident that later versions of protection buffer "blocks" (i.e. subsequent to the version restored in stage 770) are stored in stage 766 during the resume process in case method 700 is again interrupted.

Method 700 continues for all blocks remaining in the update sequence. It should be noted that for blocks after the block following the resume block, method 700 proceeds to stage 622 (as in a non-interrupted update process where the source segment of the command which previously did not fit is again checked for fit).

If there are any subsequent interruptions, upon resumption the update method 700 beginning with stage 701 is repeated and a new determination of the resume block is made in accordance with the discussion above.

Regardless of the number of interruptions, if any, method 700 ends when the last updated block is successfully written to storage (yes to 6002). At this point, the previously stored protection buffer is not required and can be discarded, if desired.

FIG. 8 illustrates another method 800 of an updated device reliably updating an original version to an updated version thereof. In the illustrated method 800, where it is assumed that the error recovery result is computed by the updated device the number of storage operations related to the protection buffer can potentially be reduced to the number of "blocks" included in the protection buffer (and therefore the total storage operations may potentially be reduced to n+number of protection "blocks", where in this case k=number of protection "blocks"). It should be evident that embodiments of the invention also contemplate a number of storage operations related to the protection buffer larger than the number of "blocks" included in the protection buffer. In one embodiment, by reducing the number of storage operations related to the protection buffer, a quicker update process can be achieved. Although this embodiment may in some cases require the same number of storage operations related to the protection buffer compared to a non-reusable protection buffer where each protection buffer "block" is stored once in non-volatile memory, it should be understood that because the protection buffer in this embodiment is reusable, the update package may potentially be decreased compared to a non-reusable protection buffer implementation since due to the reuse, more segments are protected by the protection buffer and less by the update package. Alternatively or in addition, the number of protection buffer "blocks" in this embodiment may potentially be decreased compared to a non-reusable protection buffer implementation.

It should also be noted that in embodiments where the error recovery result is calculated prior to the update process (for example during method 600) rather than during method 800, the number of storage operations can potentially be decreased to n (i.e., k can be as low as zero, however not necessarily limited as such).

In the described method 800, instead of storing versions of the protection buffer "blocks" as in method 700 one or more times (see above stage 766), each version of the same protection buffer "block" is XOR'ed together and the XOR result is instead stored. If there is an interrupt, protection buffer "blocks" corresponding to non-resume blocks, that is protection "blocks" that existed at any other time but the time the resume block was updated, can be rebuilt from the content blocks (old and/or updated blocks) and any protection buffer "blocks" corresponding to the resume block, that is protection "blocks" that existed exactly at the time the resume block was updated, can be recalculated from the XOR result, using a similar process to that described by method 300. Once the protection buffer which corresponds to the resume block has been completely restored, the update process has all the necessary protected segments to update the resume block whether the resume block is corrupted or not, and even if not corrupted, the update process can now re-write the resume block with new contents as expected and therefore the update process can be continued. As mentioned above, the description uses XOR functions for f( ) and g( ) and as an example of a group of error recovery functions, and therefore in other embodiments with other error recovery functions, error recovery result(s) comparable to XOR result(s) may be used alternatively or additionally, mutatis mutandis.

In the flowchart of FIG. 8, the term "update storage phase" used in stages 883, 887, 896, 8005, and 875 is used for conciseness to refer to the phase of the update process which occurs after the XOR result has been computed and which includes inter-alia the storage of the updated blocks, or if the process has been interrupted then "update storage phase" in stages 883, 887, 896, 8005 and 875 refers to the phase of the update process which occurs after the protection buffer corresponding to the resume block has been restored based on the XOR result and which includes inter-alia the storage of the updated blocks.

As mentioned above, the invention does not limit the size of the protection buffer which may include one or more "blocks" however, in one embodiment there may be as few as a single protection "block". The amount of protection "blocks" can be determined in one embodiment by available non-volatile storage space and the more "blocks" allocated, the more efficient the update will be in some cases in terms of update size. In order to calculate a XOR result corresponding to a particular protection "block" it should be appreciated that each instance of the protection "block" must be determined.

It is assumed that the update process has not been interrupted and therefore method 800 proceeds with executing stages 702 and 708 described above and the XOR result in volatile memory is reset to zero (stage 810). The concept of resetting the XOR result to zero is used here to contrast with the restoration of the XOR result from non-volatile memory in a resume process, but it should be evident that in another embodiment the content may not be set to zero and the XOR result can instead be first set to equal the first instance of the corresponding protection "block" in a modified first iteration of stage 885. In one embodiment, the number of XOR result "blocks" corresponds to the number of protection buffer "blocks". As with protection buffer "blocks", quotation marks are used for XOR result "blocks" because the XOR result may occupy storage blocks, for example in a storage device and/or may occupy an area in volatile memory equal in size to one or more storage blocks. Therefore the usage of the term XOR result "block" should be construed as referring to an actual storage block and/or an area in memory equivalent in size to a block.

In stages 620 through 628 of method 800, similarly to the first sub-method discussed above with reference to FIGS. 6 and 7, each update command is checked and if the command is a transforming command (yes to 620), the source segment's block is before or the same block as the target segment block (yes to 626), and there is availability in the protection buffer (yes to 628), then in stage 730 and 650 the source segment is copied from the source location into the protection buffer (as in 730).

See above discussion of 628, 650 and 730 which is relevant to certain embodiments of method 800.

Once there is no more room in the protection buffer (no to stage 628) or the last update command has been checked ("yes" in stage 622), then the second sub method of method 800 for updating or simulating the updating of the first block may be performed. In the illustrated embodiment, it is assumed that when determining the XOR result, there is only a simulation of the updating of the block (i.e. no performance of the update command(s) and storage of protection "blocks"). In another embodiment, there may be an actual updating in volatile memory of each block during the XOR result computation.

Beginning with stage 674, the second sub-method of method 800 is performed with each applicable command relating to the current block (in this iteration the current is the first block) examined to see whether the command is a transforming command (stage 676) and whether the applicable command's source segment is from a block prior to the current block or from the current block ("yes" to stage 678). If the command is a transforming command (yes to 676) and the source segment is from an earlier block or from the same block ("yes" to 678), the source segment is read from the protection buffer in stage 779.

Any protection buffer "block" which has been completely read (and therefore can be made available for erasure and reuse), is XOR'ed with the corresponding (previous) XOR result "block" so that the contents of this protection buffer "block" instance is reflected in the corresponding XOR result "block" (stage 885). It should be noted that since the update process has not been interrupted there is no reason to assume that any protection buffer "block" instance is not valid, and the validity concept will therefore only be expanded upon further below. Any protection buffer "block" that has been completely read and therefore XOR'ed is marked as available for reuse in stage 686 and in case the protection buffer "block" had been marked as invalid (when simulating the update when resuming), the protection buffer "block" is re-marked as valid. In another embodiment, the reading of the source segment in 779 may be simulated in some cases when no actual updating in volatile memory takes place during the XOR result computation. See above description of 680 and 779 for more details relevant to some embodiments of method 800.

In the illustrated embodiment, no updating of blocks in volatile memory by method 800 occurs until after the completed XOR result is computed (no to stage "887") and therefore stage 790 is skipped. In an alternative embodiment there may be an actual execution of the applicable command in stage 790.

Each applicable command is thus processed by method 800 (stage 692). Once the last applicable command for the current block has been examined (yes in stage 691), then because the XOR result has not yet been fully computed (no to stage 896), no storage of the updated block occurs. Instead the next block in the update sequence is readied to be processed (stage 6004) and method 800 iterates to stage 622 to repeat again utilization of freed protection "blocks" if there are more update commands to check.

Each time stage 885 is performed as part of the (re) execution of the second sub-method of method 800, another instance of a protection buffer "block" is XOR'ed with the previous XOR result in the corresponding XOR "block". If there is a plurality of protection buffer "block"(s) completely available after a particular applicable command was executed, then when executing stage 885 each available protection buffer "block" is XOR'ed in the corresponding XOR "block". Therefore, once all the blocks in the update sequence have been updated or simulated to be updated in volatile memory, no more segments require protection and all protection "blocks" should have been completely read (and made available). At this stage, all instances of each protection buffer "block" should be reflected in the corresponding XOR "block" in volatile memory. Therefore when the last block in the update sequence has been processed (yes in stage 6002, no to stages 8005 and 8006), method 800 proceeds in stage 8008 to store each XOR result "block" in non-volatile storage. In one embodiment, the number of storage operations relating to the protection buffer (i.e. of XOR result "blocks") may potentially be as low as the number of protection buffer "blocks", which, as mentioned earlier can in one embodiment be a single block storage operation.

Once the XOR result "block"(s) has/have been written to storage, the (updated) blocks in the update sequence can now also safely be written to storage. Alternatively, if the XOR result had been computed prior to the update process, for example during execution of method 600, the obtaining of the XOR result "blocks" through calculation in stages 810 to 8008 may be replaced by a stage in which the previously computed XOR result is obtained, with this stage followed by the update storage phase (stage 8013). In this alternative embodiment, the XOR result is not necessarily saved in non-volatile memory with blocks and therefore does not necessarily occupy an area equal in size to one or more storage blocks (nor do the protection buffer instances which are used in calculating the XOR result necessarily in this case occupy an area equal in size to one or more storage blocks). However for simplicity of description it is assumed in the description herein that the XOR result and each protection buffer instance occupies an area equal to one or more blocks. Method 800 now begins the update storage phase (stage 8013), beginning with the first block by iterating back to stage 616. Recall that in the illustrated embodiment of FIG. 8, during the computation of the XOR result, only a simulation of the updating of the blocks in volatile memory occurred, and therefore the update commands are again processed beginning with the first command in the update sequence and starting with stage 616.

In the illustrated embodiment, the first sub-method of method 800 is again performed for filling in the protection buffer, repeating stages 620, 622, 624, 626, 628, 730, and 650 described above. Once there is no more room in the protection buffer (no to stage 628) or the last update command has been checked (yes to stage 622), then the second sub method of method 800 for updating and storing the first block may be performed. Beginning with the first applicable command updating the current block (674), the applicable command is examined and if the command is a transforming command (yes to stage 676) and the source segment is from a block earlier in the update order or from the current block (yes to 678), the source segment is read from the protection buffer (779). Any protection buffer "blocks" that have been completely read are marked as available (686). Note that the computation of the XOR result in stage 885 is omitted because the result has already been computed and stored prior to the update storage phase.

In stage 790 of method 800 the currently examined applicable command is performed. Method 800 then repeats the procedure for each applicable command for the current block (stage 692). Once the last applicable command has been performed (stage 691), the updated current block is stored (stage 798). Method 800 is then ready to process the next block in the update sequence (stage 6004) iterating back to stage 622 to repeat again utilization of any freed protection "blocks" assuming there are more update commands to check. If there are no more checked commands (yes to stage 622 meaning that all update commands have been checked during the update storage phase), then method 800 can proceed with updating the next block starting with stage 674 as described above. If there are more checked commands (no to stage 622), then prior to updating the next block, refilling the protection buffer if available is attempted with method 800 first attempting with the source segment of the last checked command which did not fit in (stage 628).

In another embodiment, it is assumed that the updated device computes the XOR result and that during the XOR computation phase, method 800 performs the update commands in volatile memory (stage 790), updating the blocks. Therefore after the XOR result has been stored in stage 8008, the updated blocks can be written to storage. In this embodiment, after stage 8008 is executed. (optionally omitting stage 8013 which is unnecessary) method 800 then proceeds directly to storing each updated block in the update sequence, i.e. executing stages 798, 6002, and 6004. In this embodiment after stage 6004, method 800 returns to stage 798 (i.e. storing the next block in the update sequence). There is no need to fill and read from the protection buffer since the blocks have already been updated. Hence, once the first block in the update sequence has been stored (stage 798), and the last block has not been stored (no to stage 6002) the next block in the update sequence (stage 6004) can be processed.

Regardless of the embodiment, if there is no interruption causing volatile memory contents to be erased and the last updated block is successfully stored (stages 798 and yes to stage 6002), method 800 ends since the update storage phase has been completed (yes to stage 8005). At this point, the XOR result "blocks" in non-volatile memory are no longer required and can optionally be discarded.

Assume instead that there is an interruption of method 800 and volatile memory is erased. If there is an interruption of method 800 prior to beginning the storage of the first updated block in the update sequence in stage 798, method 800 could be restarted as if there was no interruption because the storage device includes all the original blocks. Therefore in this case, the interruption does not necessarily have to be handled like a resumed process as described below (i.e. in this case the answer to 701 may instead be no and the process could proceed directly to re-execute the update process beginning with any of stages 702, 708 or 810 of method 800.

Assume, however that the XOR result had been already saved in non-volatile memory (for example in stage 8008 or method 600) and at least the first block in the update sequence has been updated or was in the process of being updated when the interruption occurred which erased volatile memory. For example, the interruption could have occurred in stage 798 of method 800 during storage of any of the updated blocks and/or at any point during or after the storage of the first updated block in the update sequence. In this case, similarly to methods 300A, 300B or 300C, the storage device will include a resume block which is the block in the update sequence immediately following the last block in the update sequence to be successfully stored in non-volatile memory prior to interruption. For example, if the interruption occurred during the storage of the first block in the update sequence then the first block would be the resume block but if the interruption occurred after the successful storage of the first block in the update sequence then the second block would be the resume block. As another example, if the interruption occurred after the XOR result has been saved in non-volatile memory but prior to storing any updated blocks, the resume block may be set to be the next block to be updated according to the update sequence (in this case the first block in the update sequence). The contents of the resume block may be old or corrupted. A determination of the resume block and whether or not the contents of the resume block are corrupted may be determined for example as in US Published Application Number 20050216530 to Meller et al, which is incorporated by reference herein. Therefore it is assumed herein that the resume block may be determined.

Optionally, the storage device will also at the point of interruption include one or more old blocks (not yet updated) which would have been written to storage after the resume block and/or optionally one or more new blocks (already updated) which were written to storage prior to the resume block with the resume point.

In case of interruption, upon resumption (yes to stage 701), the XOR result "block" or "blocks" are restored from non-volatile memory (storage or otherwise) to volatile memory (stage 812). The resume block is set in stage 713 as described above. Beginning with the first block in the update sequence (stage 616) and the first update command in the update sequence (stage 618), the protection buffer "block" instances are reconstructed in method 800. If the current checked command is a transforming command (yes to 620), the source segment's block is before or the same as the target block (yes to 626), and there is availability in the protection buffer (yes to 628) then the source segment would have been protected in the protection buffer.

Sometimes the block including the source segment requiring protection may not have yet been updated and stored in the storage device (i.e. the source segment's block is after the resume block in the update sequence). In this case the answer is yes to stage 834 (following yes to 833 because method 800 is resumed) and the source segment can be obtained from the source location and copied into the available space in the protection buffer (stage 730).

Assume however that the answer to 834 is no (i.e. the source segment's block is not after the resume block).

In some cases when the source segment's block is not after the resume block, the block including the source segment requiring protection may have already been updated and stored in the storage device (i.e. the source segment's block is before the resume block in the update sequence). In some of these cases, the source segment may be obtained from the target location in the target block, for example by applying if necessary the reverse transformation of the transforming command to the target command. For example, if the transforming command was a "copy" command, the source segment would be the target segment. As another example, if the transforming command was the transforming of all (lower case) characters stored in the source segment to upper case, the source segment can be obtained by transforming all upper case characters in the target segment to lower case. The types of transforming commands, and reverse transformations to obtain the source segment are not bound by this invention.

However there may be other cases when the source segment's block is not after the resume block and the source segment may not be obtained upon resumption from any old or new (updated) blocks. For example, if the source segment is in the resume block, then it may not be clear if the resume block includes old contents, new contents and/or corrupted contents. As another example, if the source segment is from a block earlier in the update sequence than the resume block but the target segment is in a block later in the update sequence than the resume block, then at the time of interruption, the source segment could not be derived from the source segment (which has already been updated) or from the target block (which has not yet been updated). In effect, the source segment would have been stored in the same protection buffer "block" or "blocks" instance as source segments from the resume block. As explained above, protection buffer "block"(s) corresponding to the resume block are determined using a XOR computation (rather than being rebuilt using source/target blocks). A block preceding the resume block which includes a source segment whose target segment block follows the resume block is said herein below to be "in the same span" as the resume block. A block following the resume block which includes a target segment whose source segment block precedes the resume block, is said herein below to be "in the same span" as the resume block.

Therefore in stage 838 it is determined if the block including the source segment is the resume block or is in the same span as the resume block (where the span includes at least two sequential blocks, one of which is the resume block). If yes, then any protection buffer "block" which would have included the source segment is marked as invalid in stage 840, provided that method 800 is not in the update storage phase and in fact is simulating the update process till the resume block. For example, in one embodiment the protection buffer "block" or "blocks" are marked as invalid by setting a flag in volatile memory.

If the source segment's block and target segment's block are instead both before the resume block (no to stage 838), then the source segment can be obtained from the target location (stage 842), applying if necessary the reverse transformation as explained above.

In stage 650, the availability of the protection buffer is reduced by the size of the source segment, for example as defined by the transforming command.

In one embodiment of method 800 the determination of availability in stage 628 during the resumption process is performed in a similar manner as the determination was performed in the original update process (i.e. before interruption), the copying of a segment in 730 or 842 during the resumption process is performed in a similar manner as stage 730 in the original update process, and the reduction of the availability in 650 during the resumption process is performed in a similar manner to the original update process so refer above for more details.

Method 800 continues checking update commands (stage 624). If there is a checked command whose source segment does not fit the protection buffer (no to stage 628) or if there are no more checked commands (yes in stage 622), then applicable commands for the current block are simulated or performed (beginning with stage 674). If the applicable command has a source segment from a block earlier than the current block or from the current block (yes in stage 678) then the source segment is read or simulated to be read from the protection buffer (stage 779), and the protection buffer has availability increased by the source segment size (stage 680). Any protection "block(s)" that has been completely read or simulated to be read (stage 682) and was not marked as invalid in stage 840 (yes to 883) is XOR'ed with the corresponding previous XOR result "block" and the result is placed in the corresponding XOR result "block" in volatile memory (stage 885). If the available protection "block" has been marked as invalid (no to stage 883), then the protection buffer "block" corresponds to the span including the resume block and is therefore not XOR'ed.

In the illustrated embodiment because method 800 has not yet determined the protection buffer corresponding to the resume block (i.e. not yet in the update storage phase), the applicable command is not performed in this phase, i.e. there is only a simulation. In another embodiment, the applicable command may be performed on the current block in volatile memory if the current block is after the resume block in the update sequence and the current block (as a target block for update commands) is not in the same span as the resume block.

Once the last applicable command for the current block has been simulated or performed in volatile memory (depending on the embodiment), the next block is ready to be processed (6004) and method 800 iterates back to 622 to determine if there are additional update commands to check.

After the last block in the update sequence has been processed (yes to stage 6002), it should be noted that based on the XOR properties explained above, each XOR result "block" includes the bitwise XOR'ing of each corresponding protection buffer "block" instance that does not correspond to the resume block with itself (with one of the instance having been included in the corresponding XOR result "block" restored in stage 812 and the other instance having been XOR'ed in during the resumption process in stage 885). Therefore after the last block in the update process has been processed, the contribution to the XOR result of each protection buffer "block" instance that does not correspond to the resume block is cancelled out. Each XOR result "block" also includes the corresponding protection buffer "block" instance which is associated with the resume block (having been included in the corresponding XOR result "block" restored in stage 812) effectively XOR'ed with zero (zero being the result from the twice XOR'ing of each of the other corresponding protection "block" instances). As mentioned above any bit XOR'ed with zero results in that bit and therefore each XOR result "block" is identical to the corresponding protection buffer "block" instance associated with the resume block.

After the last block in the update sequence has been processed in the non-update storage phase, because there has been a resumption after an interruption (yes to stage 8006) method 800 now begins the update storage phase (stage 8013), beginning with the first block by iterating back to stage 616. In the illustrated embodiment, during the earlier non-update storage phase, only a simulation of the updating of the blocks in volatile memory occurred, and therefore the update commands are again processed beginning with the first command in the update sequence beginning with stage 616.

In the illustrated embodiment, the first sub-method of method 800 is again performed for filling in the protection buffer, repeating stages 620, 622, 624, 626, 628, 730, 834, 838, 840, 842, and 650 described above. Once there is no more room in the protection buffer (no to stage 628) or the last update command has been checked (yes to stage 622), then the second sub method of method 800 for updating and storing the current block may be performed. Because the process is resuming (yes to stage 873) and it is the update storage phase, then if the current block is the resume block (yes to stage 875), the protection buffer "block" or "blocks" corresponding to the resume block are set to equal the corresponding XOR result "block" or "blocks" in volatile memory (stage 877). In stage 877, only protection "blocks" that are marked as 'invalid', are restored from the corresponding XOR result "blocks" since in the previous non-updating phase, the XOR result calculated exactly these "blocks". Other protection "blocks" are assumed to have been calculated correctly by method 800 since all non invalid (i.e. valid) protection "blocks" may be correctly calculated as explained by stages 730 and 842.

In either case (whether the current block is the resume block or not), beginning with the first applicable command updating the current block (674), the applicable command is examined and if the command is a transforming command (yes to stage 676), and the source segment is from a block earlier in the update order or from the current block (yes to 678), the source segment is read from the protection buffer (779). Any protection buffer "blocks" that have been completely read are marked as available (stage 686). Note that the computation of the XOR result in stage 885 is omitted in this update storage phase.

In stage 790 of method 800 the currently examined applicable command is performed, provided the current block is not a new block (i.e. is not a block prior to the resume block in the update sequence-no to stage 887). Method 800 then repeats the procedure for each applicable command for the current block (stage 692). Provided the current block is not a new block ("yes" to stage 797), then once the last applicable command has been performed ("yes" to stage 691), the updated current block is stored (stage 798). Method 800 then proceeds to process the next block in the update sequence (stage 6004), iterating back to stage 622 to repeat again utilization of freed protection "blocks" if there are more update commands to check. If there are no more checked commands (yes to stage 622 meaning that all update commands have been checked during the update storage phase), then method 800 can proceed with updating the next block starting with stage 674 as described above. If there are more checked commands (no to stage 622), then prior to updating the next block, refilling the protection buffer if available is attempted with method 800 first attempting with the source segment of the last checked command which did not fit in (stage 628)

If there is no further interruption then method 800 ends when the last block in the update sequence is successfully stored. If there are any further interruptions during method 800 can proceed as described above for the first interruption.

Once all the updated blocks have been successfully stored, the stored XOR result can be discarded if desired.

In another embodiment, during the determination of the protection buffer instance corresponding to the resume block, which included rebuilding the other protection buffer instances and the XOR function, as described above, the commands for updating blocks after the resume block (and not in the same span as the resume block) are performed in stage 790 (i.e. in the earlier phase prior to the update storage phase).

Following the methods described for generating update packages and for updating original versions of content thus generating updated versions thereof, apparatuses that are able to perform these methods will be further described.

Figure 9:
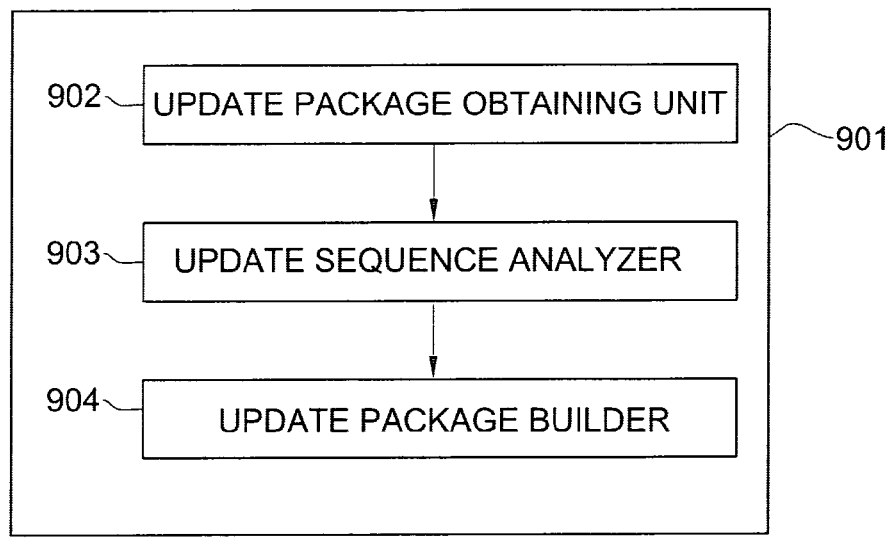
FIG. 9 illustrates an apparatus for generating an update package, in accordance with an embodiment of the invention.

FIG. 9 illustrates an apparatus 901 for generating an update package in accordance with one embodiment of the invention, such as the update package generator 104. According to the embodiment the update package generator 104, includes an update package obtaining unit 902. The update package obtained by the update package access unit 902 can be any update package, including a simple delta generated by applying a known per se diff tool, or any other update package, generated in accordance with any method applicable to the case. In addition, it should be appreciated (as was previously noted with reference to 602 in FIG. 6, for example) that the update package obtaining unit can obtain a pre-prepared update package or generate an update package in accordance with any method known in the art.

An update sequence analyzer 903 is coupled to the update package access unit 902. The update sequence analyzer 903 receives an update package from the update package access unit 902 and determines an update sequence that improves protection buffer usage. The update sequence can be determined, for example, in accordance with the method illustrated in FIG. 5.

An update package builder 904, coupled to the update sequence analyzer 903 builds a new update package, in accordance with the update package received from the update package obtaining unit 902 and the update sequence determined in the update sequence analyzer 903. FIG. 6 illustrates an embodiment of a method that can be applied in the update package builder 904. In some embodiments, update package builder executes the methods described in FIGS. 2A and/or 2B, inter alia.

Figure 10:
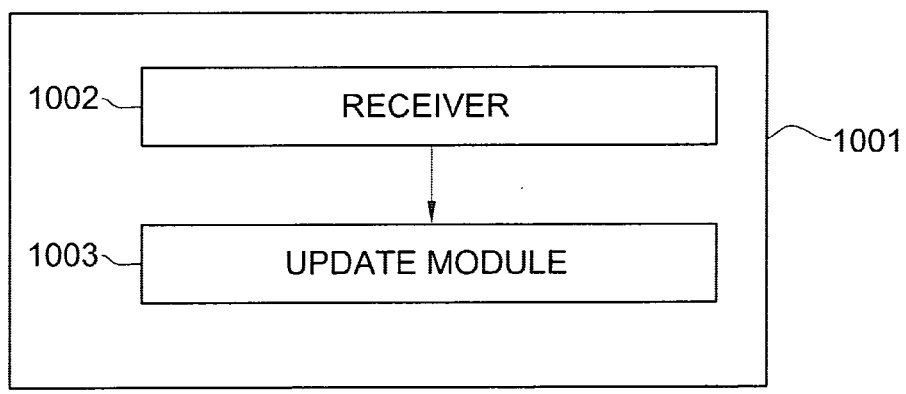
FIG. 10 illustrates an apparatus for reliably updating, an original version of content to an updated version thereof, in accordance with an embodiment of the invention.

FIG. 10 illustrates an apparatus 1001 for reliably updating an original version of content to an updated version thereof, in accordance with another embodiment of the invention. The apparatus 1001 includes a receiver 1002 that obtains an update package. As was previously explained, e.g. with reference to 702 in FIGS. 7 and 8, the update package can be obtained by receiving it from a communication network or it can be obtained by any alternative method. The apparatus 1001 further includes an update module 1003 such as an update process that is adapted to update the original version currently stored in the updated device's storage device thus generating an updated version. The update module 1003 can operate, for example, in accordance with any of the embodiments described with reference to FIG. 2A, 2B, 2C, 3A, 3B, 3C, 7 or 8.

Figure 11:
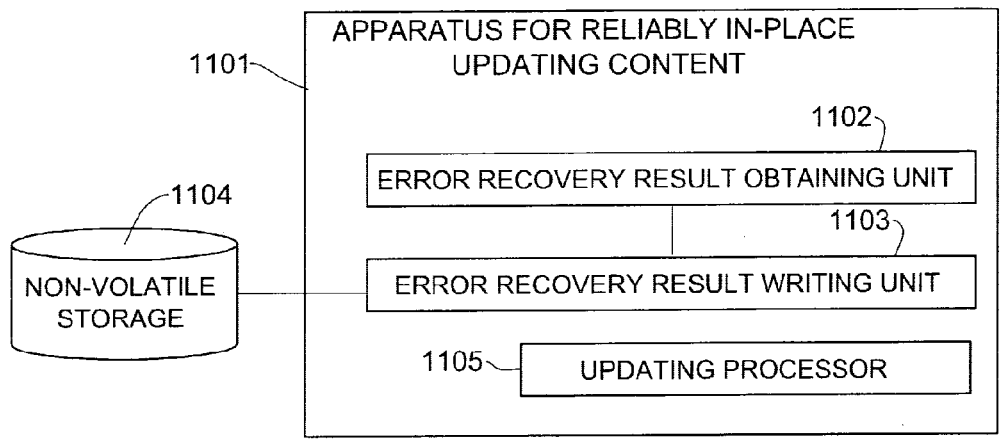
FIG. 11 illustrates an apparatus for reliably in-place updating original content stored in storage blocks of a non-volatile storage to yield updated content, in accordance with an embodiment of the invention.

FIG. 11 illustrates an apparatus 1101 for reliably in-place updating original content stored in storage blocks of a non-volatile storage to yield updated content, in accordance with an embodiment of the invention. The apparatus 1101 includes an error recovery result obtaining unit 1102 that obtains the error recovery result. It should be noted that according to certain embodiment the error recovery result obtaining unit 1102 obtains the error recovery result from an external source that calculated it, while according to other embodiments the error recovery result obtaining unit 1102 includes an error recovery result calculator that can calculate the error recovery result, e.g., in accordance with flowcharts illustrated in FIGS. 2A, 2B and 2C and in accordance with various blocks of FIG. 8.

In those cases when the error recovery result is obtained from an external source, it should be appreciated that it can be obtained in the update package, in association with the update package (e.g., as data that is obtained from the update package generator when the update package is obtained, but not being part of the package) or from any other source. If the error recovery result is obtained as part of the update package, it is stored in the non-volatile storage device 1104 together therewith. However, in the other alternatives it may be required to store it in the storage device 1104, which is done by the error recovery result writing unit 1103. It is noted though that in those embodiments where the error recovery result is obtained, e.g., in the update package, the error recovery result writing unit 1103 is redundant and therefore it may not exist in the apparatus 1101.

After the error recovery result is stored in the storage device 1104 (whether as part of the update package or external thereof), the updating processor 1105 can update the original content to yield updated content stored in-place thereof. Updating can be done, for example, in accordance with the methods illustrated in various blocks of FIG. 8. Because the update processor 1105 is configured to operate after obtaining the error recovery result and after storing it in the storage device (in those embodiments where the error recovery result writing unit 1103 exists), reliability is provided.

Figure 12:
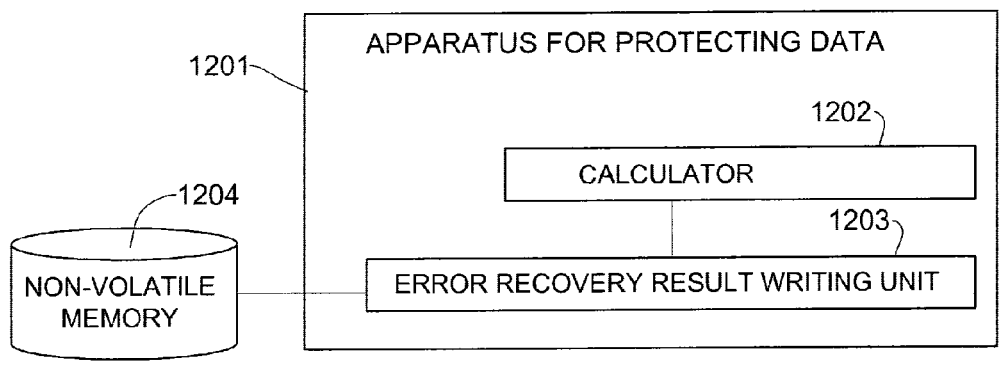
FIG. 12 illustrates an apparatus for protecting data, in accordance with an embodiment of the invention.

Turning now to FIG. 12, the figure depicts a block diagram of an apparatus 1201 for protecting data, in accordance with several embodiments of the invention. It is noted that the apparatus 1201 can be part of the update package generator whereby the error recovery result generated by the apparatus can be written as part of the update package or in association therewith, the apparatus can be part of an updated device 102, wherein the update process operates, or it can be part of any other external processor that has access to a storage device where the original and/or updated content are stored, in order to allow calculation of the error recovery result.

The apparatus for protecting data 1201 includes a calculator 1202 that can calculate the error recovery result, e.g., in accordance with the flowcharts of FIGS. 2A, 2B, 2C and in accordance with various blocks of FIG. 8. Then the calculated error recovery result is written into non-volatile memory 1204 by an error recovery result writing unit 1203. It is noted that when the apparatus 1201 is not positioned in the updated device 102, the non-volatile memory unit is not required to be a storage device including blocks (such as flash memory) and any type of a non-volatile device can apply. This is expressed by using the term "writing" instead of "storing" and by using "non-volatile memory" instead of "non-volatile storage device". Yet, if the apparatus 1201 operates in the updated device 102 or in any other external source where it is stored in a storage device including blocks, "writing" is equivalent to "storing" and the "non-volatile memory" 1204 is equivalent to a "non-volatile storage device" such as 103 or 1104.

Figure 13:
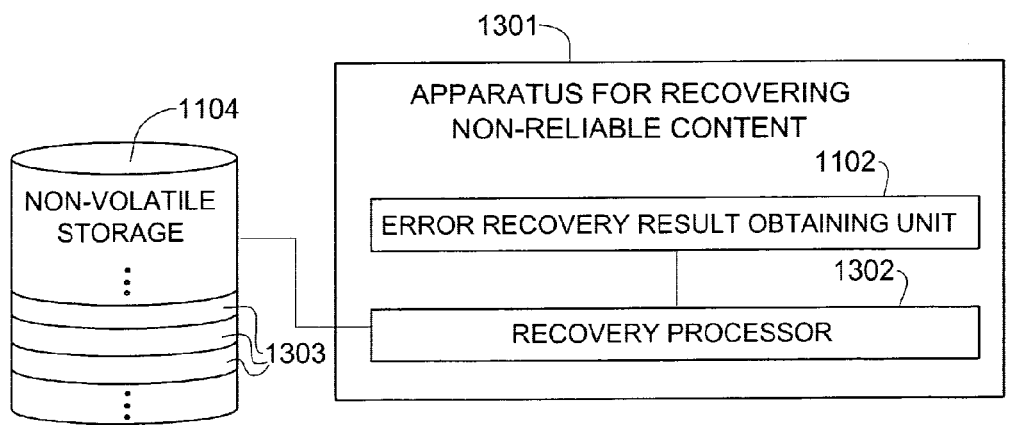
FIG. 13 illustrates an apparatus for recovering non-reliable content, in accordance with an embodiment of the invention.

FIG. 13 is a block diagram depicting an apparatus 1301 for recovering non-reliable content, in accordance with an embodiment of the invention. The non-reliable content is content stored, e.g., in the resume block. The error recovery result obtaining unit 1102 obtains the error recovery result (by obtaining it from an external source, by reading it from a non-volatile storage device, by computing it or by any other way applicable to the case). The recovery processor 1302, which has access to a non-volatile storage device 1104 wherein the non-reliable content is stored, uses the error recovery result in order to recover the non-reliable content. The storage device 1104 has blocks 1303, wherein at least one of them includes the non reliable content. The recovery processor 1302 can operate, for example, in accordance with various blocks of FIG. 3A, 3B, 3C or 8. It should be appreciated that in order to recover the non-reliable data the recovery processor 1302 applies the error recovery result to one of the following: (a) content stored in the other blocks or (b) content calculated based on content stored in the other blocks or (c) content requiring protection, calculated based on the content stored in the other blocks. It is noted that the content stored in the other blocks can be original and/or updated content. Similarly, content calculated based on content stored in the other blocks can be original and/or updated content. In addition, content requiring protection can include original and/or update content that requires protection.

It is noted that the embodiments described above referred to the option of copying original (protected) content into the protection buffer. Yet, this is non-limiting and it should be appreciated the instead of simply copy, it is possible to compress the protected content into the protection buffer, encrypt it and perform any other manipulation thereon.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In addition, those versed in the art would appreciate that a system according to the invention can be hardware. Alternatively, the system can compose hardware and software components.

While the invention has been shown and described with respect to particular embodiments, it is not thus limited. Numerous modifications, changes and improvements within the scope of the invention will now occur to the reader.

The invention claimed is:

1. A method for reliably in-place updating original content of an original version stored in storage blocks of a non-volatile storage to yield updated content of an updated version, according to an update sequence for updating content in said blocks, wherein the non-volatile storage does not store the updated version in addition to the original version, the method comprising:
    obtaining an error recovery result indicative of a result achievable by applying a first error recovery function to data which is used in in-place updating the original content, wherein a part of said data is recoverable by applying a second error recovery function to (i) said error recovery result and (ii) another part of said data;
    after obtaining the error recovery result, in-place updating the original content by writing the updated content to the non-volatile storage in place of the original content,
    wherein the data includes a single version of content.

2. The method of claim 1, wherein the single version of content includes one of original content, updated content, original content requiring protection and updated content requiring protection.

3. The method of claim 2, wherein at least one operand of said first error recovery function is the data.

4. The method of claim 2, wherein at least one operand of said first error recovery function is the data, and wherein when the data includes content that requires protection, said content is stored in one or more storage blocks.

5. The method of claim 1, wherein the first error recovery function and the second error recovery function are identical.

6. The method of claim 1, wherein the first error recovery function and the second error recovery function are XOR functions.

7. The method of claim 1, wherein one of the first error recovery function and the second error recovery function is addition and the other is subtraction.

8. The method of claim 1, wherein obtaining includes one of (i) receiving the error recovery result from an external source and (ii) calculating the error recovery result by applying the first error recovery function.

9. The method of claim 1, further comprising writing said error recovery result into non-volatile memory, wherein at least one operand of said first function includes one of (i) original content, (ii) updated content and (iii) content that requires protection.

10. The method of claim 1, wherein said obtaining is performed during generation of an update package that is usable for reliably in-place updating the original content to yield the updated content.

11. The method of claim 1, wherein (i) the recoverable data includes non-reliable content that is a result of an interrupted in-place update of content stored in the storage blocks of the non-volatile storage, and (ii) one of the blocks stores the non-reliable content and each one of the other blocks stores one of original content and updated content, and
    wherein said non-reliable content of said recoverable data is recoverable by applying the second error recovery function to said error recovery result and to the other part of said data, said other part of said data including one of (a) content stored in the other blocks, (b) content calculated based on content stored in the other blocks, and (c) content requiring protection calculated based on the content stored in the other blocks.

12. The method of claim 1, further comprising storing said error recovery result in the non-volatile storage prior to writing the updated content to the non-volatile storage in place of the original content.

13. The method of claim 1, wherein said error recovery result is stored in a predetermined number of blocks in the non-volatile storage.

14. The method of claim 1 further comprising:
    protecting, according to the update sequence, original content in at least one instance of a protection buffer in volatile memory, wherein said data includes said at least one protection buffer instances.

15. The method of claim 14, further comprising:
    providing a predetermined number of blocks in non-volatile storage for storing said error recovery result
    wherein each protection buffer instance is equivalent in size to said predetermined number of blocks and corresponding to at least one sequential block in an update sequence,
    wherein no two instances correspond to the same block in the update sequence,
    wherein for each instance, all original content protected in said instance originates from said at least one corresponding sequential blocks and is used to update said at least one corresponding sequential blocks, and
    wherein at least one operand in each said first and second error recovery functions includes at least part of a protection buffer instance; and
    writing said error recovery result to said predetermined number of blocks prior to writing updated content to the non-volatile storage in place of original content.

16. The method of claim 1, further comprising:
    protecting original content in at least one instance of a protection buffer in volatile memory, wherein said data includes at least one protection buffer instance; and
    storing said error recovery result in a number of blocks in said non-volatile storage equivalent to a number of blocks in one protection buffer instance.

17. The method of claim 16, further comprising:
retrieving said stored error result from non-volatile storage to volatile memory after an interruption which erases volatile memory and precludes rebuilding of a protection buffer instance from any of original or updated content in said non-volatile storage;
rebuilding each at least one protection buffer instances using original or updated content from non-volatile storage except for one protection buffer instance which cannot be rebuilt based on said original or updated content, wherein said recoverable part of said data includes said protection buffer instance which cannot be rebuilt, and wherein said another part of said data includes at least one rebuilt protection buffer instance; and
wherein said updating of content includes using said recovered protection buffer instance.

18. The method of claim 1, wherein said recoverable part of said data includes updated content corresponding to a block in said non-volatile storage and wherein another part of said data includes updated content associated with at least one other block.

19. The method of claim 1, wherein said recoverable part of said data includes original content corresponding to a block in said storage and wherein another part of said data includes original content original associated with at least one other block.

20. The method according to claim 1, further comprising protecting, in a protection buffer in volatile memory, any part of said data that is related to a storage block and which is required for updating said storage block or for updating any storage block later in said update sequence.

21. The method of claim 20, wherein said any part of said data related to said storage block which is required for updating said storage block or for updating said any storage block later in said update sequence includes at least one of original content from a corresponding storage block and data to facilitate locating the original content in the protection buffer.

22. An apparatus for reliably in-place updating original content of an original version stored in storage blocks of a non-volatile storage to yield updated content of an updated version, wherein the non-volatile storage does not store the updated version in addition to the original version, the apparatus comprising:
an error recovery result obtaining unit for obtaining an error recovery result indicative of a result achievable by applying a first error recovery function to data which is used in in-place updating the original content, wherein a part of said data is recoverable by applying a second error recovery function to (i) said error recovery result and (ii) another part of said data; and
an updating processor responsive to said error recovery result for in-place updating the original content by storing the updated content to the non-volatile storage in place of the original content,
wherein the data includes a single version of content.

23. The apparatus of claim 22, wherein the error recovery result obtaining unit is coupled to a calculator configured to calculate the error recovery result, by performing the first error recovery function.

24. The apparatus of claim 22, wherein (i) the recoverable data includes non-reliable content stored in at least one of the storage blocks and is a result of an interrupted in-place update of content stored in the storage blocks of the non-volatile storage, (ii) and one of the blocks stores the non-reliable content and each one of other blocks stores one of the original content and (ii) the updated content, the apparatus further comprising:

a recovery processor responsive to said error recovery result for recovering said non-reliable content of said recoverable data by applying the second error recovery function to said error recovery result and to the other part of said data, wherein the other part of said data includes one of (a) content stored in the other blocks or (b) content calculated based on content stored in the other blocks or (c) content requiring protection calculated based on the content stored in the other blocks.

25. A method for generating an update package for in place updating original content of an original version stored in non-volatile storage with blocks to yield updated content of an updated version, according to an update sequence, wherein the non-volatile storage does not store the updated version in addition to the original version, the method comprising:
providing a protection buffer of equivalent size to a predetermined number of blocks; and
prior to in-place updating or simulating in-place updating of content stored in a storage block, for each segment of said storage block that (i) relates to a corresponding storage block and (ii) is required for updating said corresponding storage block or for updating any storage block later in said update sequence, when there is space available in said protection buffer, protecting or simulating protecting of said each segment, and when there is no available space, inserting said each segment in said update package,
wherein after each of said protected or simulated to be protected segments has been used to update or simulate update of content of said corresponding storage block or to update content of said any storage block later in said update sequence, each of said used segments is marked as available for erasure and reuse in said protection buffer by other data,
wherein said each segment includes a single version of content.

26. A non-transitory computer readable storage medium that stores a program of instructions that causes a computer to perform steps for reliably in-place updating original content of an original version stored in storage blocks of a non-volatile storage to yield updated content of an updated version, wherein the non-volatile storage does not store the updated version in addition to the original version, the steps comprising:
obtaining an error recovery result indicative of a result achievable by applying a first error recovery function to data which is used in in-place updating the original content, wherein a part of said data is recoverable by applying a second error recovery function to (i) said error recovery result and (ii) another part of said data; and
after obtaining the error recovery result, in-place updating the original content by writing the updated content to the non-volatile storage in place of the original content,
wherein the data includes a single version of content.

27. The non-transitory computer readable storage medium of claim 26,
wherein the obtaining includes calculating the error recovery result by applying the first error recovery function to data which is used in updating the original content,
wherein at least one operand of said first error recovery function includes one of the following: (i) original content, (ii) updated content, and (iii) content that requires protection, and
wherein said program of instructions stored on the non-transitory computer readable storage medium further causes the computer to write said error recovery result into the non-volatile storage.

28. The non-transitory computer readable storage medium of claim 26, wherein (i) the recoverable data includes non-reliable content that is a result of an interrupted in-place update of content stored in storage blocks of the non-volatile storage and (ii) one of the blocks stores the non-reliable content and each one of the other blocks stores one of original content and updated content, and
   wherein said non-reliable content of said recoverable data is recoverable by applying the second error recovery function to said error recovery result and to the other part of said data, the other part of said data including one of (a) content stored in the other blocks, (b) content calculated based on content stored in the other blocks, and (c) content requiring protection calculated based on the content stored in the other blocks.

29. The non-transitory computer readable storage medium of claim 26, wherein:
   said program of instructions stored on the non-transitory computer readable storage medium further causes the computer to store said error recovery result in the non-volatile storage prior to writing the updated content to the non-volatile storage in place of the original content.

30. A method for reliably in-place updating original content of an original version stored in a non-volatile storage to yield updated content of an updated version, wherein the non-volatile storage does not store the updated version in addition to the original version, the method comprising:
   a. prior to the in-place updating original content, obtaining an error recovery result achievable by applying at least one first error recovery function to data which is designated to be used in updating the original content,
   b. after obtaining the error recovery result, in-place updating the original content by storing the updated content to the non-volatile storage in place of the original content,
   wherein said error recovery result is usable for recovering a part of said data which becomes non-reliable resulting an interrupted in-place update, said recovery to be provided by applying at least one second error recovery function to (i) said error recovery result and (ii) to a reliable part of said data and/or derivatives thereof,
   wherein the data includes a single version of content.

31. The method of claim 30, the updated version being stored in 1 storage blocks, where content stored in n out of the 1 storage blocks is updated, where n≤1, comprising:
   (a) obtaining an update package;
   (b) reliably in-place updating the original content while performing no more than n+k storage operations, where k is a selectable predetermined number and k<n.

32. The method of claim 31 applied for recovering non-reliable content that is a result of an interrupted in-place update of content stored in storage blocks of the non-volatile storage, wherein
   (a) one of the blocks stores non-reliable content and each one of the other blocks stores original content or updated content, and
   (b) recovering said non-reliable content is provided by applying said second error recovery function to said error recovery result and to data and/or deviations thereof corresponding to the content stored in the other blocks.

33. The method of claim 30, wherein said single version of content corresponds to the original content or part thereof.

34. The method of claim 30, wherein said single version of content corresponds to the updated content or part thereof.

35. The method of claim 30, wherein said single version of content corresponds to one of an original content desired to be protected and an updated content desired to be protected.

36. The method of claim 30 wherein the first error recovery function and the second error recovery function are identical.

37. The method of claim 30 wherein the first error recovery function and the second error recovery function are XOR functions.

38. The method of claim 30, wherein one of the first error recovery function and the second error recovery function is addition and the other is subtraction.

39. The method of claim 30, wherein obtaining includes receiving the error recovery result from an external source.

40. The method of claim 39, wherein the error recovery result is generated during generation of an update package which is usable for reliably in-place updating the original content to yield the updated content.

41. The method of claim 30, wherein obtaining includes writing said error recovery result into the non-volatile storage.

42. An apparatus for reliably in-place updating original content of an original version stored in storage blocks of a non-volatile storage to yield updated content of an updated version, wherein the non-volatile storage does not store the updated version in addition to the original version, the apparatus comprising:
   a) an error recovery result obtaining unit for obtaining an error recovery result achievable by applying at least one first error recovery function to data which are designated to be used in in-place updating the original content, wherein said error recovery result is usable for recovering a part of said data which become non-reliable resulting an interrupted in-place update, said recovery to be provided by applying at least one second error recovery function to (i) said error recovery result and (ii) a reliable part of said data and/or derivatives thereof; and wherein said unit is configured to obtain said error recovery result prior to a start of the updating process; and
   b) an updating processor responsive to said error recovery result for in-place updating the original content by storing the updated content to the non-volatile storage in place of the original content,
   wherein the data includes a single version of content.

43. The apparatus of claim 42, wherein the error recovery result obtaining unit is coupled to a calculator configured to calculate the error recovery result, by performing the first error recovery function.

44. The apparatus of claim 42, wherein the error recovery function is an XOR function.

45. The apparatus of claim 42 configured for recovering non-reliable content that is a result of an interrupted in-place update of content stored in the storage blocks of the non-volatile storage, wherein one of the blocks stores the non-reliable content and each one of other blocks stores original content or updated content, the apparatus further comprising:
   a recovery processor responsive to said error recovery result for recovering said non-reliable content by applying an error recovery function to said error recovery result and to data and/or derivatives thereof corresponding to said content stored in the other blocks.

46. A non-transitory computer-readable medium in which a computer program is recorded, said computer program comprising computer program code means able to be executed by a computer to perform steps for reliably in-place updating original content of an original version stored in a non-volatile storage to yield updated content of an updated version, wherein the non-volatile storage does not store the updated version in addition to the original version, the computer program causing the computer to execute the steps of:
- (a) prior to an in-place updating of original content stored in the non-volatile storage, obtaining an error recovery result achievable by applying at least one first error recovery function to data, which includes a single version of content and which is designated to be used in updating the original content,
- (b) after obtaining the error recovery result, in-place updating the original content by storing updated content to the non-volatile storage in place of the original content, wherein said error recovery result is usable for recovering a part of said data which becomes non-reliable resulting an interrupted in-place update, said recovery to be provided by applying at least one second error recovery function to (i) said error recovery result and (ii) to a reliable part of said data and/or derivatives thereof, and wherein the updated version is stored in l storage blocks, where content stored in n out of the l storage blocks is updated, where $n \leq l$, and the method further comprises
- (c) obtaining an update package; and
- (d) reliably in-place updating the original content while performing no more than n+k storage operations, where k is a selectable predetermined number and $k<n$.

* * * * *